US012508274B2

(12) United States Patent
Millet et al.

(10) Patent No.: US 12,508,274 B2
(45) Date of Patent: Dec. 30, 2025

(54) OLIGOSACCHARIDE COMPOSITIONS AND METHODS OF USE

(71) Applicant: DSM Nutritional Products, LLC, Parsippany, NJ (US)

(72) Inventors: Yves Millet, Lexington, MA (US); Jeffrey Meisner, Lexington, MA (US); Christopher Matthew Liu, Somerville, MA (US); Lingyao Li, Lexington, MA (US)

(73) Assignee: DSM Nutritional Products, LLC, Parsippany, NJ (US)

( * ) Notice: Subject to any disclaimer, the term of this patent is extended or adjusted under 35 U.S.C. 154(b) by 609 days.

(21) Appl. No.: 18/016,245

(22) PCT Filed: Jul. 16, 2021

(86) PCT No.: PCT/US2021/042055
§ 371 (c)(1),
(2) Date: Jan. 13, 2023

(87) PCT Pub. No.: WO2022/016105
PCT Pub. Date: Jan. 20, 2022

(65) Prior Publication Data
US 2023/0277573 A1    Sep. 7, 2023

Related U.S. Application Data

(60) Provisional application No. 63/053,528, filed on Jul. 17, 2020.

(51) Int. Cl.
*A61K 31/702*    (2006.01)
(52) U.S. Cl.
CPC .................................. *A61K 31/702* (2013.01)
(58) Field of Classification Search
None
See application file for complete search history.

(56) References Cited

U.S. PATENT DOCUMENTS

| | | | |
|---|---|---|---|
| 3,766,165 A | 10/1973 | Rennhard | |
| 7,365,191 B2 | 4/2008 | Kong et al. | |
| 8,466,242 B2 | 6/2013 | Geremia et al. | |
| 8,476,388 B2 | 7/2013 | Geremia et al. | |
| 9,079,171 B2 | 7/2015 | Geremia et al. | |
| 9,205,418 B2 | 12/2015 | Geremia et al. | |
| 9,238,845 B2 | 1/2016 | Baynes et al. | |
| 9,492,473 B2 | 11/2016 | von Maltzahn et al. | |
| 9,757,403 B2 | 9/2017 | von Maltzahn et al. | |
| 9,901,595 B2 | 2/2018 | von Maltzahn et al. | |
| 10,131,721 B2 | 11/2018 | Geremia et al. | |
| 10,314,853 B2 | 6/2019 | von Maltzahn et al. | |
| 10,702,542 B2 | 7/2020 | von Maltzahn et al. | |
| 10,752,705 B2 | 8/2020 | Geremia et al. | |
| 10,787,527 B2 | 9/2020 | Geremia et al. | |
| 10,849,337 B2 | 12/2020 | Geremia et al. | |
| 10,881,676 B2 | 1/2021 | von Maltzahn et al. |
| 10,894,057 B2 | 1/2021 | von Maltzahn et al. |
| 11,169,101 B2 | 11/2021 | Liu et al. |
| 11,229,660 B2 | 1/2022 | Von Maltzahn et al. |
| 11,572,380 B2 | 2/2023 | Hamaguchi et al. |
| 11,584,805 B2 | 2/2023 | Geremia et al. |
| 11,653,676 B2 | 5/2023 | Geremia et al. |
| 11,697,692 B2 | 7/2023 | Geremia et al. |
| 11,883,422 B2 | 1/2024 | Von Maltzahn et al. |
| 12,090,168 B2 | 9/2024 | Gibson et al. |
| 12,377,113 B2 | 8/2025 | Von Maltzahn et al. |
| 12,410,206 B2 | 9/2025 | Liu et al. |
| 2012/0220740 A1 | 8/2012 | Geremia et al. |
| 2012/0252957 A1 | 10/2012 | Geremia et al. |
| 2013/0042859 A1 | 2/2013 | Geremia et al. |
| 2013/0224155 A1 | 8/2013 | Kaplan et al. |
| 2013/0233308 A1 | 9/2013 | Geremia et al. |
| 2013/0337109 A1 | 12/2013 | Hamaguchi et al. |
| 2014/0060522 A1 | 3/2014 | Baynes et al. |
| 2014/0256673 A1 | 9/2014 | Bahrami |
| 2015/0202607 A1 | 7/2015 | Geremia et al. |
| 2015/0238948 A1 | 8/2015 | Geremia |
| 2016/0007642 A1 | 1/2016 | Geremia et al. |
| 2016/0032038 A1 | 2/2016 | Baynes et al. |
| 2016/0122447 A1 | 5/2016 | Geremia et al. |
| 2016/0213702 A1 | 7/2016 | von Maltzahn et al. |
| 2016/0366909 A1 | 12/2016 | Geremia et al. |

(Continued)

FOREIGN PATENT DOCUMENTS

| JP | H02-100695 A | 4/1990 |
|---|---|---|
| WO | WO-2010129839 A1 | 11/2010 |

(Continued)

OTHER PUBLICATIONS

Li et al. "Preparation, characterization, and prebiotic activity of manno-oligosaccharides produced from cassia gum by a glycoside hydrolase family 134 ß-mannanase," Food Chem. 30:309:125709 (Mar. 2020) (10 pages).

McCleary et al. "Characterisation of the oligosaccharides produced on hydrolysis of galactomannan with ß-d-mannase," Carbohydr Res. 118:91-109 (1983).

Scharpf et al., "Site-specific characterization of the association of xylooligosaccharides with the CBM13 lectin-like xylan binding domain from Streptomyces lividans xylanase 10A by NMR spectroscopy," Biochemistry. 41(13):4255-63 (Apr. 2002).

Zhu et al. "Can functional oligosaccharides reduce the risk of diabetes mellitus?," FASEB J. 33(11):11655-11667 (Nov. 2019).

*Primary Examiner* — Dale R Miller
(74) *Attorney, Agent, or Firm* — Clark & Elbing LLP

(57) ABSTRACT

Aspects of the disclosure relate to oligosaccharide compositions and methods of making the same. Also provided are methods of using oligosaccharide compositions as microbiome metabolic therapies for reducing levels and/or concentration of glucose and/or lipids, e.g., cholesterol, low-density lipoprotein cholesterol, non-esterified free fatty acids and triglycerides, and for the treatment of related diseases.

15 Claims, 22 Drawing Sheets

(56) References Cited

U.S. PATENT DOCUMENTS

| | | | |
|---|---|---|---|
| 2017/0151268 A1 | 6/2017 | von Maltzahn et al. |
| 2017/0151269 A1 | 6/2017 | von Maltzahn et al. |
| 2017/0246201 A1 | 8/2017 | von Maltzahn et al. |
| 2018/0000145 A1 | 1/2018 | Geremia et al. |
| 2018/0000146 A1 | 1/2018 | Geremia |
| 2018/0147221 A1 | 5/2018 | von Maltzahn et al. |
| 2018/0147222 A1 | 5/2018 | von Maltzahn et al. |
| 2018/0235987 A1 | 8/2018 | von Maltzahn et al. |
| 2018/0296582 A1 | 10/2018 | von Maltzahn et al. |
| 2019/0062468 A1 | 2/2019 | Geremia et al. |
| 2019/0091249 A1 | 3/2019 | von Maltzahn et al. |
| 2019/0290675 A1 | 9/2019 | Gibson et al. |
| 2019/0307159 A1 | 10/2019 | Geremia et al. |
| 2020/0000831 A1 | 1/2020 | Geremia et al. |
| 2020/0009168 A1 | 1/2020 | von Maltzahn et al. |
| 2020/0078390 A1 | 3/2020 | Zomer et al. |
| 2020/0093845 A1 | 3/2020 | von Maltzahn et al. |
| 2020/0093851 A1 | 3/2020 | von Maltzahn et al. |
| 2020/0352980 A1 | 11/2020 | Mahowald et al. |
| 2020/0354481 A1 | 11/2020 | Geremia et al. |
| 2020/0390798 A1 | 12/2020 | Gibson et al. |
| 2021/0002387 A1 | 1/2021 | Geremia et al. |
| 2021/0076705 A1 | 3/2021 | Geremia et al. |
| 2021/0113596 A1 | 4/2021 | von Maltzahn et al. |
| 2021/0121486 A1 | 4/2021 | Geremia et al. |
| 2021/0137956 A1 | 5/2021 | von Maltzahn et al. |
| 2021/0137964 A1 | 5/2021 | von Maltzahn et al. |
| 2021/0161942 A1 | 6/2021 | von Maltzahn et al. |
| 2021/0164926 A1 | 6/2021 | Liu et al. |
| 2021/0198302 A1 | 7/2021 | Liu et al. |
| 2021/0352945 A1 | 11/2021 | Geremia |
| 2021/0401861 A1 | 12/2021 | von Maltzahn et al. |
| 2022/0233560 A1 | 7/2022 | Yatsunenko et al. |
| 2022/0233577 A1 | 7/2022 | Gibson et al. |
| 2022/0395521 A1 | 12/2022 | von Maltzahn et al. |
| 2022/0400728 A1 | 12/2022 | Geremia et al. |
| 2022/0409644 A1 | 12/2022 | Geremia et al. |
| 2023/0113218 A1 | 4/2023 | Mahowald et al. |
| 2023/0123695 A1 | 4/2023 | von Maltzahn et al. |
| 2023/0165881 A1 | 6/2023 | Lawrence et al. |
| 2023/0255240 A1 | 8/2023 | Geremia et al. |
| 2023/0255989 A1 | 8/2023 | von Maltzahn et al. |
| 2023/0277573 A1 | 9/2023 | Millet et al. |
| 2024/0108642 A1 | 4/2024 | von Maltzahn et al. |

FOREIGN PATENT DOCUMENTS

| | | |
|---|---|---|
| WO | WO-2012/118767 A1 | 9/2012 |
| WO | WO-2014/031956 A1 | 2/2014 |
| WO | WO-2014/032004 A1 | 2/2014 |
| WO | WO-2014/159558 A1 | 10/2014 |
| WO | WO-2016/007778 A1 | 1/2016 |
| WO | WO-2016/122884 A1 | 8/2016 |
| WO | WO-2016/122885 A1 | 8/2016 |
| WO | WO-2016/122887 A1 | 8/2016 |
| WO | WO-2016/122889 A1 | 8/2016 |
| WO | WO-2016/122940 A1 | 8/2016 |
| WO | WO-2016/172657 A2 | 10/2016 |
| WO | WO-2016/172658 A2 | 10/2016 |
| WO | WO-2017/035412 A1 | 3/2017 |
| WO | WO-2017/083520 A1 | 5/2017 |
| WO | WO-2018/013871 A1 | 1/2018 |
| WO | WO-2018/106845 A1 | 6/2018 |
| WO | WO-2019/014645 A1 | 1/2019 |
| WO | WO-2019/090180 A1 | 5/2019 |
| WO | WO-2019/090181 A1 | 5/2019 |
| WO | WO-2019/090182 A2 | 5/2019 |
| WO | WO-2020/041531 A2 | 2/2020 |
| WO | WO-2020/097568 A2 | 5/2020 |
| WO | WO-2020/227689 A1 | 11/2020 |
| WO | WO-2021/222660 A1 | 11/2021 |
| WO | WO-2022/016105 A1 | 1/2022 |
| WO | WO-2022/067131 A1 | 3/2022 |
| WO | WO-2023/059530 A1 | 4/2023 |
| WO | WO-2024/023198 A1 | 2/2024 |

No treatment

Selected OS

Glu/Gal-based OS

Liraglutide

OLIGOSACCHARIDE COMPOSITIONS AND METHODS OF USE

RELATED APPLICATION

This application claims the benefit of the filing date of U.S. Provisional Application No. 63/053,528, titled "OLIGOSACCHARIDE COMPOSITIONS AND METHODS OF USE" and filed on Jul. 17, 2020; the contents of which are incorporated herein by reference in its entirety.

FIELD OF THE INVENTION

The present disclosure relates to oligosaccharide compositions and uses thereof.

BACKGROUND OF THE INVENTION

Maintaining or restoring human health faces a large number of challenges many of which result from the lack of effective treatment options. There is a continued need for novel therapies and treatment regimens.

SUMMARY OF THE INVENTION

According to some aspects, provided herein are microbiome metabolic therapies utilizing oligosaccharide compositions that are useful for driving functional outputs of the gut microbiome organ, e.g., to treat disease. Some aspects of the disclosure relate to a recognition that oligosaccharide compositions are useful for lowering lipid and/or glucose (e.g., blood) levels in a subject, two functional outcomes which are useful for treating a number of diseases and conditions.

Some aspects of the disclosure provide an oligosaccharide composition comprising a plurality of oligosaccharides, the composition being characterized by a multiplicity-edited gradient-enhanced 1H-13C heteronuclear single quantum correlation (HSQC) NMR spectrum comprising one or more of signals 1, 2, 5, or 6 of the following table, wherein the spectrum is generated using a sample of the oligosaccharide composition having less than 2% monomer:

| Signal | Center Position (ppm) $^1H$ | $^{13}C$ | Area under the curve (AUC) (% of total areas of signals 1-12) |
|---|---|---|---|
| 1 | 5.05 | 108.24 | 2.35-3.77 |
| 2 | 5.04 | 96.57 | 0.01-0.86 |
| 3 | 4.99 | 98.83 | 11.33-17.01 |
| 4 | 4.89 | 100.02 | 16.75-18.46 |
| 5 | 4.71 | 101.01 | 3.05-4.50 |
| 6 | 4.60 | 104.86 | 0.27-1.94 |
| 7 | 4.46 | 103.81 | 5.29-9.30 |
| 8 | 4.15 | 76.80 | 4.57-8.55 |
| 9 | 4.13 | 81.77 | 9.72-13.13 |
| 10 | 4.05 | 77.04 | 11.64-15.51 |
| 11 | 4.00 | 66.42 | 7.34-12.09 |
| 12 | 3.88 | 66.76 | 8.45-14.07 |

In some embodiments, the oligosaccharide composition comprises each of HSQC signals 1, 2, 5, and 6. In some embodiments, the oligosaceharide composition further comprises one or more of HSQC signals 3,4, or 7-12. In some embodiments, the oligosaccharide composition comprises each of HSQC signals 1-12.

In some embodiments, at least one of HS QC signals 1-12 of the sample of the oligosaccharide composition is defined as follows:

| Signal | Center Position (ppm) $^1H$ | $^{13}C$ | Area under the curve (AUC) (% of total areas of signals 1-12) |
|---|---|---|---|
| 1 | 5.05 | 108.24 | 2.63-3.48 |
| 2 | 5.04 | 96.57 | 0.05-0.66 |
| 3 | 4.99 | 98.83 | 12.47-15.87 |
| 4 | 4.89 | 100.02 | 17.09-18.12 |
| 5 | 4.71 | 101.01 | 3.34-4.21 |
| 6 | 4.60 | 104.86 | 0.60-1.61 |
| 7 | 4.46 | 103.81 | 6.09-8.49 |
| 8 | 4.15 | 76.80 | 5.37-7.76 |
| 9 | 4.13 | 81.77 | 10.40-12.45 |
| 10 | 4.05 | 77.04 | 12.42-14.74 |
| 11 | 4.00 | 66.42 | 8.29-11.14 |
| 12 | 3.88 | 66.76 | 9.57-12.95 |

In some embodiments, HSQC signals 1-12 of the sample of the oligosaccharide composition are each further characterized by an $^1H$ integral region and a $^{13}C$ integral region, defined as follows:

| Signal | $^1H$ Position (ppm) Center Position | $^1H$ Integral Region from | To | $^{13}C$ Position (ppm) Center Position | $^{13}C$ Integral Region from | to |
|---|---|---|---|---|---|---|
| 1 | 5.05 | 5.10 | 5.01 | 108.24 | 108.69 | 107.80 |
| 2 | 5.04 | 5.06 | 5.03 | 96.57 | 96.84 | 96.31 |
| 3 | 4.99 | 5.05 | 4.93 | 98.83 | 99.82 | 97.84 |
| 4 | 4.89 | 4.96 | 4.83 | 100.02 | 101.13 | 98.91 |
| 5 | 4.71 | 4.75 | 4.66 | 101.01 | 101.56 | 100.46 |
| 6 | 4.60 | 4.63 | 4.57 | 104.86 | 105.19 | 104.53 |
| 7 | 4.46 | 4.52 | 4.40 | 103.81 | 104.37 | 103.25 |
| 8 | 4.15 | 4.22 | 4.05 | 76.80 | 82.69 | 80.85 |
| 9 | 4.13 | 4.21 | 4.10 | 81.77 | 77.41 | 76.19 |
| 10 | 4.05 | 4.12 | 3.99 | 77.04 | 78.16 | 75.92 |
| 11 | 4.00 | 4.08 | 3.92 | 66.42 | 67.30 | 65.54 |
| 12 | 3.88 | 3.93 | 3.83 | 66.76 | 67.94 | 65.57 |

In some embodiments, the NMR spectrum is obtained by subjecting a sample of the composition to a multiplicity-edited gradient-enhanced $^1H$-$^{13}C$ heteronuclear single quantum coherence (HSQC) experiment using an echo-antiecho scheme for coherence selection using the following pulse sequence diagram, acquisition parameters and processing parameters: Pulse sequence diagram

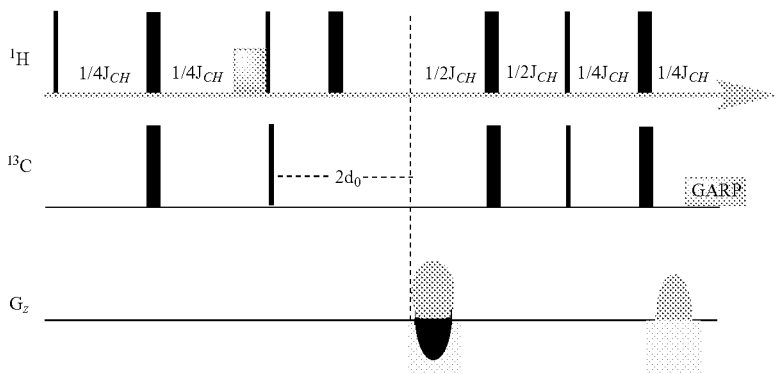

Acquisition Parameters
- $^1H$ Carrier Frequency=4 ppm
- $^{13}C$ Carrier Frequency=65 ppm
- Number of points in acquisition dimension=596
- Spectral range in acquisition dimension=6.23 ppm to 1.83 ppm
- Number of points in indirect dimension=300 complex points
- Spectral range in indirect dimension=120 ppm to 10 ppm
- Recycle delay=1 second
- One-bond $^1H$-$^{13}C$ coupling constant=$J_{CH}$=146 Hz
- Number of scans=8
- Temperature=298-299 K
- Solvent=$D_2O$ Processing Parameters
- Window function in direct dimension=Gaussian broadening, 7.66 Hz
- Window function in indirect dimension=Gaussian broadening 26.48 Hz
- Processing=512 complex points in direct dimension, 1024 complex points in indirect dimension In some embodiments, the NMR spectrum is obtained by subjecting a sample of the oligosaccharide composition to HSQC NMR, wherein the sample is dissolved in $D_2O$. In some embodiments, the oligosaccharide composition has been subjected to a de-monomerization procedure. In some embodiments, the oligosaccharide composition comprises less than 10%, less than 5% or less than 2% monomer.

Some aspects of the disclosure provide an oligosaccharide composition comprising a plurality of oligosaccharides, each oligosaccharide comprising a plurality of monomer radicals; the plurality of oligosaccharides comprising one or more of the following monomer radicals:
- (2) t-manopyranose monoradicals, representing 11.47-18.18 mol % of monomer radicals in the plurality of oligosaccharides;
- (4) t-manofuranose monoradicals, representing 0.17-0.46 mol % of monomer radicals in the plurality of oligosaccharides;
- (8) 3-manofuranose monoradicals, representing 0.07-0.24 mol % of monomer radicals in the plurality of oligosaccharides;
- (10) 2-manopyranose and/or 3-manopyranose monoradicals, representing 3.91-5.93 mol % of monomer radicals in the plurality of oligosaccharides;
- (15) 6-manopyranose monoradicals, representing 8.30-10.84 mol % of monomer radicals in the plurality of oligosaccharides;
- (27) 4,6-manopyranose and/or 5,6-manofuranose diradicals, representing 1.18-1.82 mol % of monomer radicals in the plurality of oligosaccharides;
- (30) 3,6-manopyranose diradicals, representing 1.76-2.40 mol % of monomer radicals in the plurality of oligosaccharides;
- (31) 2,6-manopyranose diradicals, representing 1.42-1.84 mol % of monomer radicals in the plurality of oligosaccharides; and
- (32) 3,6-galactofuranose diradicals, representing 0.95-1.41 mol % of monomer radicals in the plurality of oligosaccharides.

In some embodiments, the plurality of oligosaccharides comprise at least 2, 3, 4, 5, 6, 7, 8, or 9 of the monomer radicals selected from radicals (2), (4), (8), (10), (15), (27), and (30)-(32).

In some embodiments, the plurality of oligosaccharides further comprise one or more of the following monomer radicals:
- (5) t-galactofuranose monoradicals, representing 2.96-6.24 mol % of monomer radicals in the plurality of oligosaccharides;
- (6) t-galactopyranose monoradicals, representing 12.90-17.63 mol % of monomer radicals in the plurality of oligosaccharides;
- (12) 3-galactopyranose monoradicals, representing 3.52-4.87 mol % of monomer radicals in the plurality of oligosaccharides;
- (18) 4-galactopyranose and/or 5-galactofuranose monoradicals, representing 2.86-3.57 mol % of monomer radicals in the plurality of oligosaccharides;
- (22) 2,3-galactofuranose diradicals, representing 0.10-0.59 mol % of monomer radicals in the plurality of oligosaccharides;
- (23) 2,3-manopyranose diradicals, representing 0.24-0.51 mol % of monomer radicals in the plurality of oligosaccharides;
- (24) 6-galactopyranose monoradicals, representing 9.78-13.08 mol % of monomer radicals in the plurality of oligosaccharides;
- (25) 3,4-galactopyranose and/or 3,5-galactofuranose and/or 2,3-galactopyranose diradicals, representing 0.83-1.32 mol % of monomer radicals in the plurality of oligosaccharides;
- (26) 2,4-manopyranose and/or 2,5-manofuranose diradicals, representing 0.09-1.15 mol % of monomer radicals in the plurality of oligosaccharides;
- (28) 3,6-manofuranose diradicals, representing 0.07-0.18 mol % of monomer radicals in the plurality of oligosaccharides;

(33) 4,6-galactopyranose and/or 5,6-galactofuranose diradicals, representing 2.38-3.46 mol % of monomer radicals in the plurality of oligosaccharides;
(34) 2,6-galactopyranose diradicals, representing 1.23-1.84 mol % of monomer radicals in the plurality of oligosaccharides;
(35) 3,4,6-manopyranose and/or 3,5,6-manofuranose and/or 2,3,6-manofuranose triradicals, representing 0.19-0.48 mol % of monomer radicals in the plurality of oligosaccharides;
(36) 3,4,6-galactopyranose and/or 3,5,6-galactofuranose and/or 2,3,6-galactofuranose triradicals, representing 0.53-1.03 mol % of monomer radicals in the plurality of oligosaccharides;
(37) 2,3,6-manopyranose and/or 2,4,6-manopyranose and/or 2,5,6-manofuranose triradicals, representing 0.43-0.68 mol % of monomer radicals in the plurality of oligosaccharides; and
(38) 2,3,6-galactopyranose and/or 2,4,6-galactopyranose and/or 2,5,6-galactofuranose triradicals, representing 0.59-0.93 mol % of monomer radicals in the plurality of oligosaccharides.

In some embodiments, the plurality of oligosaccharides comprise at least 2, 3, 4, 5, 6, 7, 8, 9, 10, 11, 12, 13, 14, 15, 16, 17, 18, 19, 20, 21, or 22 of the monomer radicals selected from radicals (2), (4)-(6), (8), (10), (12), (15), (18), (22)-(28) and (30)-(38).

In some embodiments, the plurality of oligosaccharides comprise each of the monomer radicals selected from radicals (2), (4)-(6), (8), (10), (12), (15), (18), (22)-(28) and (30)-(38).

In some embodiments, the plurality of oligosaccharides comprise one or more of the following monomer radicals:
(9) 2-manofuranose monoradicals, representing 0.01-1.07 mol % of monomer radicals in the plurality of oligosaccharides;
(11) 2-galactofuranose monoradicals, representing 0.01-4.34 mol % of monomer radicals in the plurality of oligosaccharides;
(13) 4-manopyranose and/or 5-manofuranose monoradicals, representing 0.01-7.91 mol % of monomer radicals in the plurality of oligosaccharides;
(14) 3-galactofuranose monoradicals, representing 0.01-4.44 mol % of monomer radicals in the plurality of oligosaccharides;
(16) 2-galactopyranose monoradicals, representing 0.01-8.70 mol % of monomer radicals in the plurality of oligosaccharides;
(19) 2,3-manofuranose diradicals, representing 0.01-0.26 mol % of monomer radicals in the plurality of oligosaccharides;
(21) 6-manofuranose monoradicals, representing 0.01-1.72 mol % of monomer radicals in the plurality of oligosaccharides;
(39) 2,3,4,6-manopyranose and/or 2,3,5,6-manofuranose tetraradicals, representing 0.01-0.68 mol % of monomer radicals in the plurality of oligosaccharides; and
(40) 2,3,4,6-galactopyranose and/or 2,3,5,6-galactofuranose tetraradicals, representing 0.01-0.31 mol % of monomer radicals in the plurality of oligosaccharides.

In some embodiments, the plurality of oligosaccharides further comprises one or more of the following monomer radicals:
(9) 2-manofuranose monoradicals, representing about 0.11 mol % of monomer radicals in the plurality of oligosaccharides;
(11) 2-galactofuranose monoradicals, representing about 0.43 mol % of monomer radicals in the plurality of oligosaccharides;
(13) 4-manopyranose and/or 5-manofuranose monoradicals, representing about 1.10 mol % of monomer radicals in the plurality of oligosaccharides;
(14) 3-galactofuranose monoradicals, representing about 0.35 mol % of monomer radicals in the plurality of oligosaccharides;
(16) 2-galactopyranose monoradicals, representing 0.06-6.54 mol % of monomer radicals in the plurality of oligosaccharides;
(19) 2,3-manofuranose diradicals, representing 0.06-0.21 mol % of monomer radicals in the plurality of oligosaccharides;
(21) 6-manofuranose monoradicals, representing about 0.36 mol % of monomer radicals in the plurality of oligosaccharides;
(39) 2,3,4,6-manopyranose and/or 2,3,5,6-manofuranose tetraradicals, representing about 0.12 mol % of monomer radicals in the plurality of oligosaccharides; and
(40) 2,3,4,6-galactopyranose and/or 2,3,5,6-galactofuranose tetraradicals, representing about 0.04 mol % of monomer radicals in the plurality of oligosaccharides.

In some embodiments, the plurality of oligosaccharides comprise each of the monomer radicals selected from radicals (2), (4)-(6), (8)-(16), (18), (19), (21)-(28) and (30)-(39).

In some embodiments, the molar percentages of monomer radicals are determined using a permethylation assay, wherein the permethylation assay comprises gas chromatography-mass spectroscopy (GC-MS) analysis.

In some embodiments, the oligosaccharide composition comprises a plurality of oligosaccharides that consist essentially of Formula (I) and Formula (II):

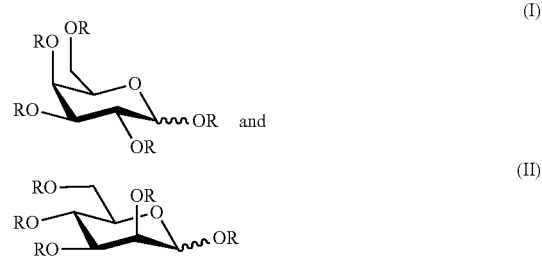

wherein R in Formula (I) and Formula (II) is independently selected from hydrogen, and Formulae (Ia), (Ib), (Ic), (Id), (IIa), (IIb), (IIc), (IId):

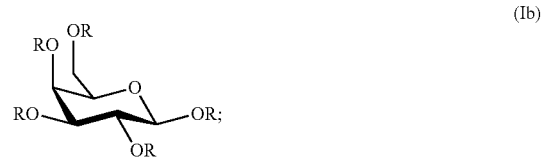

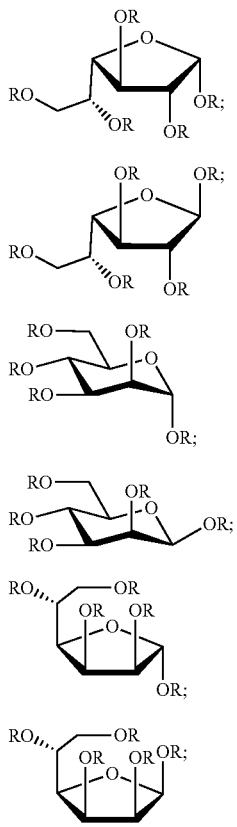

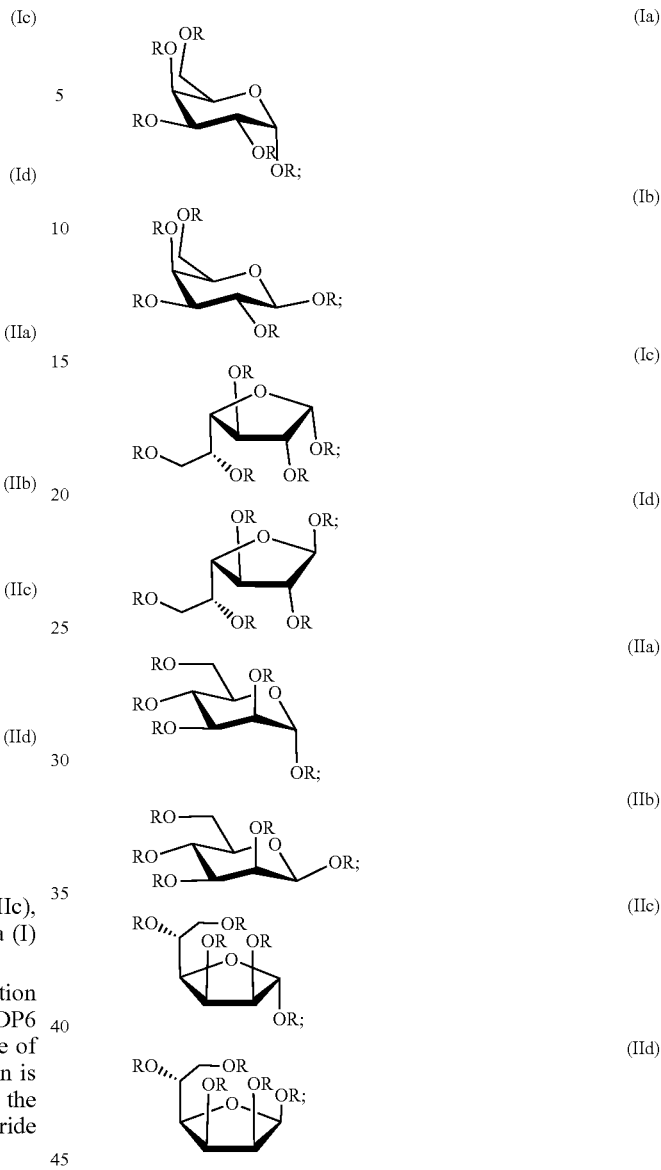

wherein R in Formulae (Ia), (Ib), (Ic), (Id), (IIa), (IIb), (IIc), and (IId) is independently defined as above in Formula (I) and Formula (II).

In some embodiments, the mean degree of polymerization (DP) of the oligosaccharide composition is from about DP6 to about DP19. In some embodiments, the mean degree of polymerization (DP) of the oligosaccharide composition is from about DP10 to about DP16. In some embodiments, the mean degree of polymerization (DP) of the oligosaccharide composition is from about DP10 to about DP14.

In some embodiments, the oligosaccharide composition comprises 55% to 95% total dietary fiber (dry basis).

Some aspects of the disclosure provide an oligosaccharide composition comprising a plurality of oligosaccharides that comprise Formula (I) and Formula (II):

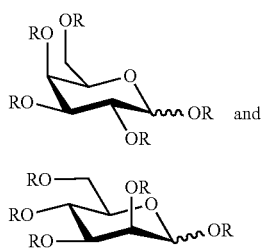

wherein R in Formula (I) and Formula (II) is independently selected from hydrogen, and Formulae (Ia), (Ib), (Ic), (Id), (IIa), (IIb), (IIc), (IId):

wherein R in Formulae (Ia), (Ib), (Ic), (Id), (IIa), (IIb), (IIc), and (IId) is independently defined as above in Formula (I) and Formula (II);
wherein the oligosaccharide composition is produced by a process comprising:
  (a) forming a reaction mixture comprising galactose monomer and mannose monomer, wherein the molar ratio of galactose to mannose is about 3:2 with an acid catalyst comprising positively charged hydrogen ions; and
  (b) promoting acid catalyzed oligosaccharide formation in the reaction mixture by transferring sufficient heat to the reaction mixture to maintain the reaction mixture at its boiling point.

In some embodiments, step (b) comprises loading the reaction mixture with an acid catalyst comprising positively charged hydrogen ions, in an amount such that the molar ratio of positively charged hydrogen ions to total galactose monomer and mannose monomer content is in an appropriate range. In some embodiments, steps (a) and (b) occur simultaneously.

In some embodiments, step (a) comprises heating the reaction mixture under agitation conditions to a temperature in a range of 100° C. to 160° C. In some embodiments, step (a) comprises heating the reaction mixture under agitation conditions to a temperature in a range of 130° C. to 140° C. In some embodiments, step (a) comprises heating the reaction mixture under agitation conditions at a temperature in a range of 100° C. to 160° C. In some embodiments, step (a) comprises heating the reaction mixture under agitation conditions at a temperature in a range of 130° C. to 140° C. In some embodiments, step (a) comprises gradually increasing the temperature (e.g., from room temperature) to about 135° C., under suitable conditions to achieve homogeneity and uniform heat transfer. In some embodiments, step (b) comprises maintaining the reaction mixture at atmospheric pressure or under vacuum, at a temperature in a range of 130° C. to 140° C., under conditions that promote acid catalyzed oligosaccharide composition formation, until the weight percent of galactose monomer and mannose monomer in the oligosaccharide composition is in a range of 4-14. In some embodiments, step (b) comprises gradually increasing the temperature (e.g., from room temperature) to about 135° C., under suitable conditions to achieve homogeneity and uniform heat transfer.

In some embodiments, the acid catalyst is a strong acid cation exchange resin having one or more physical and chemical properties according to Table 1 and/or wherein the catalyst comprises >3.0 mmol/g sulfonic acid moieties and <1.0 mmol/gram cationic moieties. In some embodiments, the catalyst has a nominal moisture content of 45-50 weight percent.

In some embodiments, the acid catalyst is a soluble catalyst. In some embodiments, the soluble catalyst is an organic acid. In some embodiments, the soluble catalyst is a weak organic acid. In some embodiments, the soluble catalyst is citric acid.

In some embodiments, the process further comprises: (c) quenching the reaction mixture, for example, using water, while bringing the temperature of the reaction mixture to a temperature in the range of 55° C. to 95° C. (e.g., 85° C., 90° C.).

In some embodiments, the process further comprises: (d) separating oligosaccharide composition from the acid catalyst. In some embodiments, in (d) said separating comprises removing the catalyst by filtration. In some embodiments, (d) comprises cooling the reaction mixture to below about 85° C. before filtering.

In some embodiments, the process further comprises: (e) diluting the oligosaccharide composition of (d) with water to a concentration of about 45-55 weight percent; (f) passing the diluted composition through a cationic exchange resin; (g) passing the diluted composition through a decolorizing polymer resin; and/or (h) passing the diluted composition through an anionic exchange resin; wherein each of (f), (g), and (h) can be performed one or more times in any order.

In some embodiments, the mean degree of polymerization (DP) of the oligosaccharide composition is from about DP6 to about DP19. In some embodiments, the mean degree of polymerization (DP) of the oligosaccharide composition is from about DP10 to about DP14. In some embodiments, the composition comprises 55% to 95% total dietary fiber (dry basis). In some embodiments, the oligosaccharide composition comprises less than 15% monomer (DP1).

Some aspects of the disclosure provide a method of treating a subject having or suspected of having non-alcoholic fatty liver disease (NAFLD) or non-alcoholic steatohepatitis (NASH).

In some embodiments, a method of treating a subject having or suspected of having non-alcoholic fatty liver disease (NAFLD) or non-alcoholic steatohepatitis (NASH) comprises administering to the gastrointestinal tract of the subject an effective amount of an oligosaccharide composition, wherein the oligosaccharide composition has an average degree of polymerization of 5-20 and comprises a plurality of oligosaccharides selected from Formula (I) and Formula (II):

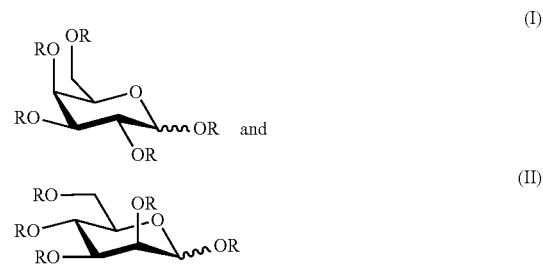

wherein R in Formula (I) and Formula (II) is independently selected from hydrogen, and Formulae (Ia), (Ib), (Ic), (Id), (Ia), (II), (IIc), (IId):

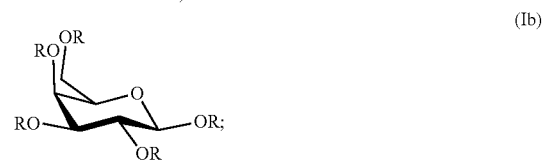

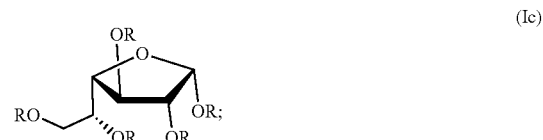

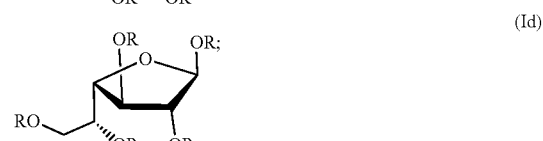

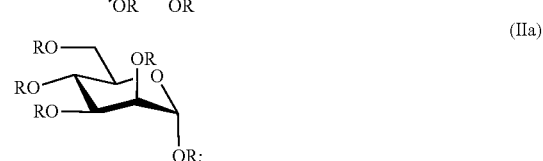

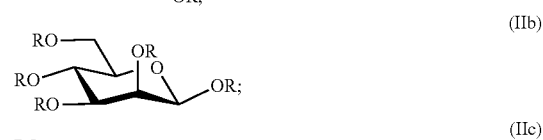

-continued (IId)

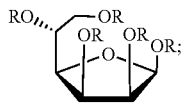

wherein R in Formulae (Ia), (Ib), (Ic), (Id), (IIa), (IIb), (IIc), and (IId) is independently defined as above in Formula (I) and Formula (II); thereby treating the subject.

In some embodiments, a method of treating a subject having or suspected of having non-alcoholic fatty liver disease (NAFLD) or non-alcoholic steatohepatitis (NASH) comprises administering to the gastrointestinal tract of the subject an effective amount of an oligosaccharide composition described herein.

Some aspects of the disclosure provide a method of increasing the relative or absolute concentration of propionate in a human subject. In some embodiments, a method of increasing the relative or absolute concentration of propionate comprises administering to the gastrointestinal tract of the subject an effective amount of an oligosaccharide composition described herein. In some embodiments, the method increases the relative or absolute concentration of propionate in the gastrointestinal tract of the subject.

In some embodiments, the relative or absolute concentration of propionate is increased by at least 5%, 10%, 20%, or 30%, compared to a baseline measurement (e.g., wherein the baseline measurement is determined prior to treatment).

Some aspects of the disclosure provide a method of reducing the relative or absolute concentration of lipids in a human subject. In some embodiments, a method of reducing the relative or absolute concentration of lipids in a human subject comprises administering to the gastrointestinal tract of the subject an effective amount of an oligosaccharide composition described herein.

In some embodiments, the relative or absolute concentration of lipids is reduced by at least 5%, 10%, 20%, or 30%, compared to a baseline measurement (e.g., wherein the baseline measurement is determined prior to treatment).

In some embodiments, the lipids are cholesterol, very low-density lipoprotein (VLDL), low-density lipoprotein (LDL), non-esterified free fatty acids and/or triglycerides. In some embodiments, the cholesterol are liver cholesterol and/or blood cholesterol. In some embodiments, the triglycerides are liver triglycerides and/or blood triglycerides.

Some aspects of the disclosure provide a method of treating a subject having or suspected of having a disease, disorder or condition associated with elevated lipid and/or glucose levels. In some embodiments, a method of treating a subject having or suspected of having a disease, disorder or condition associated with elevated lipid and/or glucose levels comprises administering to the gastrointestinal tract of the subject an effective amount of an oligosaccharide composition described herein, thereby treating the subject.

Some aspects of the disclosure provide a method of treating a subject having or suspected of having a disease or disorder associated with elevated lipid and/or glucose levels. In some embodiments, a method of treating a subject having or suspected of having a disease or disorder associated with elevated lipid and/or glucose levels comprises administering to the gastrointestinal tract of the subject an effective amount of an oligosaccharide composition, wherein the oligosaccharide composition has an average degree of polymerization of 5-20 and comprises a plurality of oligosaccharides selected from Formula (I) and Formula (II):

(I)

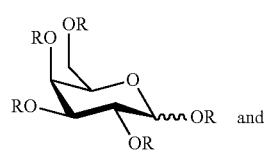

and (II)

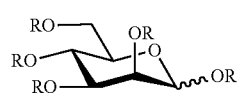

wherein R in Formula (I) and Formula (II) is independently selected from hydrogen, and Formulae (Ia), (Ib), (Ic), (Id), (IIa), (IIb), (IIc), (IId):

(Ia)

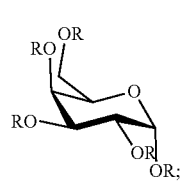

(Ib)

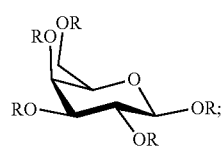

(Ic)

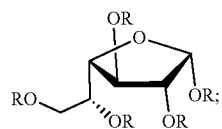

(Id)

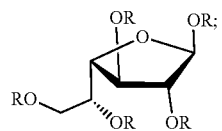

(IIa)

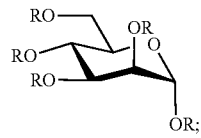

(IIb)

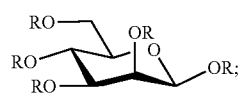

(IIc)

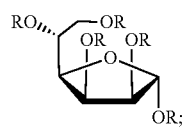

(IId)

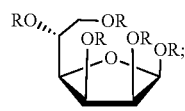

wherein R in Formulae (Ia), (Ib), (Ic), (Id), (IIa), (IIb), (IIc), and (IId) is independently defined as above in Formula (I) and Formula (II); thereby treating the subject.

In some embodiments, a disease, disorder or condition is dyslipidemia, hyperlipidemia (e.g., primary or familial hyperlipidemia) or a cardiometabolic disease.

In some embodiments, a subject has or is suspected of having metabolic syndrome. In some embodiments, a subject has or is at risk of developing a disease associated with abnormal lipid and/or glucose levels, such as, e.g., non-alcoholic fatty liver disease (NAFLD), non-alcoholic steatohepatitis (NASH), cardiovascular disease (CVD), type-2diabetes (T2D), and chronic kidney disease (CKC).

In some embodiments, a hyperlipidemia is Heterozygous familial hypercholesterolemia (HeFH), homozygous familial hypercholesterolemia (HoFH), familial chylomicronemia syndrome, familial combined hyperlipidemia, or familial dysbetalipoproteinemia.

In some embodiments, a subject is resistant to a standard of care drug, e.g., to treat abnormal levels of lipids, such as, e.g., statins (e.g., statin-refractory subjects or statin non-responders). In some embodiments, a subject is intolerant to a standard of care drug, e.g., to treat abnormal levels of lipids, such as, e.g., statins, e.g., a subject exhibiting statin-associated muscle symptoms (SAMSs).

In some embodiments, a subject is a human subject. In some embodiments, a subject is a newborn (a preterm newborn, a full-term newborn), an infant up to one year of age, a young child (e.g., 1 year to 12 years), a teenager (e.g., 13-19 years), an adult (e.g., 20-64 years), or an elderly adult (e.g., 65 years and older).

In some embodiments, a method comprises administering the oligosaccharide composition to the intestines (e.g., the large intestine). In some embodiments, the oligosaccharide composition is self-administered to the subject. In some embodiments, the oligosaccharide composition is formulated as a pharmaceutical composition for oral delivery. In some embodiments, the oligosaccharide composition is orally administered to the subject. In some embodiments, the oligosaccharide composition is formulated as a pharmaceutical composition for delivery by a feeding tube. In some embodiments, the oligosaccharide composition is administered to the subject by a feeding tube.

In some embodiments, the oligosaccharide composition is administered to the subject once per day or twice per day.

In some embodiments, the oligosaccharide composition is co-administered to the subject with a standard-of-care treatment. In some embodiments, the standard-of-care treatment is administration of statins.

In some embodiments, a method reduces the concentration of lipids in the subject. In some embodiments, the concentration of lipids is reduced by at least 5%, 10%, 20%, or 30%, relative to a baseline measurement (e.g., wherein the baseline measurement is determined prior to treatment). In some embodiments, the lipids are cholesterol, very low-density lipoprotein (VLDL), low-density lipoprotein (LDL), non-esterified free fatty acids and/or triglycerides. In some embodiments, the cholesterol is liver cholesterol and/or blood cholesterol. In some embodiments, the triglycerides are liver triglycerides and/or blood triglycerides.

In some embodiments, a method decreases or diminishes liver steatosis and/or liver inflammation. In some embodiments, a method reduces atherosclerosis plaque formation. In some embodiments, a method supports the growth of bacterial genera within the microbiome of the gastrointestinal tract of the subject that do not promote dysbiosis.

In some embodiments, a method supports the growth of propionate-producing bacterial taxa. In some embodiments, a method supports the growth of Allistipes, *Blautia, Parabacteroides, Akkermansia*, Ruthenibacterium, *Subdoligranulum*, Bacteroidetes, Rickenellaceae, Tannerellaceae, Alistipes, *Parabacteroides* and/or Ruminococcaceae. In some embodiments, the method increases the relative abundance of one or more of bacterial taxa selected from the group consisting of Allistipes, *Blautia, Parabacteroides, Akkermansia*, Ruthenibacterium, *Subdoligranulum*, Bacteroidetes, Rickenellaceae, Tannerellaceae, Alistipes, *Parabacteroides* and/or Ruminococcaceae.

BRIEF DESCRIPTION OF THE DRAWINGS

In FIG. 2A, data sets that do not share the same letter designation (a, b or c) are statistically different from one another.

FIGS. 10A-10H provide graphs showing the effect of the selected oligosaccharide composition on fasting blood triglyceride (FIG. 10A), total serum cholesterol (FIG. 10B), very-low-density lipoprotein (VLDL) cholesterol (FIG. 10C), low-density lipoprotein (LDL) cholesterol (FIG. 10D), high-density lipoprotein (HDL) cholesterol (FIG. 10E), serum non-esterified fatty acids (NEFA) (FIG. 10F), liver triglycerides (FIG. 10G) and liver total cholesterol (FIG. 10H) after 15-16 weeks of treatment in a western diet (WD)-induced obese low density lipoprotein receptor knock-out (ldlr$^{-/-}$) mouse model. Data sets that do not share the same letter designation (a, b or c) are statistically different from one another.

FIGS. 11A-11H provide graphs showing the effect of the selected oligosaccharide composition on liver weight (FIG. 11A), liver weight relative to body weight (FIG. 11B), liver steatosis (FIG. 11C), inflammation (FIG. 11D), NAFLD activity score ("NAS") (FIG. 11E), aortic sinus plaque severity score (FIG. 11F), plaque area in the aortic sinus quantified by morphometric analysis of elastin trichome-stained sections (FIG. 11G), and plaque area in the aortic arch quantified by oil red O staining "en face" analysis (FIG. 11H) after 15-16 weeks of treatment in a western diet (WD)-induced obese low density lipoprotein receptor knock-out (ldlr$^{-/-}$) mouse model. Data sets in FIGS. 11A-11E that do not share the same letter designation (a, b or c) are statistically different from one another.

Figure 12:
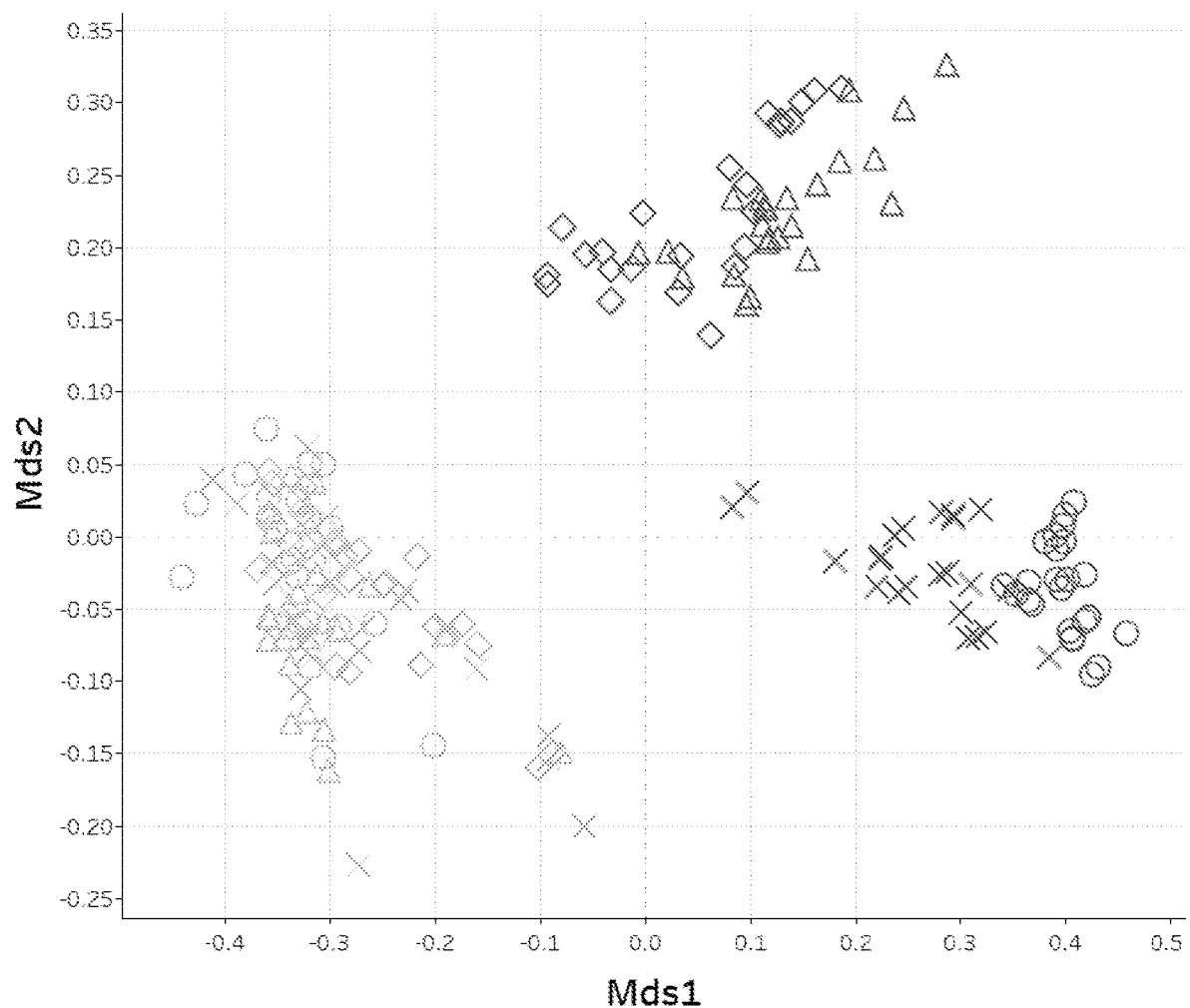

FIG. 12 provides a multidimensional scaling (MDS) ordination plot of fecal microbiomes from WD ldlr$^{-/-}$ mice treated with the selected oligosaccharide (circle), the glucose/galactose-based oligosaccharide (cross) or fenofibrate (triangle), or untreated (diamond) at one week before treatment initiation (light shading) or after 15 weeks of treatment (black shading).

Figure 13:
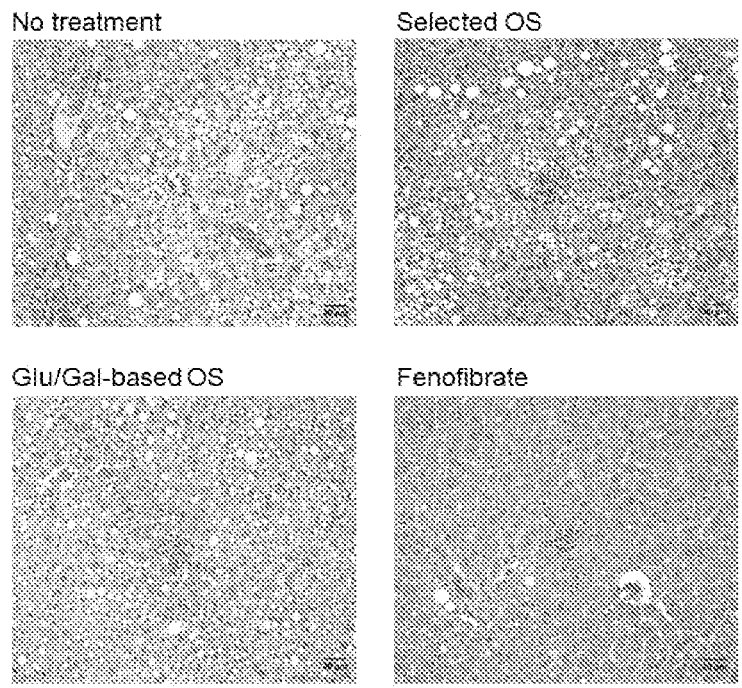

FIG. 13 provides representative images of liver histology for western diet (WD)-induced obese ldlr$^{-/-}$ mice treated with the selected oligosaccharide, the glucose/galactose-based oligosaccharide or liraglutide after 16 weeks of treatment.

Figure 14:
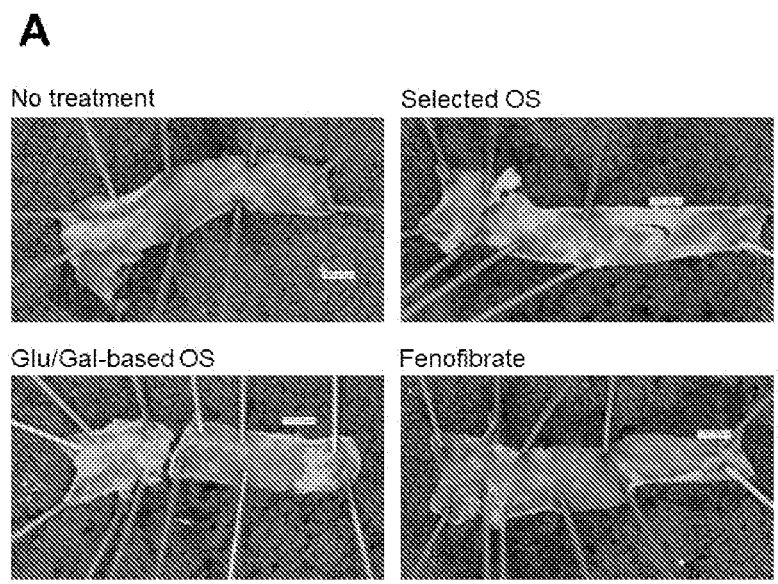
Figure 14:
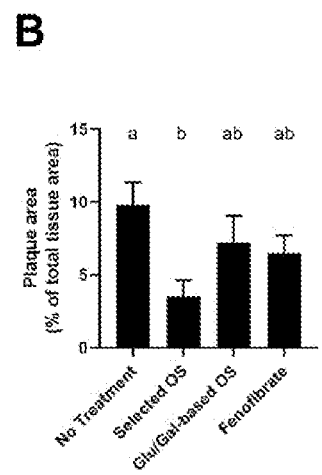

FIGS. 14A-14B provide images of histological staining (FIG. 14A) and quantification (FIG. 14B) of atherosclerotic plaque formation in the aortic arch of western diet (WD)-induced obese ldlr$^{-/-}$ mice after 16 weeks of treatment.

Figure 15:
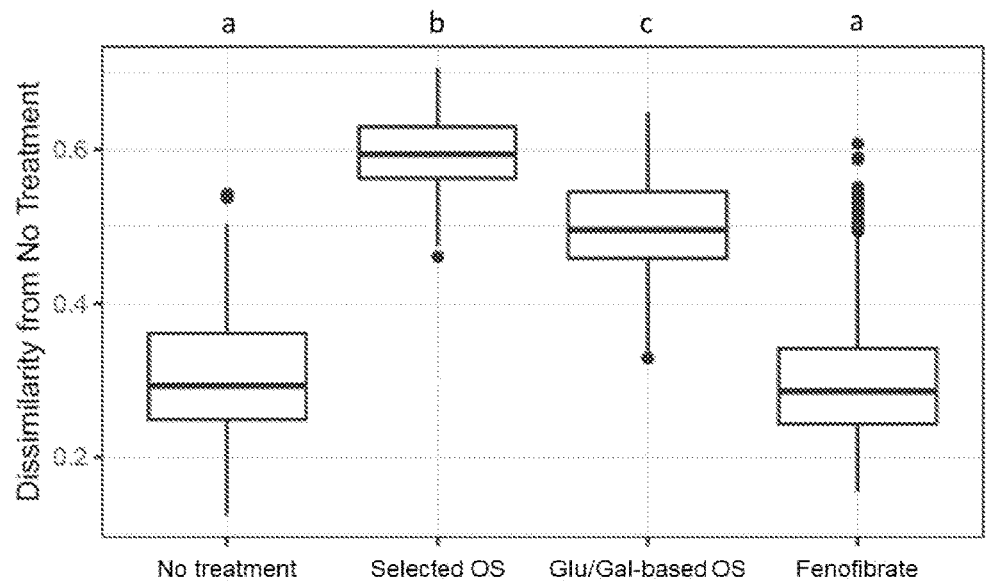

FIG. 15 provides a graph showing microbiome dissimilarity of western diet (WD)-induced obese ldlr$^{-/-}$ mice treated with the selected oligosaccharide, the glucose/galactose-based oligosaccharide or liraglutide relative to control HFD-induced mice (no treatment).

Figure 16A:
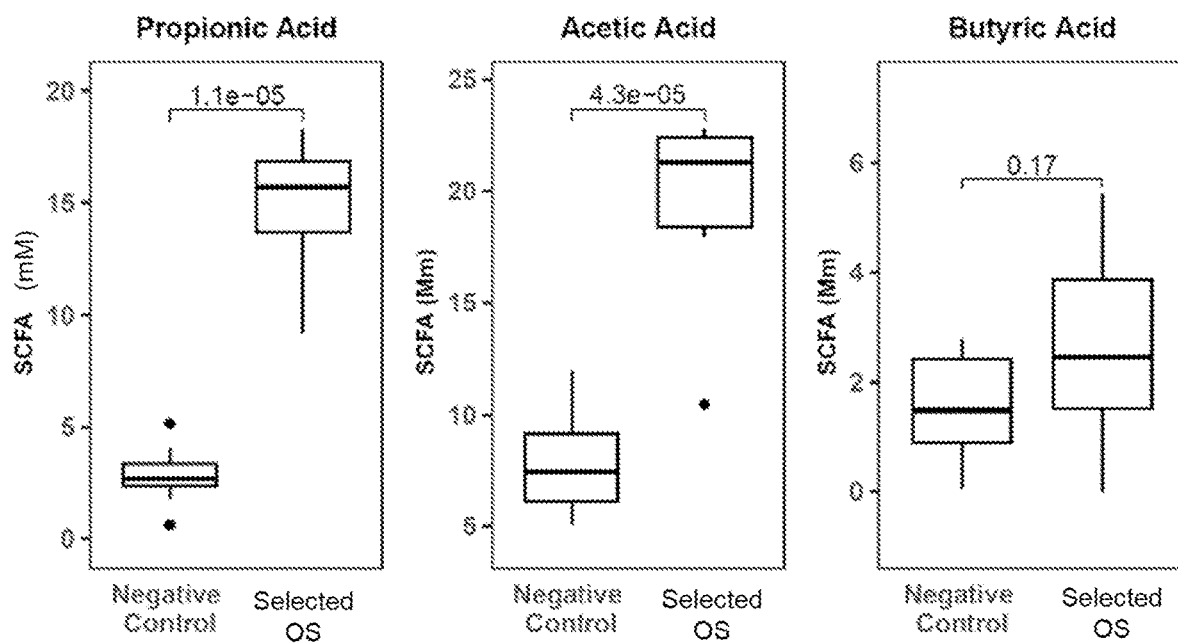
Figure 16B:
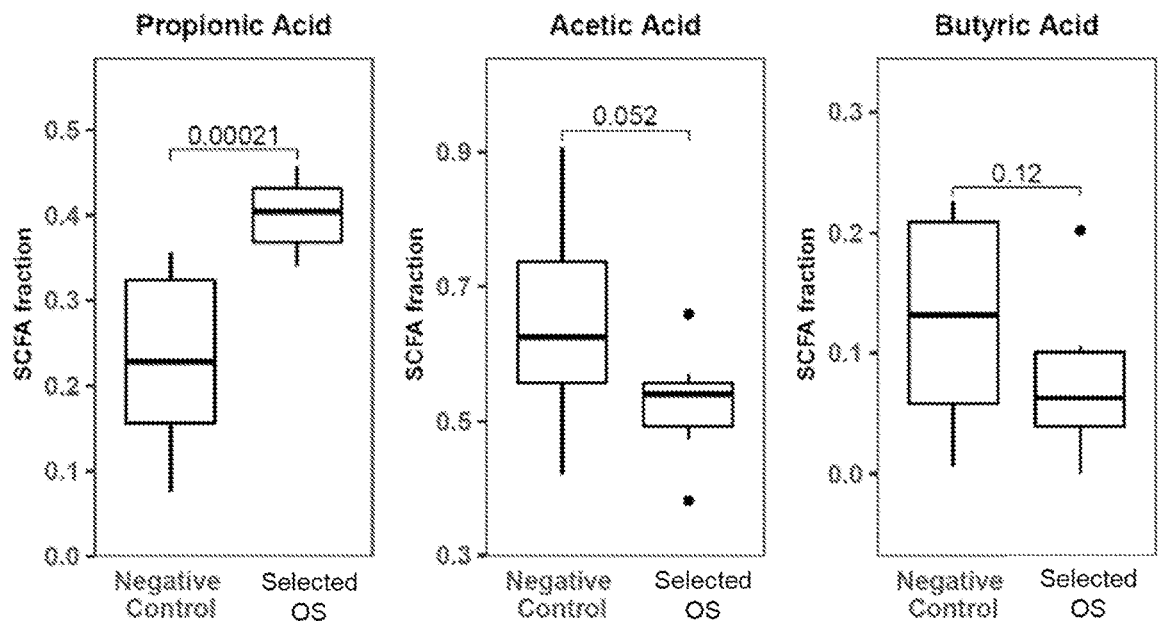

FIGS. 16A-16B provides graphs showing production of short-chain fatty acids (SCFAs) (propionic acid, acetic acid, and butyric acid) in an ex vivo assay in which fecal samples from 10 healthy subjects were incubated with the selected oligosaccharide composition ("selected OS") or a negative control (water). FIG. 16A provides the total amount of produced SCFA (in mM). FIG. 16B provides the percentage of each unique SCFA (propionic acid, acetic acid, and butyric acid) relative to total SCFA amount.

Figure 17A:
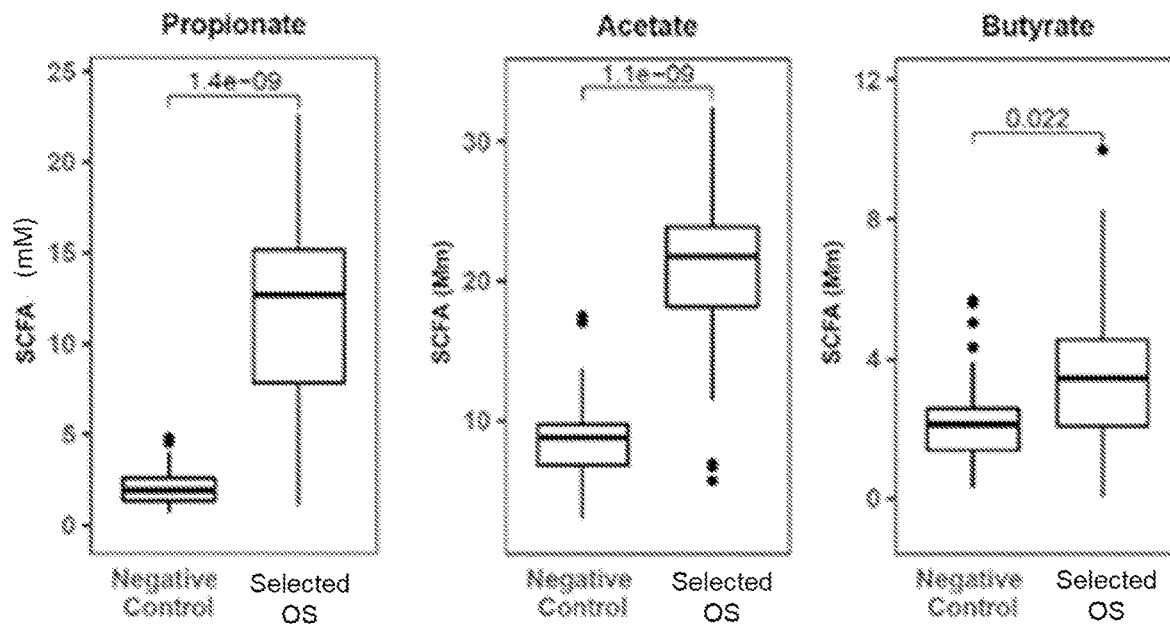
Figure 17B:
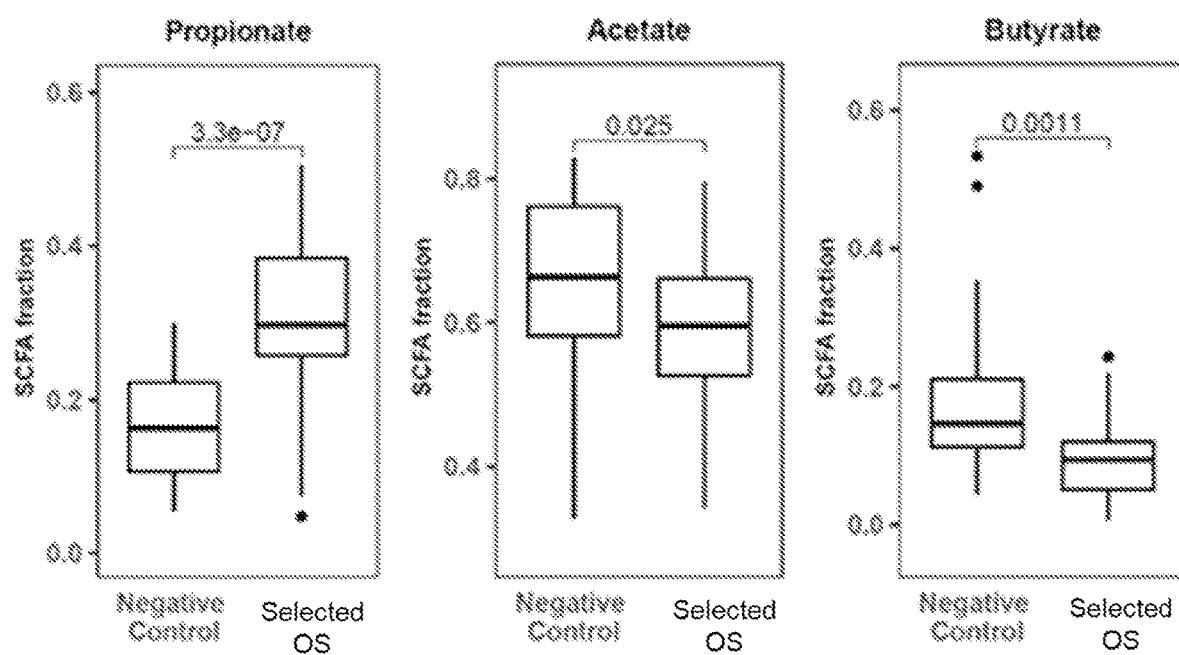

FIGS. 17A-17B provides graphs showing production of short-chain fatty acids (SCFAs) (propionic acid, acetic acid, and butyric acid) in an ex vivo assay in which fecal samples from 31 overweight subjects having type 2 diabetes (T2D) were incubated with the selected oligosaccharide composition ("selected OS") or a negative control (water). FIG. 17A provides the total amount of produced SCFA (in mM). FIG. 17B provides the percentage of each unique SCFA (propionic acid, acetic acid, and butyric acid) relative to total SCFA amount.

Figure 18A:
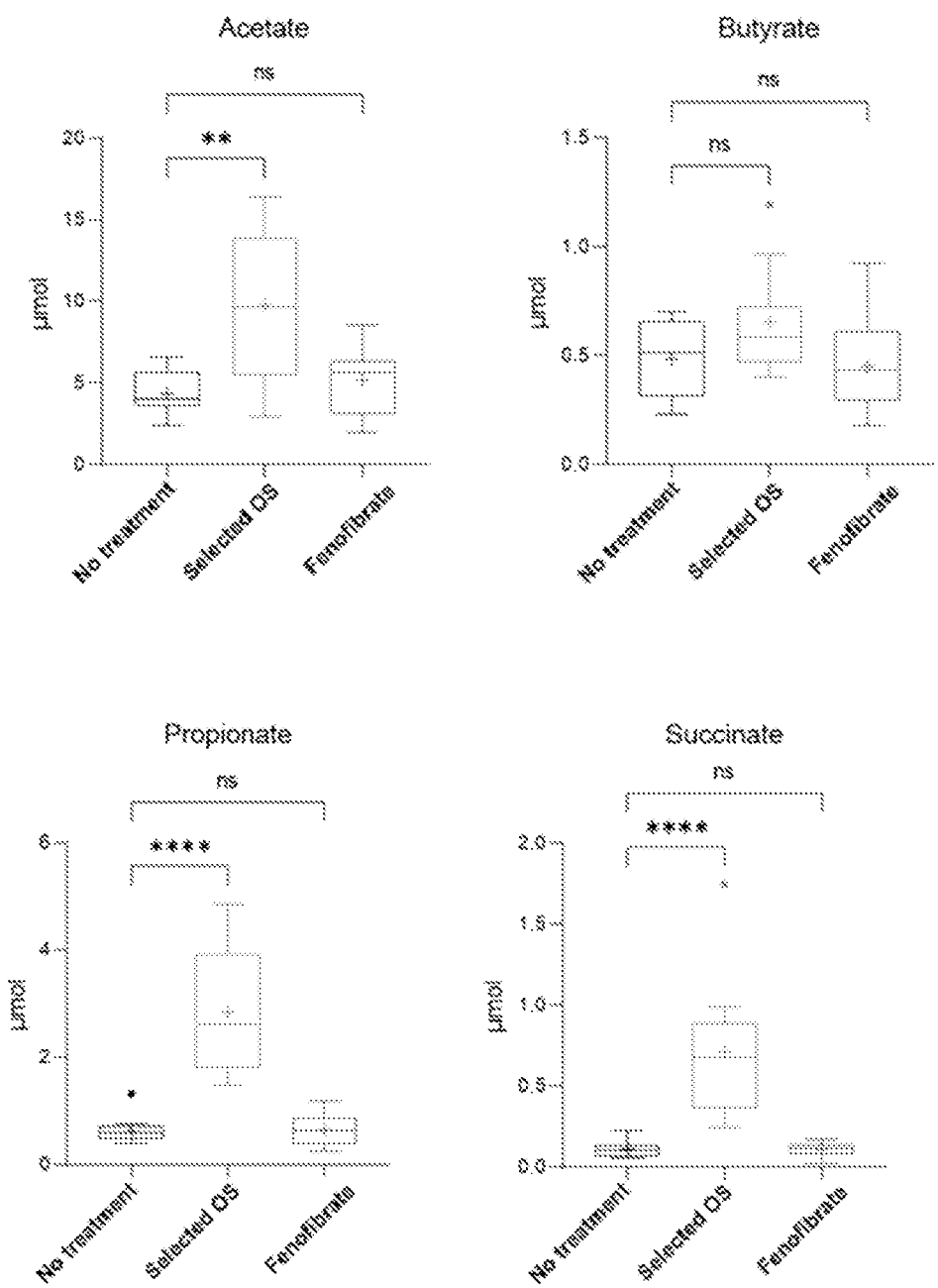
Figure 18B:
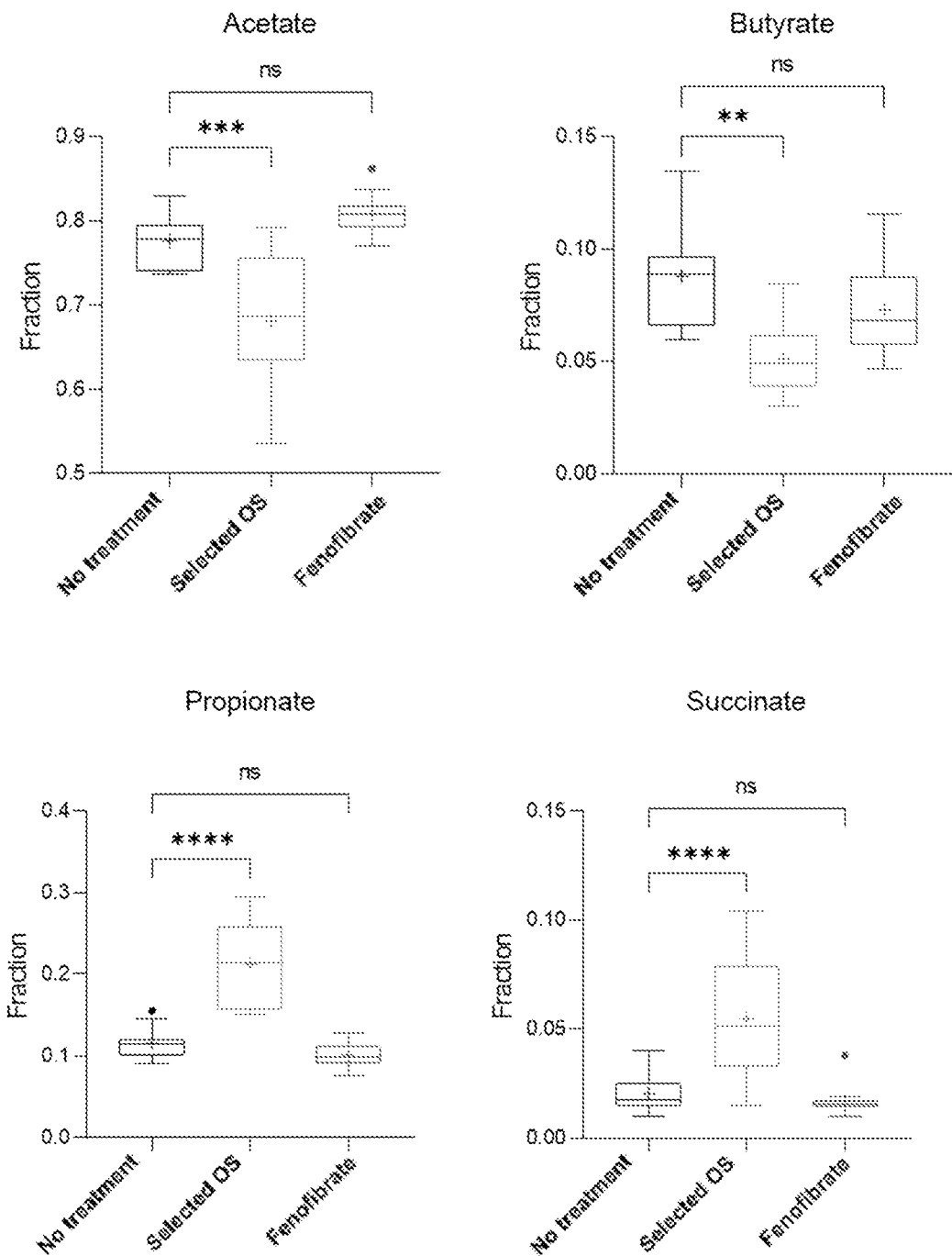

FIGS. 18A-18B provide graphs showing the effect of the selected oligosaccharide composition on production of short-chain fatty acids (SCFAs) (propionic acid, acetic acid, and butyric acid) and succinic acid in a western diet (WD)-induced obese low density lipoprotein receptor knock-out (ldlr$^{-/-}$) mouse model. FIG. 18A provides the total amount of produced SCFA (in µM). FIG. 18B provides the percentage of each unique SCFA (propionic acid, acetic acid, butyric acid) and succinic acid relative to total SCFA and succinic acid amount.

Figure 19:
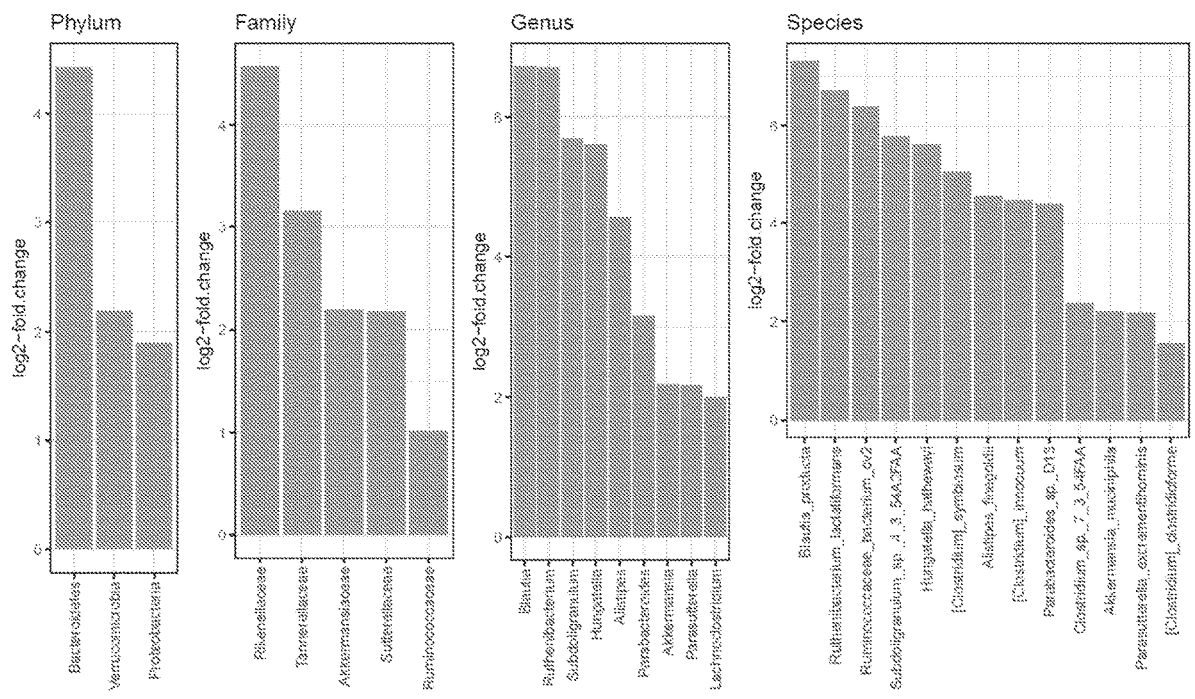

FIG. 19 provides graphs showing that the selected oligosaccharide composition promotes propionate-producing bacterial taxa (e.g., Bacteroidetes).

Figure 20A:
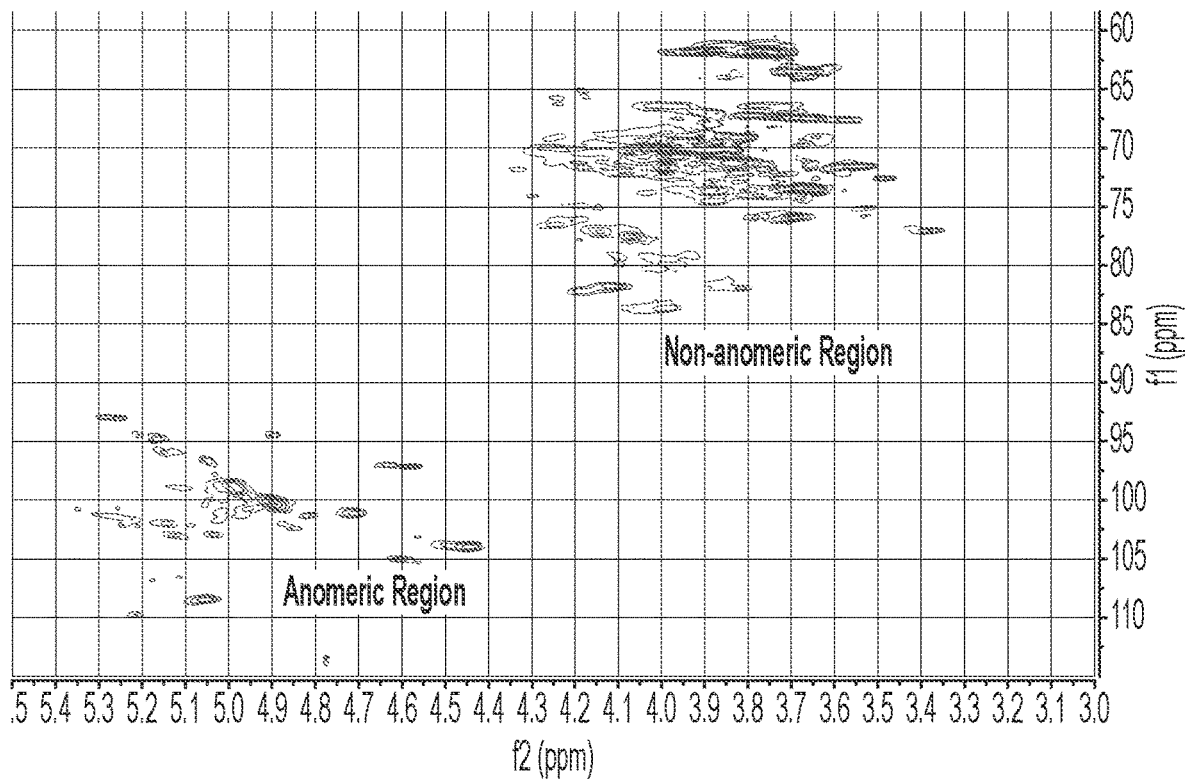
Figure 20B:
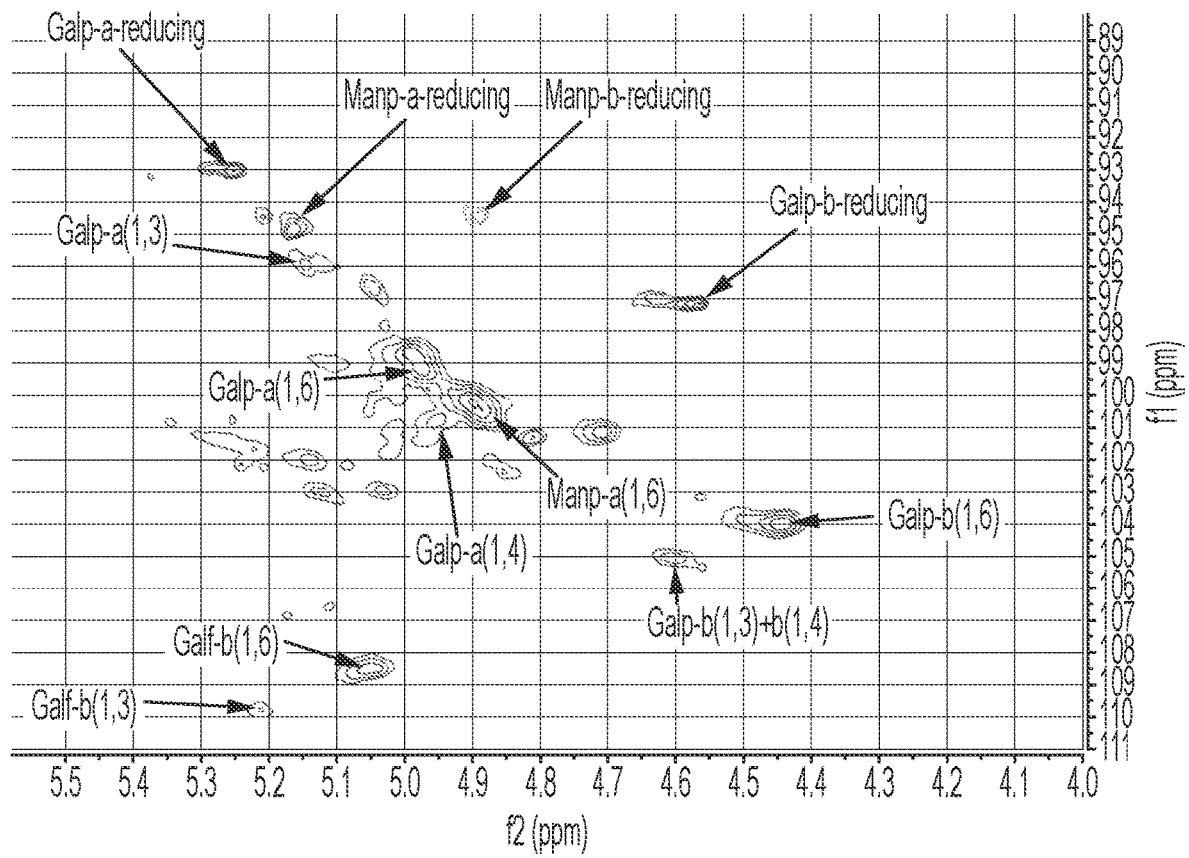

FIGS. 20A-20B provide representative HSQC NMR spectra of the selected oligosaccharide composition. FIG. 20A shows the anomeric and non-anomeric regions of an HSQC NMR spectra. FIG. 20B shows a representative HSQC NMR spectra of the selected oligosaccharide composition (anomeric region only) with assigned bond linkages.

DETAILED DESCRIPTION OF THE INVENTION

The compositions and methods described herein are based on the discovery that oligosaccharide compositions are useful for lowering lipid and/or glucose (e.g., blood) levels in a subject. In some embodiments, the oligosaccharide compositions described herein are useful for reducing levels of lipids, e.g., cholesterol, low-density lipoprotein (LDL) non-esterified free fatty acids and triglycerides (e.g., in the blood or in the liver). In some embodiments, the oligosaccharide compositions described herein are useful for reducing levels of glucose, e.g., blood glucose. Further, in some embodiments, the compositions and methods described herein are useful for the treatment of non-alcoholic fatty liver disease (NAFLD) or non-alcoholic steatohepatitis (NASH). Some aspects of the disclosure relate to a recognition that oligosaccharide compositions are useful for increasing levels of propionate (also referred to as propionic acid) in a subject.

Some aspects of the disclosure are based on the results of an extensive screening effort that was performed to identify oligosaccharide compositions that are capable of modulating, e.g., reducing, different types of levels of lipids, lipoproteins, and lipid esters, e.g., cholesterol, LDL, non-esterified free fatty acids and triglycerides, and levels of sugars, e.g., glucose, in a subject. Hundreds of unique oligosaccharide compositions were assayed for their effect on the microbiome of human gastrointestinal tracts in an ex vivo context. The oligosaccharide compositions examined in the screen were produced using different saccharide monomers, e.g., dextrose monomers, xylose monomers, etc., and under conditions involving differing reaction temperatures, for varying periods of time, and/or in the presence of different catalyst conditions.

From this screening effort, a selected oligosaccharide composition was identified as a highly effective modulator of glucose and/or lipid levels, e.g., levels of cholesterol, low density lipoprotein (LDL), non-esterified free fatty acids and triglycerides. Accordingly, in some embodiments, this oligosaccharide composition is particularly useful for treating subjects having diseases or disorders associated with elevated lipid and/or glucose levels. In some embodiments, the selected oligosaccharide composition is useful to reduce the levels of lipids (e.g., triglycerides, cholesterol and/or fat phospholipids) in a subject in need thereof. In some embodiments, the selected oligosaccharide composition is useful to treat a lipid and lipoprotein abnormality. In some embodiments, the selected oligosaccharide composition is useful to treat dyslipidemia. In some embodiments, the selected oligosaccharide composition is useful to prevent or delay the onset of dyslipidemia. In some embodiments, the selected oligosaccharide composition is useful to treat hyperlipidemia. In some embodiments, the selected oligosaccharide composition is useful to prevent or delay the onset of hyperlipidemia. In some embodiments, hyperlipidemia is primary (or familial), e.g., due to genetic causes. In some embodiments, hyperlipidemia is secondary (or acquired), e.g., as a result of another disease or condition (e.g., caused by lifestyle, diet, age, etc.). In some embodiments, the selected oligosaccharide composition is useful to prevent or delay the onset of diseases associated with abnormal lipid and/or glucose levels, such as, e.g., non-alcoholic fatty liver disease (NAFLD), non-alcoholic steatohepatitis (NASH), cardiovascular disease (CVD), type-2diabetes (T2D), and chronic kidney disease (CKC). In some embodiments, the selected oligosaccharide composition is useful to reduce the risk of a subject developing a disease associated with abnormal lipid and/or glucose levels, such as, e.g., non-alcoholic fatty liver disease (NAFLD), non-alcoholic steatohepatitis (NASH), cardiovascular disease (CVD), type two diabetes (T2D), and chronic kidney disease (CKC). Further aspects of the disclosure, including a description of defined terms, are provided below.

I. Definitions

Agitation conditions: As used herein, the term "agitation conditions" refers to conditions that promote or maintain a substantially uniform or homogeneous state of a mixture (e.g., a reaction mixture comprising galactose monomer and mannose monomer) with respect to dispersal of solids (e.g., solid catalysts), uniformity of heat transfer, or other similar parameters. Agitation conditions generally include stirring, shaking, and/or mixing of a reaction mixture. In some embodiments, agitation conditions may include the addition of gases or other liquids into a solution. In some embodiments, agitation conditions are used to maintain substantially uniform or homogenous distribution of a catalyst, e.g., an acid catalyst. In some embodiments, a monosaccharide preparation is heated in the presence of an acid catalyst under suitable conditions to achieve homogeneity and uniform heat transfer in order to synthesize an oligosaccharide composition.

Approximately: As used herein, the term "approximately" or "about," as applied to one or more values of interest, refers to a value that is similar to a stated reference value. In certain embodiments, the term "approximately" or "about" refers to a range of values that fall within 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Effective amount: As used herein, the term "effective amount" refers to an administered amount or concentration of an oligosaccharide composition that is necessary and sufficient to elicit a biological response, e.g., in a subject or patient. In some embodiments, an effective amount of an oligosaccharide composition is capable of modulating, e.g., increasing or decreasing, the activity or levels of an enzyme in a subject. In some embodiments, an effective amount of an oligosaccharide composition is capable of modulating, e.g., increasing or decreasing, the processing of a metabolite. In some embodiments, an effective amount of an oligosaccharide composition is capable of modulating, e.g., increasing or decreasing, the concentration or number of at least one microbial species. In some embodiments, an effective amount of an oligosaccharide composition is capable of modulating, e.g., decreasing, the symptoms of a disease associated with elevated pathogen colonization in a subject (e.g., the severity or number of symptoms). In some embodiments, an effective amount of an oligosaccharide composition is capable of reducing the acquisition of, colonization of, or reducing the reservoir of a pathogen (e.g., a drug or antibiotic resistant pathogen, or an MDR pathogen) in a subject. In some embodiments, an effective amount of an oligosaccharide composition is capable of treating a subject having intestinal colonization with a pathogen, e.g., CRE or VRE.

Galactose monomer: As used herein, the term "galactose monomer" generally refers to a D-isomer of a galactose monomer, known as $_D$-galactose.

Mannose monomer: As used herein, the term "mannose monomer" generally refers to a D-isomer of a mannose monomer, known as D mannose.

Monosaccharide Preparation: As used herein, the term "monosaccharide preparation" refers to a preparation that comprises two or more monosaccharides (e.g., galactose monomer and mannose monomer). In some embodiments, a monosaccharide preparation comprises galactose monomers and mannose monomers.

Oligosaccharide: As used herein, the term "oligosaccharide" (which may be used interchangeably with the term "oligosaccharide" in some contexts) refers to a saccharide molecule comprising at least two monosaccharides (e.g., galactose monomers, mannose monomers) linked together via a glycosidic bond (having a degree of polymerization (DP) of at least 2 (e.g., DP2+)). In some embodiments, an oligosaccharide comprises at least two, at least three, at least four, at least five, at least six, at least seven, at least eight, at least nine, or at least ten monosaccharides subunits linked by glycosidic bonds. In some embodiments, an oligosaccharide is in the range of 3-20, 4-16, 5-15, 8-12, 5-25, 10-25, 20-50, 40-80, or 75-100 monosaccharides linked by glycosidic bonds. In some embodiments, an oligosaccharide comprises at least one 1,2; 1,3; 1,4; and/or 1,6 glycosidic bond. Oligosaccharides may be linear or branched. Oligosaccharides may have one or more glycosidic bonds that are in alpha-configurations and/or one or more glycosidic bonds that are in beta-configurations.

Pharmaceutical Composition: As used herein, a "pharmaceutical composition" refers to a composition having pharmacological activity or other direct effect in the mitigation, treatment, or prevention of disease, and/or a finished dosage form or formulation thereof and is for human use. A pharmaceutical composition or pharmaceutical preparation is typically produced under good manufacturing practices (GMP) conditions. Pharmaceutical compositions or preparations may be sterile or non-sterile. If non-sterile, such pharmaceutical compositions or preparations typically meet the microbiological specifications and criteria for non-sterile pharmaceutical products as described in the U.S. Pharmacopeia (USP) or European Pharmacopoeia (EP). Any oligosaccharide composition described herein may be formulated as a pharmaceutical composition.

Subject: As used herein, the term "subject" refers to a human subject or patient. Subjects may include a newborn (a preterm newborn, a full-term newborn), an infant up to one year of age, young children (e.g., 1 yr to 12 yrs), teenagers, (e.g., 13-19 yrs), adults (e.g., 20-64 yrs), and elderly adults (65 yrs and older). In some embodiments, a subject is of a pediatric population, or a subpopulation thereof, including neonates (birth to 1 month), infants (1 month to 2 years), developing children (2-12 years), and adolescents (12-16 years). In some embodiments, a subject is a healthy subject. In some embodiments, a subject is a patient having elevated levels of lipids, e.g., cholesterol, LDL, non-esterified free fatty acids and triglycerides, relative to a healthy subject. In some embodiments, the has a lipid and lipoprotein abnormality. In some embodiments, the subject has one or more genetic defects associated with abnormal (e.g., elevated) levels of a lipid, such as, e.g., familial hypercholesterolemia, familial hyperlipoproteinemia, familial hyperchylomicronemia). In some embodiments, the subject has acquired a condition associated with abnormal (e.g., elevated) levels of a lipid, e.g., through lifestyle, diet or age. In some embodiments, the subject has or is suspected of having dyslipidemia. In some embodiments, the subject is at risk of developing dyslipidemia. In some embodiments, the subject has or is suspected of having hyperlipidemia. In some embodiments, the subject is at risk of developing hyperlipidemia. In some embodiments, the subject has primary (or familial) hyperlipidemia. In some embodiments, the subject has secondary (or acquired) hyperlipidemia. In some embodiments, the subject has or is suspected of having or is at risk of developing a diseases or condition associated with abnormal lipid and/or glucose levels, such as, e.g., non-alcoholic fatty liver disease (NAFLD), non-alcoholic steatohepatitis (NASH), cardiovascular disease (CVD), type-2 diabetes (T2D), and chronic kidney disease (CKC). In some embodiments, the subject has or is suspected of having or is at risk of developing metabolic syndrome, or shows one, two, three or more symptoms associated with metabolic syndrome. In some embodiments, a subject has or is suspected of having a cardiometabolic disorder or liver disease. In some embodiments, a subject has elevated levels of glucose (e.g., hyperglycemia). In some embodiments, a subject has elevated levels of insulin (e.g., hyperinsulinemia). In some embodiments, a subject has elevated levels of any other marker of type-2 diabetes (e.g., hemoglobin A1c (HbA1c), fructosamine, C-reactive protein (CRP)). In some embodiments, the subject exhibits a resistance to a standard of care drug, e.g., to treat abnormal levels of lipids, such as, e.g., statins (e.g., statin-refractory subjects or statin non-responders). In some embodiments, the subject exhibits an intolerance to a standard of care drug, e.g., to treat abnormal levels of lipids, such as, e.g., statins, e.g., a subject exhibiting statin-associated muscle symptoms (SAMSs).

Treatment and Treating: As used herein, the terms "treating" and "treatment" refer to the administration of a composition to a subject (e.g., a symptomatic subject afflicted with an adverse condition, disorder, or disease) so as to affect a reduction in severity and/or frequency of a symptom, eliminate a symptom and/or its underlying cause, and/or facilitate improvement or remediation of damage, and/or preventing an adverse condition, disorder, or disease in an asymptomatic subject who is susceptible to a particular adverse condition, disorder, or disease, or who is suspected of developing or at risk of developing the condition, disorder, or disease. In some embodiments, treating a subject with an oligosaccharide composition reduces the relative or absolute levels of lipids, e.g., cholesterol, LDL, non-esterified free fatty acids and triglycerides, in the subject. In some embodiments, treating a subject with an oligosaccharide composition reduces the relative or absolute levels of lipids, e.g., cholesterol, LDL, non-esterified free fatty acids and triglycerides, in the blood or liver of the subject. In some embodiments, treating a subject with an oligosaccharide composition reduces the severity of a disease associated with elevated lipid and/or glucose levels. In some embodiments, treating a subject with an oligosaccharide composition increases the lifespan of a person having or suspected of having a disease associated with elevated lipid and/or glucose levels. In some embodiments, treating a population of subjects with an oligosaccharide composition increases the average lifespan of treated persons having or suspected of having a disease associated with elevated lipid and/or glucose levels. In some embodiments, treating a subject with an oligosaccharide composition prevents the worsening, progression or onset of a disease or disorder associated with elevated lipid and/or glucose levels.

II. Oligosaccharide Compositions

Provided herein are oligosaccharide compositions, and their methods of use for modulating levels of lipids in a human subject.

In one aspect, oligosaccharide compositions are provided herein that comprise a plurality of oligosaccharides selected from Formula (I) and Formula (II):

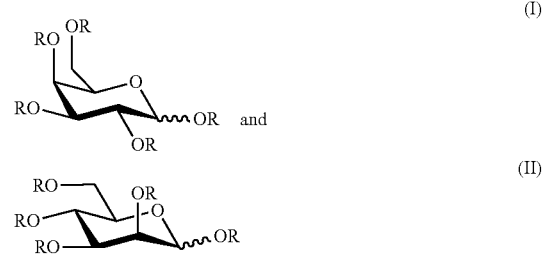

wherein R in Formula (I) and Formula (II) is independently selected from hydrogen, and Formulae (Ia), (Ib), (Ic), (Id), (IIa), (IIb), (IIc), (IId):

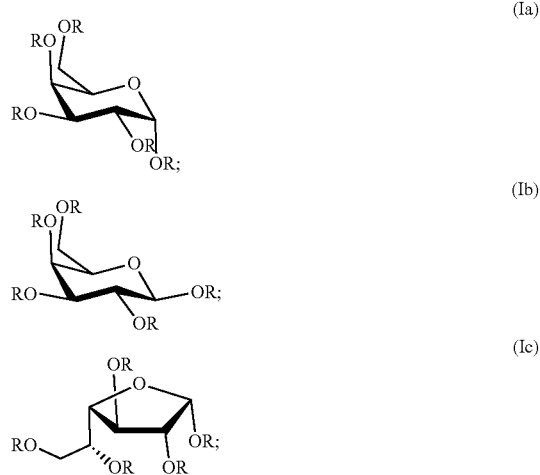

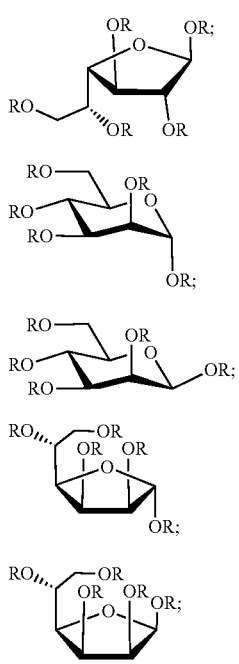

wherein R in Formulae (Ia), (Ib), (Ic), (Id), (IIa), (IIb), (IIc), and (IId) is independently defined as above in Formula (I) and Formula (II).

In some embodiments, oligosaccharide compositions are produced by a process that initially involves heating a preparation comprising galactose monomers and mannose monomers to a temperature in a range of 100° C. to 160° C., 100° C. to 120° C., 110° C. to 130° C., 120° C. to 140° C., 130° C. to 150° C., or about 135° C. The ratio of galactose monomers to mannose monomers may be 3:2. Heating may be performed under agitation conditions. Heating may comprise gradually increasing the temperature (e.g., from room temperature) to about 130° C., about 135° C. about 140° C. about 145° C., or about 150° C. under suitable conditions to achieve homogeneity and uniform heat transfer.

An acid catalyst comprising positively charged hydrogen ions is added to the preparation (e.g., before heating). In some embodiments, the acid catalyst is a solid catalyst. In some embodiments, the catalyst is a strong acid cation exchange resin having one or more physical and chemical properties according to Table 1. In some embodiments, the catalyst comprises >3.0 mmol/g sulfonic acid moieties and <1.0 mmol/gram cationic moieties. In certain embodiments, the catalyst has a nominal moisture content of 45-50 weight percent. In some embodiments, the catalyst is a soluble catalyst, e.g., an organic acid catalyst. In some embodiments, the catalyst is citric acid, acetic acid, butyric acid or propionic acid. In certain embodiments, the catalyst is added at the same time as the galactose monomers and mannose monomers.

TABLE 1

Non-Limiting Example of Strong Acid Cation Exchange Resin Properties

| | |
|---|---|
| Physical Form | Amber translucent spherical beads |
| Matrix | Styrene-DVB, gel |

TABLE 1-continued

Non-Limiting Example of Strong Acid Cation Exchange Resin Properties

| | | |
|---|---|---|
| Function group | | Sulfonic acid |
| Ionic form as shipped | | H$^+$ form |
| Total volume capacity, min. | eq/L | 1.8 |
| | kgr/ft$^3$ as CaCO$_3$ | 39.3 |
| Moisture retention capacity | % | 50-56 |
| Particle size | | |
| Uniformity coefficient, max. | | 1.1 |
| Harmonic mean diameter | μm | 600 ± 50 |
| Whole uncracked beads | % | 95-100 |
| Total swelling (Na$^+$ → H$^+$) | % | 8 |
| Particle density | g/mL | 1.2 |
| Shipping density | g/L | 800 |
| | lbs/ft$^3$ | 50 |

In some embodiments, after loading of the catalyst with the preparation, the resultant reaction mixture is held at atmospheric pressure and at a temperature in a range of 100° C. to 160° C., 100° C. to 120° C., 110° C. to 130° C., 120° C. to 140° C., 130° C. to 150° C., or about 135° C. under conditions that promote acid catalyzed oligosaccharide formation. In some embodiments, once the weight percent of total monomer content in the oligosaccharide composition (total monomer content comprises the amount of galactose monomer and/or mannose monomer) is in a range of 2-14% (optionally 2-5%, 4-8%, 7-10%, 9-14%, or 8-12%), the reaction mixture is quenched. Quenching typically involves using water (e.g., deionized water) to dilute the reaction mixture, and gradually decrease the temperature of the reaction mixture to 55° C. to 95° C. In some embodiments, the water used for quenching is about 95° C. The water may be added to the reaction mixture under conditions sufficient to avoid solidifying the mixture. In certain embodiments, water may be removed from the reaction mixture by evaporation. In some embodiments, the reaction mixture may contain 50-55 weight percent dissolved solids. Finally, to obtain a purified oligosaccharide composition, the composition is typically by diluting the quenched reaction mixture with water to a concentration of about 35-50 weight percent and a temperature of below about 85° C. and then passing the mixture through a filter or a series of chromatographic resins. In some embodiments, the composition is separated from the acid catalyst. In certain embodiments, the filter used is a 0.45 μm filter. Alternatively, a series of chromatographic resins may be used and generally involves a cationic exchange resin, an anionic exchange resin, and/or a decolorizing polymer resin. In some embodiments, any or all of the types of resins may be used one or more times in any order. In some embodiments, the oligosaccharide composition comprises water at a level below that which is necessary for microbial growth upon storage at room temperature.

In certain embodiments, the mean degree of polymerization of all oligosaccharides is in a range of 6-19, optionally 11-16. In some embodiments, the oligosaccharide composition comprises water in a range of 45-55 weight percent. In some embodiments, the oligosaccharide composition comprises oligosaccharides that have a MWw (weight-average molecular weight) (g/mol) in a range of 1807-2985. In some embodiments, the oligosaccharide composition comprises oligosaccharides that have a MWn (number-average molecular weight) (g/mol) in a range of 1322-2073. In some embodiments, a solution comprising the oligosaccharide composition has a pH in a range of 2.50-3.50. In some embodiments, the oligosaccharide composition comprises oligomers having two or more repeat units (DP2+) in a range of 89-93 weight percent.

Further, in some embodiments, oligosaccharide compositions may be de-monomerized. In some embodiments, de-monomerization involves the removal of residual saccharide monomers. In some embodiments, de-monomerization is performed using chromatographic resin. Accordingly, in some embodiments, different compositions can be prepared depending upon the percent of monomer present. In some embodiments, oligosaccharide compositions are de-monomerized to a monomer content of about 1%, about 3%, about 5%, about 10%, or about 15%. In some embodiments, oligosaccharide compositions are de-monomerized to a monomer content of about 1-3%, about 3-6%, about 5-8%, about 7-10%, or about 10-15%. In one embodiment, the oligosaccharide compositions is de-monomerized to a monomer content of less than 1%. In one embodiment, the oligosaccharide composition is de-monomerized to a monomer content between about 7% and 10%. In one embodiment, the oligosaccharide compositions is de-monomerized to a monomer content between about 1% and 3%. In one embodiment, de-monomerization is achieved by osmotic separation. In a second embodiment de-monomerization is achieved by tangential flow filtration (TFF). In a third embodiment de-monomerization is achieved by ethanol precipitation.

In some embodiments, oligosaccharide compositions with different monomer contents may also have different measurements for total dietary fiber, moisture, total dietary fiber (dry basis), or percent Dextrose Equivalent (DE). In some embodiments, total dietary fiber is measured according to the methods of AOAC 2011.25. In some embodiments, moisture is measured by using a vacuum oven at 60° C. In some embodiments, total dietary fiber is (dry basis) is calculated. In some embodiments, the percent DE is measured according to the Food Chemicals Codex (FCC).

In some embodiments, the oligosaccharide compositions have a total dietary fiber content of 58-65 percent (on dry basis). In some embodiments, the oligosaccharide compositions have a total dietary fiber content of 50-80, 55-80, 60-80, 50-70, 55-70, 60-70, 50-65, 55-65, ot 60-65 percent (on dry basis). In some embodiments, the oligosaccharide compositions have a total dietary fiber content of about 50, about 55, about 58, about 60, about 62, or about 65 percent (on dry basis). In some embodiments, the oligosaccharide compositions have a total dietary fiber content of 50-95 percent (on dry basis).

In some embodiments, the oligosaccharide compositions have a total reducing sugar content (Dextrose Equivalence (DE) (dry solids)) of 5-40 percent.

In some embodiments, production of oligosaccharides compositions according to methods provided herein can be performed in a batch process or a continuous process. For example, in one embodiment, oligosaccharide compositions are produced in a batch process, where the contents of the reactor are subjected to agitation conditions (e.g., continuously mixed or blended), and all or a substantial amount of the products of the reaction are removed (e.g., isolated and/or recovered).

In certain embodiments, the methods of using the catalyst are carried out in an aqueous environment. One suitable aqueous solvent is water, which may be obtained from various sources. Generally, water sources with lower concentrations of ionic species (e.g., salts of sodium, phosphorous, ammonium, or magnesium) may be used, in some embodiments, as such ionic species may reduce effectiveness of the catalyst. In some embodiments where the aqueous solvent is water, the water has less than 10% of ionic species (e.g., salts of sodium, phosphorous, ammonium, magnesium). In some embodiments where the aqueous solvent is water, the water has a resistivity of at least 0.1 megaohm-centimeters, of at least 1 megaohm-centimeters, of at least 2 megaohm-centimeters, of at least 5 megaohm-centimeters, or of at least 10 megaohm-centimeters.

In some embodiments, as reactions of methods provided herein progress, water (such as evolved water) is produced with each glycosidic coupling of the one or more saccharide monomer. In certain embodiments, the methods described herein may further include monitoring the amount of water present in the reaction mixture and/or the ratio of water to monomer or catalyst over a period of time. Thus, in some embodiments, the water content of the reaction mixture may be altered over the course of the reaction, for example, removing evolved water produced. Appropriate methods may be used to remove water (e.g., evolved water) in the reaction mixture, including, for example, by evaporation, such as via distillation. In some embodiments, the method comprises including water in the reaction mixture. In certain embodiments, the method comprises removing water from the reaction mixture through evaporation.

In some embodiments, the ratio of galactose monomer to mannose monomer is about 1:4, 1:3, 1:2, 2:3, 1:1, 3:2, 2:1, 3:1, or 4:1. In some embodiments, the ratio of galactose monomer to mannose monomer is about 3:2.

In some embodiments, the monosaccharide preparation comprises about 40-80% galactose monomer and 20-60% mannose monomer. In some embodiments, the monosaccharide preparation comprises about 50-70% galactose monomer and about 30-50% mannose monomer. In some embodiments, the monosaccharide preparation comprises about 60% galactose monomer and about 40% mannose monomer.

In certain embodiments, the preparation is loaded with an acid catalyst comprising positively charged hydrogen ions. In some embodiments, an acid catalyst is a solid catalyst (e.g., Dowex Marathon C). In some embodiments, an acid catalyst is a soluble catalyst (e.g., citric acid).

In some embodiments, the molar ratio of positively charged hydrogen ions to total galactose monomer and mannose monomer content is in an appropriate range. In some embodiments, the molar ratio of positively charged hydrogen ions to total galactose monomer and mannose monomer content is in a range of 0.01 to 0.1, 0.02 to 0.08, 0.03 to 0.06, or 0.05 to 0.06. In some embodiments, the molar ratio of positively charged hydrogen ions to total galactose monomer and mannose monomer content is in a range of 0.003 to 0.01, 0.005 to 0.02, 0.01 to 0.02, 0.01 to 0.03, 0.02 to 0.03, 0.02 to 0.04, 0.03 to 0.05, 0.03 to 0.08, 0.04 to 0.07, 0.05 to 0.1, 0.05 to 0.2, 0.1 to 0.2, 0.1 to 0.3, or 0.2 to 0.3. In some embodiments, the molar ratio of positively charged hydrogen ions to total galactose monomer and mannose monomer content is in a range of 0.050 to 0.052. In some embodiments, the molar ratio of positively charged hydrogen ions to total galactose monomer and mannose monomer content is in a range of 0.020 to 0.035.

In some embodiments, the molar ratio of soluble acid catalyst (e.g., citric acid catalyst) to total galactose monomer and mannose monomer content is in an appropriate range. In some embodiments, the molar ratio of soluble acid catalyst (e.g., citric acid catalyst) to total galactose monomer and mannose monomer content is in a range of 0.01 to 0.1, 0.02 to 0.08, 0.03 to 0.06, or 0.05 to 0.06. In some embodiments, the molar ratio of soluble acid catalyst (e.g., citric acid catalyst) to total galactose monomer and mannose monomer content is in a range of 0.003 to 0.01, 0.005 to 0.02, 0.01 to 0.02, 0.01 to 0.03, 0.02 to 0.03, 0.02 to 0.04, 0.03 to 0.05, 0.03 to 0.08, 0.04 to 0.07, 0.05 to 0.1, 0.05 to 0.2, 0.1 to 0.2, 0.1 to 0.3, or 0.2 to 0.3. In some embodiments, the molar ratio of soluble acid catalyst (e.g., citric acid catalyst) to total galactose monomer and mannose monomer content is in a range of 0.050 to 0.052. In some embodiments, the molar ratio of soluble acid catalyst (e.g., citric acid catalyst) to total galactose monomer and mannose monomer content is in a range of 0.020 to 0.035.

In some embodiments, water is added to the reaction mixture to quench the reaction by bringing the temperature of the reaction mixture to 100° C. or below. In some embodiments, the water used for quenching is deionized water. In some embodiments, the water used for quenching is USP water. In some embodiments, the water has a temperature of about 60° C. to about 100° C. In certain embodiments, the water used for quenching is about 95° C. In some embodiments, the water is added to the reaction mixture under conditions sufficient to avoid solidifying the mixture.

The viscosity of the reaction mixture may be measured and/or altered over the course of the reaction. In general, viscosity refers to a measurement of a fluid's internal resistance to flow (e.g., "thickness") and is expressed in centipoise (cP) or pascal-seconds. In some embodiments, the viscosity of the reaction mixture is between about 100 cP and about 95,000 cP, about 5,000 cP and about 75,000 cP, about 5,000 and about 50,000 cP, or about 10,000 and about 50,000 cP. In certain embodiments, the viscosity of the reaction mixture is between about 50 cP and about 200 cP.

In some embodiments, oligosaccharide compositions provided herein may be subjected to one or more additional processing steps. Additional processing steps may include, for example, purification steps. Purification steps may include, for example, separation, demonomerization, dilution, concentration, filtration, desalting or ion-exchange, chromatographic separation, or decolorization, or any combination thereof.

In certain embodiments, the methods described herein further include a dilution step. In some embodiments, deionized water is used for dilution. In certain embodiments, USP water is used for dilution. In certain embodiments, after dilution, the oligosaccharide composition comprises water in a range of about 5-75, 25-65, 35-65, 45-55, or 47-53 weight percent. In certain embodiments, after dilution, the oligosaccharide composition comprises water in a range of about 45-55 weight percent.

In some embodiments, the methods described herein further include a decolorization step. The one or more oligosaccharide compositions produced may undergo a decolorization step using appropriate methods, including, for example, treatment with an absorbent, activated carbon, chromatography (e.g., using ion exchange resin), and/or filtration (e.g., microfiltration).

In some embodiments, the one or more oligosaccharide compositions produced are contacted with a material to remove salts, minerals, and/or other ionic species. For example, in certain embodiments, the one or more oligosaccharide compositions produced are flowed through an anionic exchange column. In other embodiments, oligosaccharide compositions produced are flowed through an anionic/cationic exchange column pair.

In some embodiments, the methods described herein may further include a concentration step. For example, in some embodiments, the oligosaccharide compositions may be subjected to evaporation (e.g., vacuum evaporation) to produce a concentrated oligosaccharide composition. In other embodiments, the oligosaccharide compositions may be subjected to a spray drying step to produce an oligosaccharide powder. In certain embodiments, the oligosaccharide compositions may be subjected to both an evaporation step and a spray drying step. In some embodiments, the oligosaccharide compositions be subjected to a lyophilization (e.g., freeze drying) step to remove water and produce powdered product.

In some embodiments, the methods described herein further include a fractionation step. Oligosaccharide compositions prepared and purified may be subsequently separated by molecular weight using any method known in the art, including, for example, high-performance liquid chromatography, adsorption/desorption (e.g., low-pressure activated carbon chromatography), or filtration (for example, ultrafiltration or diafiltration). In certain embodiments, oligosaccharide compositions are separated into pools representing 60%, 65%, 70%, 75%, 80%, 85%, 90%, 95%, 97%, 98%, or greater than 98% short (about DP1-2), medium (about DP3-10), long (about DP11-18), or very long (about DP>18) species.

In certain embodiments, prepared oligosaccharide compositions are fractionated by adsorption onto a carbonaceous material and subsequent desorption of fractions by washing the material with mixtures of an organic solvent in water at a concentration of 1%, 5%, 10%, 20%, 50%, or 100%. In one embodiment, the adsorption material is activated charcoal. In another embodiment, the adsorption material is a mixture of activated charcoal and a bulking agent such as diatomaceous earth or Celite 545 in 5%, 10%, 20%, 30%, 40%, or 50% portion by volume or weight.

In further embodiments, prepared oligosaccharide compositions are separated by passage through a high-performance liquid chromatography system. In certain variations, prepared oligosaccharide compositions are separated by ion-affinity chromatography, hydrophilic interaction chromatography, or size-exclusion chromatography including gel-permeation and gel-filtration.

In some embodiments, catalyst is removed by filtration. In certain embodiments, a 0.45 µm filter is used to remove catalyst during filtration. In other embodiments, low molecular weight materials are removed by filtration methods. In certain variations, low molecular weight materials may be removed by dialysis, ultrafiltration, diafiltration, or tangential flow filtration. In certain embodiments, the filtration is performed in static dialysis tube apparatus. In other embodiments, the filtration is performed in a dynamic flow filtration system. In other embodiments, the filtration is performed in centrifugal force-driven filtration cartridges. In certain embodiments, the reaction mixture is cooled to below about 85° C. before filtration.

In certain embodiments, the mean degree of polymerization of all oligosaccharides is in a range of 6-19. In certain embodiments, the mean degree of polymerization of all oligosaccharides is in a range of 11-16. In certain embodiments, the mean degree of polymerization of all oligosaccharides is in a range of 9-17. In some embodiments, the mean degree of polymerization of all oligosaccharides is in a range of 5-20, 6-19, 11-16, 12-18, 10-17, 7-15, 7-12, 7-10, 7-8, 9-10, 10-11, 11-12, 11-15, 12-13, 12-14 13-14, 14-15, 15-16, 17-18, 15-20, 3-8, 4-7, or 5-6. In some embodiments, the mean degree of polymerization (DP) of all oligosaccharides is about 6, about 7, about 8, about 9, about 10, about 11, about 12, about 13, about 14, about 15, about 16, about 17, about 18, or about 19.

In certain embodiments, the weight percent of galactose monomer and mannose monomer in the oligosaccharide composition is in a range of 7-12. In certain embodiments, the weight percent of galactose monomer and mannose monomer in the oligosaccharide composition is in a range of 10-12. In certain embodiments, the weight percent of galactose monomer and mannose monomer in the oligosaccharide composition is in a range of 12-16. In certain embodiments, the weight percent of galactose monomer and mannose monomer in the oligosaccharide composition is in a range of 13-15.

In some embodiments, the oligosaccharide composition is a mixture of polymers of galactose and mannose in proportions of approximately 60% and 40% by weight respectively. In some embodiments, the formula is H—[$C_6H_{9-11}O_5$]$_n$—OH, where the total number of monomer units in a single polymer of the mixture ranges from 2 to approximately 60 (n=2-60), with a mean value for the mixture of approximately 14.3 monomer units. Each monomer unit may be unsubstituted, singly, doubly, or triply substituted with another galactose or mannose unit by any glycosidic isomer.

In some embodiments, the oligosaccharide composition comprises water in a range of 5-75 weight percent. In some embodiments, the oligosaccharide composition comprises water in a range of 25-65 weight percent. In some embodiments, the oligosaccharide composition comprises water in a range of 35-65 weight percent. In some embodiments, the oligosaccharide composition comprises water in a range of 45-55 weight percent.

In some embodiments, the oligosaccharide composition comprises oligosaccharides that have a MWw (g/mol) in a range of 1807-2985. In some embodiments, the oligosaccharide composition comprises oligosaccharides that have a MWw (g/mol) in a range of 1510-3124. In some embodiments, the oligosaccharide composition comprises oligosaccharides that have a MWw (g/mol) in a range of 1500-2000, 1700-2200, 1900-2400, 2100-2600, 2300-2800, 2500-3000, or 2700-3200.

In some embodiments, the oligosaccharide composition comprises oligosaccharides that have a MWn (g/mol) in a range of 1322-2073. In some embodiments, the oligosaccharide composition comprises oligosaccharides that have a MWn (g/mol) in a range of 1238-2295. In some embodiments, the oligosaccharide composition comprises oligosaccharides that have a MWn (g/mol) in a range of 1200-1500, 1300-1600, 1400-1700, 1500-1800, 1600-1900, 1700-2000, 1800-2100, 1900-2200, 2000-2300, or 2100-2500.

In some embodiments, a solution comprising the oligosaccharide composition has a pH in a range of 1.50-6.00. In some embodiments, a solution comprising the oligosaccharide composition has a pH in a range of 1.50-5.00. In some embodiments, a solution comprising the oligosaccharide composition has a pH in a range of 2.00-4.00. In some embodiments, a solution comprising the oligosaccharide composition has a pH in a range of 2.50-3.50.

In some embodiments, the oligosaccharide composition comprises oligosaccharides that have a degree of branching in a range of about 10% to about 35%. In some embodiments, the oligosaccharide composition comprises oligosaccharides that have a degree of branching in a range of about 15% to about 30%. In some embodiments, the oligosaccharide composition comprises oligosaccharides that have a degree of branching in a range of 5-50%, 5-40%, 5-30%, 5-20%, 5-15%, 10-50%, 10-40%, 10-30%, 10-25%, 15-30%, or 15-20%.

In some embodiments, the oligosaccharide composition comprises oligomers having two or more repeat units (DP2+) in a range of 80-100 weight percent. In some embodiments, the oligosaccharide composition comprises oligomers having two or more repeat units (DP2+) in a range of 89-93 weight percent. In some embodiments, the oligosaccharide composition comprises oligomers having two or more repeat units (DP2+) in a range of 85-95 weight percent. In some embodiments, the oligosaccharide composition comprises oligomers having two or more repeat units (DP2+) in a range of 80-85, 85-87, 86-88, 87-90, 88-91, 89-92, 90-93, 91-94, 92-95, 93-96, or 95-98 weight percent.

In some embodiments, the oligosaccharide composition has a polydispersity index (PDI) of 1.8-2.4. In some embodiments, the oligosaccharide composition has a polydispersity index (PDI) of 2.0-2.3. In some embodiments, the oligosaccharide composition has a PDI of 1.0-1.2, 1.2-1.3, 1.3-1.4, 1.4-1.5, 1.5-1.6, 1.7-1.8, 1.8-2.0, 2.0-2.2, 2.2-2.4, or 2.4-2.6. In some embodiments, the oligosaccharide composition has a PDI of about 1.6, about 1.7, about 1.8, about 1.9, about 2.0, about 2.1, about 2.2, about 2.3, or about 2.4.

In some embodiments, the MWw, MWn, PDI, monomer content (DP1) and/or DP2+ values of oligosaccharides in an oligosaccharide composition are determined using the size exclusion chromatography method described in Example 5.

In some embodiments, the oligosaccharide composition comprises oligomers having at least three linked monomer units (DP3+) in a range of 80-95 weight percent. In some embodiments, the oligosaccharide composition comprises oligomers having at least three linked monomer units (DP3+) in a range of 80-85, 85-87, 86-88, 87-90, 88-91, 89-92, 90-93, 91-94, or 92-95 weight percent.

In some embodiments, the oligosaccharide composition comprises 11.1% to 16.0% monomer (DP1). In some embodiments, the oligosaccharide composition comprises 5% to 10%, 7% to 12%, 11% to 18%, 10% to 15%, or 12% to 17% monomer (DP1). In some embodiments, the oligosaccharide composition comprises 84% to 89% oligomers having at least two linked monomer units (DP2+). In some embodiments, the oligosaccharide composition comprises 80% to 81%, 81% to 82%, 82% to 83%, 84% to 85%, 85% to 86%, 86% to 87%, 87% to 88%, 88% to 90%, or 89% to 95% oligomers having at least two linked monomer units (DP2+). In some embodiments, the oligosaccharide composition comprises 84% to 85%, 85% to 86%, 86% to 87%, 87% to 88%, or 88% to 90% oligomers having at least three linked monomer units (DP3+).

In some embodiments, the oligosaccharide composition comprises less than 0.10% total impurities (excluding monomer). In some embodiments, the oligosaccharide composition comprises less than 0.05% total impurities (excluding monomer). In some embodiments, the oligosaccharide composition comprises less than 0.20%, 0.15%, 0.10%, or 0.05% total impurities (excluding monomer). In some embodiments, the oligosaccharide composition comprises less than 0.10% w/w levoglucosan, less than 0.10% w/w glucuronic acid, less than 0.10% w/w lactic acid, less than 0.10% w/w formic acid, less than 0.10% w/w acetic acid, and less than 0.10% w/w hydroxymethylfurfural (HMF). In some embodiments, the oligosaccharide composition comprises undetectable levels of lactic acid, formic acid, levulinic acid and HMF. In some embodiments, the oligosaccharide composition comprises 2.52% w/w citric acid. In some embodiments, the oligosaccharide composition comprises 2.18-2.72% w/w, 2.00-3.00%, 2.00-2.50%, or 2.50-3.00% citric acid.

In some embodiments, the oligosaccharide composition comprises a MWw of 1807-2985, a MWn of 1322-2073, and/or a PDI of 2.0-2.3.

In certain embodiments, the oligosaccharide composition analyzed by NMR contains monosaccharide monomers (DP1), i.e., the DP1 component is not removed from the composition prior to NMR analysis. For example, in some embodiments, the oligosaccharide composition analyzed by NMR contains between 10%-25% DP1 monomers. In certain embodiments, the composition analyzed by NMR is de-monomerized, i.e., some or all of the DP1 component of the composition is removed prior to NMR analysis, e.g., by the method described in Example 4. For example, in some embodiments, the oligosaccharide composition analyze by NMR contains between 0.05% to 8% DP1 monomers.

The oligosaccharide compositions described herein, and prepared according to the methods described herein, can be characterized and distinguished from prior art compositions using permethylation analysis. See, e.g., Zhao, Y., et al. 'Rapid, sensitive structure analysis of oligosaccharides,' PNAS Mar. 4, 1997 94 (5) 1629-1633; Kailemia, M. J., et al. 'Oligosaccharide analysis by mass spectrometry: A review of recent developments,' Anal Chem. 2014 Jan. 7; 86(1): 196-212. Accordingly, in another aspect, oligosaccharide compositions are provided herein that comprise a plurality of oligosaccharides that are minimally digestible in humans, the plurality of oligosaccharides comprising monomer radicals. The molar percentages of different types of monomer radicals in the plurality of oligosaccharides can be quantified using a permethylation assay as described in Example 2. The permethylation assay is performed on a de-monomerized sample of the composition.

In some embodiments, the plurality of oligosaccharides comprises two or more monomer radicals selected from radicals (1)-(40):

(1) t-arapyranose monoradicals, representing 0.00-0.12 mol % of monomer radicals in the plurality of oligosaccharides;

(2) t-manopyranose monoradicals, representing 11.47-18.18 mol % of monomer radicals in the plurality of oligosaccharides;

(3) t-glucopyranose monoradicals, representing 0.06-0.18 mol % of monomer radicals in the plurality of oligosaccharides;

(4) t-manofuranose monoradicals, representing 0.17-0.46 mol % of monomer radicals in the plurality of oligosaccharides;

(5) t-galactofuranose monoradicals, representing 2.96-6.24 mol % of monomer radicals in the plurality of oligosaccharides;

(6) t-galactopyranose monoradicals, representing 12.90-17.63 mol % of monomer radicals in the plurality of oligosaccharides;

(7) 2-arapyranose monoradicals, representing 0.00-0.19 mol % of monomer radicals in the plurality of oligosaccharides;

(8) 3-manofuranose monoradicals, representing 0.07-0.24 mol % of monomer radicals in the plurality of oligosaccharides;

(9) 2-manofuranose monoradicals, representing 0.00-1.07 mol % of monomer radicals in the plurality of oligosaccharides;

(10) 2-manopyranose and/or 3-manopyranose monoradicals, representing 3.91-5.93 mol % of monomer radicals in the plurality of oligosaccharides;

(11) 2-galactofuranose and/or 2-glucofuranose monoradicals, representing 0.00-4.34 mol % of monomer radicals in the plurality of oligosaccharides;

(12) 3-galactopyranose monoradicals, representing 3.52-4.87 mol % of monomer radicals in the plurality of oligosaccharides;

(13) 4-manopyranose and/or 5-manofuranose monoradicals, representing 0.00-7.91 mol % of monomer radicals in the plurality of oligosaccharides;

(14) 3-galactofuranose monoradicals, representing 0.00-4.44 mol % of monomer radicals in the plurality of oligosaccharides;

(15) 6-manopyranose monoradicals, representing 8.30-10.84 mol % of monomer radicals in the plurality of oligosaccharides;

(16) 2-galactopyranose monoradicals, representing 0.00-8.70 mol % of monomer radicals in the plurality of oligosaccharides;

(17) 6-glucopyranose monoradicals, representing 0.00-0.32 mol % of monomer radicals in the plurality of oligosaccharides;

(18) 4-galactopyranose and/or 5-galactofuranose monoradicals, representing 2.86-3.57 mol % of monomer radicals in the plurality of oligosaccharides;

(19) 2,3-manofuranose diradicals, representing 0.00-0.26 mol % of monomer radicals in the plurality of oligosaccharides;

(20) 4-glucopyranose and/or 5-glucofuranose monoradicals, representing 0.00-0.37 mol % of monomer radicals in the plurality of oligosaccharides;

(21) 6-manofuranose monoradicals, representing 0.00-1.72 mol % of monomer radicals in the plurality of oligosaccharides;

(22) 2,3-galactofuranose diradicals, representing 0.10-0.59 mol % of monomer radicals in the plurality of oligosaccharides;

(23) 2,3-manopyranose diradicals, representing 0.24-0.51 mol % of monomer radicals in the plurality of oligosaccharides;

(24) 6-galactopyranose monoradicals, representing 9.78-13.08 mol % of monomer radicals in the plurality of oligosaccharides;

(25) 3,4-galactopyranose and/or 3,5-galactofuranose and/or 2,3-galactopyranose diradicals, representing 0.83-1.32 mol % of monomer radicals in the plurality of oligosaccharides;

(26) 2,4-manopyranose and/or 2,5-manofuranose diradicals, representing 0.09-1.15 mol % of monomer radicals in the plurality of oligosaccharides;

(27) 4,6-manopyranose and/or 5,6-manofuranose diradicals, representing 1.18-1.82 mol % of monomer radicals in the plurality of oligosaccharides;

(28) 3,6-manofuranose diradicals, representing 0.07-0.18 mol % of monomer radicals in the plurality of oligosaccharides;

(29) 2,3,4-glucopyranose and/or 2,3,5-glucofuranose triradicals, representing 0.07-0.14 mol % of monomer radicals in the plurality of oligosaccharides;

(30) 3,6-manopyranose diradicals, representing 1.76-2.40 mol % of monomer radicals in the plurality of oligosaccharides;

(31) 2,6-manopyranose diradicals, representing 1.42-1.84 mol % of monomer radicals in the plurality of oligosaccharides;

(32) 3,6-galactofuranose diradicals, representing 0.95-1.41 mol % of monomer radicals in the plurality of oligosaccharides;

(33) 4,6-galactopyranose and/or 5,6-galactofuranose diradicals, representing 2.38-3.46 mol % of monomer radicals in the plurality of oligosaccharides;

(34) 2,6-galactopyranose diradicals, representing 1.23-1.84 mol % of monomer radicals in the plurality of oligosaccharides;

(35) 3,4,6-manopyranose and/or 3,5,6-manofuranose and/or 2,3,6-manofuranose triradicals, representing 0.19-0.48 mol % of monomer radicals in the plurality of oligosaccharides;

(36) 3,4,6-galactopyranose and/or 3,5,6-galactofuranose and/or 2,3,6-galactofuranose triradicals, representing 0.53-1.03 mol % of monomer radicals in the plurality of oligosaccharides;

(37) 2,3,6-manopyranose and/or 2,4,6-manopyranose and/or 2,5,6-manofuranose triradicals, representing 0.43-0.68 mol % of monomer radicals in the plurality of oligosaccharides;

(38) 2,3,6-galactopyranose and/or 2,4,6-galactopyranose and/or 2,5,6-galactofuranose triradicals, representing 0.59-0.93 mol % of monomer radicals in the plurality of oligosaccharides;

(39) 2,3,4,6-manopyranose and/or 2,3,5,6-manofuranose tetraradicals, representing 0.00-0.68 mol % of monomer radicals in the plurality of oligosaccharides; and

(40) 2,3,4,6-galactopyranose and/or 2,3,5,6-galactofuranose tetraradicals, representing 0.00-0.31 mol % of monomer radicals in the plurality of oligosaccharides.

The presence of t-arapyranose, t-glucopyranose, 2-arapyranose, 2-glucofuranose, 6-glucopyranose, 4-glucopyranose, 5-glucofuranose, 2,3,4-glucopyranose and/or 2,3,5-glucofuranose monomer radicals may be due to epimerization and/or trace contamination.

In some embodiments, about 20-45% of the total glycosidic bonds in an oligosaccharide composition are 1,2 glycosidic bonds. In some embodiments, about 28% of the total glycosidic bonds in an oligosaccharide composition are 1,2 glycosidic bonds. In some embodiments, 15-50%, 15-40%, 15-30%, 15-20%, 20-40%, 20-30%, 25-50%, 25-30%, or 30-45% of the total glycosidic bonds in an oligosaccharide composition are 1,2 glycosidic bonds.

In some embodiments, about 15-42% of the total glycosidic bonds in an oligosaccharide composition are 1,3 glycosidic bonds. In some embodiments, about 22% of the total glycosidic bonds in an oligosaccharide composition are 1,3 glycosidic bonds. In some embodiments, 10-50%, 15-40%, 15-30%, 15-25%, 10-40%, 10-30%, 10-25%, 15-30%, or 15-20% of the total glycosidic bonds in an oligosaccharide composition are 1,3 glycosidic bonds.

In some embodiments, about 10-27% of the total glycosidic bonds in an oligosaccharide composition are 1,4 glycosidic bonds. In some embodiments, about 15% of the total glycosidic bonds in an oligosaccharide composition are 1,4 glycosidic bonds. In some embodiments, 5-35%, 10-30%, 10-25%, 10-20%, 5-20%, 5-15%, or 20-30% of the total glycosidic bonds in an oligosaccharide composition are 1,4 glycosidic bonds.

In some embodiments, about 31-60% of the total glycosidic bonds in an oligosaccharide composition are 1,6 glycosidic bonds. In some embodiments, about 41% of the total glycosidic bonds in an oligosaccharide composition are 1,6 glycosidic bonds. In some embodiments, 25-60%, 25-50%, 25-40%, 30-60%, 30-50%, 30-40%, or 35-45% of the total glycosidic bonds in an oligosaccharide composition are 1,6 glycosidic bonds.

In some embodiments, an oligosaccharide composition comprises 16-64% total furanose. In some embodiments, an oligosaccharide composition comprises 30% total furanose. In some embodiments, an oligosaccharide composition comprises 15-65%, 15-50%, 15-40%, 20-40%, 25-35%, or 25-40% total furanose.

In some embodiments, the oligosaccharide composition comprises at least one mannofuranose or mannopyranose radical, and at least one galactofuranose or galactopyranose radical.

In some embodiments, an oligosaccharide composition is provided, comprising a plurality of oligosaccharides comprising monomer radicals (1)-(40) in the molar percentages shown in Table 2.

TABLE 2

Permethylation Data

| Radicals | Mean mol % +3 standard dev. | Mean mol % | Mean mol % −3 standard dev. |
|---|---|---|---|
| t-arapyranose* monoradicals | 0.08% | 0.01% | 0.00% |
| t-manopyranose monoradicals | 16.84% | 14.82% | 12.81% |
| t-glucopyranose* monoradicals | 0.15% | 0.12% | 0.08% |
| t-manofuranose monoradicals | 0.40% | 0.31% | 0.23% |
| t-galactofuranose monoradicals | 5.59% | 4.60% | 3.62% |
| t-galactopyranose monoradicals | 16.69% | 15.27% | 13.85% |
| 2-arapyranose* monoradicals | 0.12% | 0.01% | 0.00% |
| 3-manofuranose monoradicals | 0.20% | 0.15% | 0.10% |
| 2-manofuranose monoradicals | 0.69% | 0.11% | 0.00% |
| 2-manopyranose and/or 3-manopyranose monoradicals | 5.53% | 4.92% | 4.31% |
| 2-galactofuranose and/or 2-glucofuranose* monoradicals | 2.78% | 0.43% | 0.00% |
| 3-galactopyranose monoradicals | 4.60% | 4.19% | 3.79% |
| 4-manopyranose and/or 5-manofuranose monoradicals | 5.18% | 1.10% | 0.00% |
| 3-galactofuranose monoradicals | 2.81% | 0.35% | 0.00% |
| 6-manopyranose monoradicals | 10.33% | 9.57% | 8.81% |
| 2-galactopyranose monoradicals | 6.54% | 3.30% | 0.06% |
| 6-glucopyranose* monoradicals | 0.23% | 0.10% | 0.00% |
| 4-galactopyranose and/or 5-galactofuranose monoradicals | 3.43% | 3.21% | 3.00% |
| 2,3-manofuranose diradicals | 0.21% | 0.13% | 0.06% |
| 4-glucopyranose* and/or 5-glucofuranose* monoradicals | 0.24% | 0.06% | 0.00% |
| 6-manofuranose monoradicals | 1.17% | 0.36% | 0.00% |
| 2,3-galactofuranose diradicals | 0.49% | 0.34% | 0.20% |
| 2,3-manopyranose diradicals | 0.45% | 0.38% | 0.30% |
| 6-galactopyranose monoradicals | 12.42% | 11.43% | 10.44% |
| 3,4-galactopyranose and/or 3,5-galactofuranose and/or 2,3-galactopyranose diradicals | 1.23% | 1.08% | 0.93% |
| 2,4-manopyranose and/or 2,5-manofuranose diradicals | 0.94% | 0.62% | 0.31% |
| 4,6-manopyranose and/or 5,6-manofuranose diradicals | 1.69% | 1.50% | 1.31% |
| 3,6-manofuranose diradicals | 0.16% | 0.12% | 0.09% |

TABLE 2-continued

Permethylation Data

| Radicals | Mean mol % +3 standard dev. | Mean mol % | Mean mol % −3 standard dev. |
|---|---|---|---|
| 2,3,4-glucopyranose* and/or 2,3,5-glucofuranose* triradicals | 0.13% | 0.11% | 0.08% |
| 3,6-manopyranose diradicals | 2.27% | 2.08% | 1.89% |
| 2,6-manopyranose diradicals | 1.76% | 1.63% | 1.50% |
| 3,6-galactofuranose diradicals | 1.32% | 1.18% | 1.05% |
| 4,6-galactopyranose and/or 5,6-galactofuranose diradicals | 0.01% | 0.00% | 0.00% |
| 2,6-galactopyranose diradicals | 4.77% | 0.74% | 0.00% |
| 3,4,6-manopyranose and/or 3,5,6-manofuranose and/or 2,3,6-manofuranose triradicals | 0.42% | 0.34% | 0.25% |
| 3,4,6-galactopyranose and/or 3,5,6-galactofuranose and/or 2,3,6-galactofuranose triradicals | 0.93% | 0.78% | 0.63% |
| 2,3,6-manopyranose and/or 2,4,6-manopyranose and/or 2,5,6-manofuranose triradicals | 0.63% | 0.55% | 0.48% |
| 2,3,6-galactopyranose and/or 2,4,6-galactopyranose and/or 2,5,6-galactopyranose triradicals | 0.86% | 0.76% | 0.66% |
| 2,3,4,6-manopyranose and/or 2,3,5,6-manofuranose tetraradicals | 0.46% | 0.12% | 0.00% |
| 2,3,4,6-galactopyranose and/or 2,3,5,6-galactofuranose tetraradicals | 0.20% | 0.04% | 0.00% |

*The presence of t-arapyranose, t-glucopyranose, 2-arapyranose, 2-glucofuranose, 6-glucopyranose, 4-glucopyranose, 5-glucofuranose, 2,3,4-glucopyranose and/or 2,3,5-glucofuranose monomer radicals may be due to epimerization and/or trace contamination.

In certain embodiments, the oligosaccharide compositions are free from monomer. In other embodiments, the oligosaccharide compositions comprise monomer.

In some embodiments, an oligosaccharide composition is provided, comprising a plurality of oligosaccharides comprising or consisting essentially of monomer radicals (1)-(40), as described herein. In some embodiments, an oligosaccharide composition is provided, comprising a plurality of oligosaccharides comprising at least one (e.g., at least two, at least three, at least four, at least five, at least six, at least seven, at least eight, at least nine, or at least ten) monomer radical selected from radicals (1)-(40) with at least one (e.g., at least two, at least three, at least four, at least five, at least six, at least seven, at least eight, at least nine, or at least ten) corresponding molar percentage shown in Table 2. In some embodiments, an oligosaccharide composition is provided, comprising a plurality of oligosaccharides comprising or consisting of monomer radicals (1)-(40) with the molar percentages shown in Table 2.

The oligosaccharide compositions described herein, and prepared according to the methods described herein, can be characterized and distinguished from prior art compositions using two-dimensional heteronuclear NMR. Accordingly, in another aspect, oligosaccharide compositions are provided that comprise a plurality of oligosaccharides that are minimally digestible in humans, the compositions being characterized by a multiplicity-edited gradient-enhanced $^1$H-$^{13}$C heteronuclear single quantum correlation (HSQC) NMR spectrum comprising one or more of signals 1-12 of the following table, wherein the spectrum is generated using a sample of the oligosaccharide composition having less than 2% monomer:

| | Center Position (ppm) | | Area under the curve (AUC) (% of total areas of |
|---|---|---|---|
| Signal | $^1$H | $^{13}$C | signals 1-12) |
| 1 | 5.05 | 108.24 | 2.35-3.77 |
| 2 | 5.04 | 96.57 | 0.00-0.86 |
| 3 | 4.99 | 98.83 | 11.33-17.01 |
| 4 | 4.89 | 100.02 | 16.75-18.46 |
| 5 | 4.71 | 101.01 | 3.05-4.50 |
| 6 | 4.60 | 104.86 | 0.27-1.94 |
| 7 | 4.46 | 103.81 | 5.29-9.30 |
| 8 | 4.15 | 76.80 | 4.57-8.55 |
| 9 | 4.13 | 81.77 | 9.72-13.13 |
| 10 | 4.05 | 77.04 | 11.64-15.51 |
| 11 | 4.00 | 66.42 | 7.34-12.09 |
| 12 | 3.88 | 66.76 | 8.45-14.07 |

In some embodiments, compositions being characterized by a multiplicity-edited gradient-enhanced $^1$H-$^{13}$C heteronuclear single quantum correlation (HSQC) NMR spectrum comprises one or more of signals 1-12 having an $^1$H integral region and a $^{13}$ integral region, defined as follows:

| | | $^1$H Position (ppm) | | | $^{13}$C Position (ppm) | |
|---|---|---|---|---|---|---|
| | Center | $^1$H Integral Region | | Center | $^{13}$C Integral Region | |
| Signal | Position | From | To | Position | from | to |
| 1 | 5.05 | 5.10 | 5.01 | 108.24 | 108.69 | 107.80 |
| 2 | 5.04 | 5.06 | 5.03 | 96.57 | 96.84 | 96.31 |
| 3 | 4.99 | 5.05 | 4.93 | 98.83 | 99.82 | 97.84 |
| 4 | 4.89 | 4.96 | 4.83 | 100.02 | 101.13 | 98.91 |
| 5 | 4.71 | 4.75 | 4.66 | 101.01 | 101.56 | 100.46 |
| 6 | 4.60 | 4.63 | 4.57 | 104.86 | 105.19 | 104.53 |
| 7 | 4.46 | 4.52 | 4.40 | 103.81 | 104.37 | 103.25 |
| 8 | 4.15 | 4.22 | 4.05 | 76.80 | 82.69 | 80.85 |
| 9 | 4.13 | 4.21 | 4.10 | 81.77 | 77.41 | 76.19 |
| 10 | 4.05 | 4.12 | 3.99 | 77.04 | 78.16 | 75.92 |
| 11 | 4.00 | 4.08 | 3.92 | 66.42 | 67.30 | 65.54 |
| 12 | 3.88 | 3.93 | 3.83 | 66.76 | 67.94 | 65.57 |

As used herein, "heteronuclear single quantum coherence (HSQC)" may be be used interchangeably with "heteronuclear single quantum correlation (HSQC)."

In some embodiments, an NMR spectrum is obtained by subjecting a sample of the oligosaccharide composition to a multiplicity-edited gradient-enhanced $^1$H-$^{13}$C heteronuclear single quantum coherence (HSQC) experiment using an echo-antiecho scheme for coherence selection using the following pulse sequence diagram, acquisition parameters and processing parameters:

Pulse Sequence Diagram

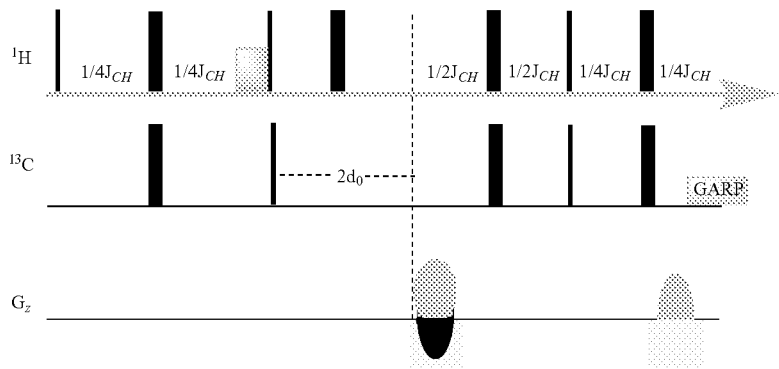

Acquisition Parameters
  $^1$H Carrier Frequency=4 ppm
  $^{13}$C Carrier Frequency=65 ppm
  Number of points in acquisition dimension=596
  Spectral range in acquisition dimension=6.23 ppm to 1.83 ppm
  Number of points in indirect dimension=300 complex points
  Spectral range in indirect dimension=120 ppm to 10 ppm
  Recycle delay=1 second
  One-bond $^1$H-$^{13}$C coupling constant=$J_{CH}$=146 Hz
  Number of scans=8
  Temperature=298-299 K
  Solvent=$D_2O$
Processing Parameters
  Window function in direct dimension=Gaussian broadening, 7.66 Hz
  Window function in indirect dimension=Gaussian broadening 26.48 Hz
  Processing=512 complex points in direct dimension, 1024 complex points in indirect dimension In certain embodiments, the NMR spectrum is obtained by subjecting a sample of the composition to HSQC NMR, wherein the sample is a solution in a deuterated solvent. Suitable deuterated solvents in include deuterated acetonitrile, deuterated acetone, deuterated methanol, $D_2O$, and mixtures thereof. In a particular embodiment, the deuterated solvent is $D_2O$. Further, in some embodiments, an oligosaccharide composition being characterized by HSQC NMR has been subjected to a de-monomerization procedure such that the oligosaccharide composition comprises less than 10% monomer (e.g., less than 8%, 6%, 5%, 4%, 2%, or 1% monomer).

In certain embodiments, the NMR spectrum is obtained using the conditions described in Example 8.

Exemplary oligosaccharide compositions may be prepared according to the procedures described herein.

III. Methods of Use

As described herein, oligosaccharide compositions may be used to modulate lipid levels, e.g., cholesterol, LDL, non-esterified free fatty acids and triglyceride levels. In some embodiments, oligosaccharide compositions described herein may be used to reduce lipid levels, e.g., cholesterol, LDL, non-esterified free fatty acids and triglyceride levels.

In some embodiments, oligosaccharide compositions described herein may be used to reduce glucose levels and/or insulin levels.

In some embodiments, oligosaccharide compositions described herein may be used to reduce lipid, glucose and/or insulin levels in a subject having or suspected of having a disease, disorder or condition associated with elevated lipid and/or glucose levels. In some embodiments, the selected oligosaccharide composition is administered to a subject in an amount effective to reduce the levels of lipids (e.g., triglycerides, cholesterol and/or fat phospholipids) (e.g., in the blood or liver) in a subject in need thereof. In some embodiments, the selected oligosaccharide composition is administered to a subject in an amount effective to reduce the levels of glucose or insulin (e.g., in the blood) in a subject in need thereof. In some embodiments, administration of an oligosaccharide composition to a subject having or suspected of having a disease, disorder or condition associated with elevated lipid and/or glucose levels is effective in treating the disease, disorder or condition.

In one aspect, methods of administering oligosaccharide compositions described herein are effective for treating hepatic steatosis (e.g., in subjects exhibiting a fatty liver disease (FLD), such as, e.g., NAFLD). Hepatic steatosis is thought to be a reversible condition wherein large vacuoles of triglyceride fat accumulate in liver cells via the process of steatosis (e.g., abnormal retention of lipids within a cell). Despite having multiple causes, fatty liver can be considered a single disease. Fatty liver occurs worldwide, e.g., in subjects with excessive alcohol intake and the obese (with or without effects on insulin resistance). The condition is also associated with other diseases that influence fat metabolism. When the process of fat metabolism is disrupted, fat can accumulate in the liver in excessive amounts, thus resulting in a fatty liver. In some embodiments, the accumulation of fat is accompanied by a progressive inflammation of the liver (hepatitis) called steatohepatitis. This more severe condition may be termed either alcoholic steatohepatitis or non-alcoholic steatohepatitis (NASH).

In some aspects, methods of administering oligosaccharide compositions described herein are effective for treating nonalcoholic fatty liver disease (NAFLD). NAFLD is a condition in which excess fat is maintained within the liver (and the excess fat is not a result of alcohol abuse). In some embodiments, methods of administering oligosaccharide compositions described herein are effective for treating non-alcoholic steatohepatitis (NASH), a form of fatty liver disease. A patient having NASH has inflammation of the liver and liver damage, in addition to the excess fat maintained within the liver. In some embodiments, a patient having NASH further has fibrosis, or scarring, of the liver. In some embodiments, a patient having NASH further has cirrhosis of the liver (e.g., permanent liver damage. In some embodiments, a patient having NASH is at increased risk for developing liver cancer. In some embodiments, a patient having NAFLD or NASH has one or more co-morbidities such as obesity, extreme obesity, or type 2 diabetes.

The data described herein demonstrate that the selected oligosaccharide composition is useful in treating non-alcoholic fatty liver disease (NAFLD) and non-alcoholic steatohepatitis (NASH). For example, the data in Example 11 suggest the selected oligosaccharide composition causes decreases in hepatic steatosis, inflammation, concentrations of liver triglycerides, liver weight and hepatic expression of marker genes of inflammation, fibrosis, oxidative stress, and apoptosis; each of which are indicators that the selected oligosaccharide composition can be useful in treating NAFLD/NASH. Furthermore, it is thought that insulin resistance plays a significant role in the onset of NAFLD and NASH. The selected oligosaccharide composition causes a decrease in fasting blood insulin (see, Example 11), suggesting that the selected oligosaccharide can treat NAFLD/NASH. Finally, the selected oligosaccharide has been shown to modulate markers associated with NAFLD and NASH, including decreased blood and hepatic cholesterol (especially LDL-C), reduced atherosclerosis formation, and decreased body weight gain (see, Example 11).

In some embodiments, administration of an oligosaccharide composition to a subject is effective in treating a lipid and lipoprotein abnormality. In some embodiments, administration of an oligosaccharide composition to a subject is effective in treating dyslipidemia. In some embodiments, administration of an oligosaccharide composition to a subject is effective in treating treat hyperlipidemia. In some embodiments, administration of an oligosaccharide composition to a subject is effective in treating hyperlipidemia, e.g., primary (or familial) hyperlipidemia or secondary (or acquired) hyperlipidemia. In some embodiments, administration of an oligosaccharide composition to a subject is effective in preventing or delaying the onset of diseases associated with abnormal lipid and/or glucose levels, such as, e.g., non-alcoholic fatty liver disease (NAFLD), non-alcoholic steatohepatitis (NASH), cardiovascular disease (CVD), type-2diabetes (T2D), and chronic kidney disease (CKC). In some embodiments, administration of an oligosaccharide composition to a subject is effective in reducing the risk of a subject developing a disease associated with abnormal lipid and/or glucose levels, such as, e.g., non-alcoholic fatty liver disease (NAFLD), non-alcoholic steatohepatitis (NASH), cardiovascular disease (CVD), type two diabetes (T2D), and chronic kidney disease (CKC). In some embodiments, administration of an oligosaccharide composition to a subject is effective in treating metabolic syndrome In some embodiments, administration of an oligosaccharide composition to a subject is effective in treating a subject who has or is suspected of having or is at risk of developing metabolic syndrome, or shows one, two, three or more symptoms associated with metabolic syndrome. In some embodiments, administration of an oligosaccharide composition to a subject is effective in treating a subject exhibiting one or more genetic defects associated with abnormal (e.g., elevated) levels of a lipid, such as, e.g., primary (or familial) hyperlipidemia, familial hypercholesterolemia, familial hyperlipoproteinemia, familial hyperchylomicronemia. In some embodiments, administration of an oligosaccharide composition to a subject is effective in treating a subject exhibiting secondary (or acquired) hyperlipidemia. In some embodiments, administration of an oligosaccharide composition to a subject is effective in treating a subject having a cardiometabolic disorder or liver disease. In some embodiments, administration of an oligosaccharide composition to a subject is effective in treating a subject who exhibits a resistance to a standard of care drug, e.g., to treat abnormal levels of lipids, such as, e.g., statins (e.g., statin-refractory subjects or statin non-responders). In some embodiments, administration of an oligosaccharide composition to a subject is effective in treating a subject who subject exhibits an intolerance to a standard of care drug, e.g., to treat abnormal levels of lipids, such as, e.g., statins, e.g., a subject exhibiting statin-associated muscle symptoms (SAMSs).

In some embodiments, provided is a method of modulating the microbial community composition and/or the metabolic output of the microbial community in a subject, e.g. modulating the environment, e.g., to modulate (e.g., reduce) lipid levels or glucose or insulin levels. In some embodiments, an oligosaccharide composition is administered in an effective amount to modulate the microbial community and alter the environment of the GI tract, (e.g., altering pH, altering lactic acid, altering microbial density, etc.).

In some embodiments, administration of an oligosaccharide composition to a subject causes a reduction in levels of lipids in the subject (e.g., in the blood, plasma or liver of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of lipids in the subject (e.g., in the blood, plasma or liver of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes a reduction in levels of cholesterol (e.g., low-density lipoprotein (LDL)) in the subject (e.g., in the blood, plasma or liver of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of cholesterol in the subject (e.g., in the blood, plasma or liver of the subject) by about 25%, relative to a reference measurement. In some embodiments, administration of an oligosaccharide composition to a subject causes a reduction in levels of cholesterol in the subject (e.g., in the blood, plasma or liver of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes a reduction in the ratio of low-density lipoprotein (LDL) relative to high-density lipoprotein (HDL). In some embodiments, administration of an oligosaccharide composition to a subject causes a reduction in the ratio of LDL to HDL by a factor of 2, 3, 4, 5, 6, 7, 8, 9, 10 or more. In some embodiments, administration of an oligosaccharide composition to a subject causes a reduction in the ratio of LDL to HDL by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%.

In some embodiments, administration of an oligosaccharide composition to a subject causes a reduction in levels of phospholipids (e.g., Lysophosphatidic acid (LPA)) in the subject (e.g., in the blood, plasma or liver of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of phospholipids in the subject (e.g., in the blood, plasma or liver of the subject) by about 25%, relative to a reference measurement. In some embodiments, administration of an oligosaccharide composition to a subject causes a reduction in levels of phospholipids in the subject (e.g., in the blood, plasma or liver of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes a reduction in levels of non-esterified free fatty acids in the subject (e.g., in the blood, plasma or liver of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of non-esterified free fatty acids in the subject (e.g., in the blood, plasma or liver of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes a reduction in levels of triglycerides in the subject (e.g., in the liver or blood of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of triglycerides in the subject (e.g., in the liver or blood of the subject) by about 15%, relative to a reference measurement. In some embodiments, administration of an oligosaccharide composition to a subject causes a reduction in levels of triglycerides in the subject (e.g., in the liver or blood of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes a reduction in levels of glucose in the subject (e.g., in the blood or plasma of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of glucose in the subject (e.g., in the blood or plasma of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes a reduction in levels of insulin in the subject (e.g., in the blood or plasma of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes a reduction in levels of insulin in the subject (e.g., in the blood or plasma of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject causes an increase in short-chain fatty acids (e.g., propionate, acetate, butyrate). In some embodiments, administration of an oligosaccharide composition to a subject causes an increase in propionate. In some embodiments, administration of an oligosaccharide composition to a subject causes an increase in succinate. In some embodiments, administration of an oligosaccharide composition to a subject causes an increase in levels or concentrations of propionate in the subject (e.g., in the blood, plasma or liver of the subject) by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject causes an increase in levels or concentrations of propionate in the subject (e.g., in the blood, plasma or liver of the subject) by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, concentrations of short-chain fatty acids is performed using gas chromatography with flame-ionization detection (GC-FID).

In some embodiments, administration of an oligosaccharide composition to a subject enriches bacterial species belonging to the Allistipes, *Blautia, Parabacteroides, Akkermansia*, Ruthenibacterium, *Subdoligranulum, Bacteroides*, and/or *Butyricimonas* genera within the microbiome of the gastrointestinal tract of the subject. In some embodiments, administration of an oligosaccharide composition to a subject depletes bacterial species belonging to the *Anaerotruncus*, Dorea, *Staphylococcus, Streptococcus*, and/or *Enterococcus* genera within the microbiome of the gastrointestinal tract of the subject.

In some embodiments, the oligosaccharide compositions described herein are effective in treating metabolic syndrome. As described herein, Metabolic syndrome (MetS) describes a cluster of metabolic abnormalities that are associated with adiposity or a severe overweight state (e.g., obesity) in a subject. Metabolic abnormalities associated with MetS can include insulin resistance, hypertension, dyslipidemia (e.g., low high-density lipoprotein cholesterol, hypertriglyceridemia), and central obesity (fat accumulation around the intra-abdominal sites). Subjects with metabolic syndrome have an increased risk of developing diabetes (e.g., type 2 diabetes), cardiovascular disease (CVD), hyperlipidemia and liver disease (e.g., cirrhosis, fatty liver disease (e.g., NAFLD or NASH)). Subjects with metabolic syndrome or an associated disease often have elevated inflammation levels. In some embodiments, the oligosaccharide compositions can reduce the severity of, or eliminate at least one metabolic abnormality associated with MetS.

In some embodiments, a subject having metabolic syndrome has three or more of the following characteristics: (1) a large waist (a waistline of 35 inches (89 centimeters) or higher for women or 40 inches (102 centimeters) or higher for men); (2) a high triglyceride level (150 milligrams per deciliter (mg/dL), or 1.7 millimoles per liter (mmol/L), or higher of triglycerides in blood); (3) reduced high-density lipoprotein (HDL) cholesterol level (less than 40 mg/dL (1.04 mmol/L) in men or less than 50 mg/dL (1.3 mmol/L) in women of HDL cholesterol; (4) increased blood pressure (130/85 millimeters of mercury (mm Hg) or higher; and/or (5) an elevated fasting blood sugar (100 mg/dL (5.6 mmol/L) or higher). Waist size, blood cholesterol levels, blood pressure, and blood sugar levels can be measured using any method known in the art.

In some embodiments, a subject suitable for treatment with the oligosaccharide compositions described herein is diagnosed as having metabolic syndrome when three of more of the following is observed in the subject (e.g., by a health or medical provider): (1) the subject has a waistline of 35 inches or greater (e.g., 35 inches, 38 inches, 40 inches, 42 inches, 45 inches, 48 inches, 50 inches, 52 inches, 58 inches, or 60 inches or greater) if the subject is a female, or a waistline of 40 inches or greater (e.g., 40 inches, 42 inches, 45 inches, 48 inches, 50 inches, 55 inches, 58 inches, 60 inches, 65 inches, or 70 inches or greater) if the subject is a male; (2) the subject has a blood triglyceride level of 150 mg/dL or greater (e.g., 150 mg/dL, 155 mg/dL, 160 mg/dL, 165 mg/dL, 170 mg/dL, 175 mg/dL, 180 mg/dL, 185 mg/dL, 190 mg/dL, 200 mg/dL, 225 mg/dL, 250 mg/dL, 275 mg/dL, 300 mg/dL, 350 mg/dL, 400 mg/dL, 450 mg/dL, or 500 mg/dL or greater) or 1.7 mmol/L, 2.0 mmol/L, 2.5 mmol/L, 3.0 mmol/L, 4 mmol/L, 5 mmol/L, 6 mmol/L, 7 mmol/L, 8 mmol/L, 9 mmol/L, 10 mmol/L, 11 mmol/L, 12 mmol/L, or 13 mmol/L or greater); (3) the subject has a blood HDL cholesterol level of 50 mg/dL or less (e.g., 50 mg/dL, 45 mg/dL, 40 mg/dL, 35 mg/dL, 30 mg/dL, 25 mg/dL, 20 mg/dL. 15 mg/dL, 10 mg/dL, or 5 mg/dL or less) or 1.3 mmol/L or less (e.g., 1.3 mmol/L, 1.16 mmol/L, 1.04 mmol/L, 0.9 mmol/L, 0.8 mmol/L, 0.65 mmol/L, 0.5 mmol/L, 0.4 mmol/L, 0.25 mmol/L, or 0.15 mmol/L or less) if the subject is female, or a blood HDL cholesterol level of 40 mg/dL or less (e.g., 40 mg/dL, 35 mg/dL, 30 mg/dL, 25 mg/dL, 20 mg/dL. 15 mg/dL, 10 mg/dL, or 5 mg/dL or less) or 1.04 mmol/L or less (e.g., 1.04 mmol/L, 0.9 mmol/L, 0.8 mmol/L, 0.65 mmol/L, 0.5 mmol/L, 0.4 mmol/L, 0.25 mmol/L, or 0.15 mmol/L or less) if the subject is male; (4) the subject has a blood pressure of 130/85 mm Hg or higher (e.g., a systolic blood pressure of 130 mm Hg, 135 mm Hg, 140 mm Hg, 145 mm Hg, 150 mm Hg, 160 mm Hg, 170 mm Hg, 180 mm Hg, 190 mm Hg, or 200 mm Hg or higher; a diastolic blood pressure of 85 mm Hg, 90 mm Hg, 95 mm Hg, 100 mm Hg, 110 mm Hg, 120 mm Hg, or 130 mm Hg or higher); and/or (5) the subject has a fasting blood sugar of 100 mg/dL or higher (e.g., 100 mg/dL, 110 mg/dL, 120 mg/dL, 126 mg/dL, 130 mg/dL, 140 mg/dL, 150 mg/dL, 160 mg/dL, 165 mg/dL, 170 mg/dL, 180 mg/dL, or 190 mg/dL or higher) or 5.6 mmol/L or higher (e.g., 5.6 mmol/L, 6.1 mmol/L, 6.7 mmol/L, 7.2 mmol/L, 7.8 mmol/L, 8.3 mmol/L, 8.9 mmol/L, 9.2 mmol/L, 9.4 mmol/L, 10 mmol/L, or 10.6 mmol/L or higher).

In some embodiments, an oligosaccharide composition as described herein can be administered to treat a lipid or lipoprotein abnormality in a subject, or alleviate a symptom associated with a lipid or lipoprotein abnormality in a subject. In one embodiment, provided is a method of treating a lipid or lipoprotein abnormality in a subject in need thereof, comprising administering to the subject an oligosaccharide composition described herein in an amount effective to treat the lipid or lipoprotein abnormality.

In some embodiments, an oligosaccharide composition as described herein can be administered to treat dyslipidemia in a subject, or alleviate a symptom associated with dyslipidemia in a subject. In one embodiment, provided is a method of treating dyslipidemia in a subject in need thereof, comprising administering to the subject an oligosaccharide composition described herein in an amount effective to treat dyslipidemia.

In some embodiments, an oligosaccharide composition as described herein can be administered to treat hyperlipidemia in a subject, or alleviate a symptom associated with hyperlipidemia in a subject. In one embodiment, provided is a method of treating hyperlipidemia in a subject in need thereof, comprising administering to the subject an oligosaccharide composition described herein in an amount effective to treat hyperlipidemia.

In some embodiments, an oligosaccharide composition as described herein can be administered to treat metabolic syndrome in a subject, or alleviate a symptom associated with metabolic syndrome in a subject. In one embodiment, provided is a method of treating metabolic syndrome in a subject in need thereof, comprising administering to the subject an oligosaccharide composition described herein in an amount effective to treat metabolic syndrome. In some embodiments, the method further comprises co-administration of a standard-of-care treatment (e.g., delivery of statins and/or lifestyle change). In some embodiments, the method comprises administration of the oligosaccharide composition concurrently with a standard-of-care treatment (e.g., delivery of statins and/or lifestyle change).

In some embodiments, an oligosaccharide composition as described herein can be administered to treat a subject exhibiting statin intolerance or being refractory to statin. In one embodiment, provided is a method of treating a subject exhibiting statin intolerance or being refractory to statin, comprising administering to the subject an oligosaccharide composition described herein in an amount effective to treat the subject exhibiting statin intolerance or being refractory to statin.

In some embodiments, administration of an oligosaccharide composition to a subject (e.g., a subject having metabolic syndrome) causes a reduction in the waistline of the subject by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject (e.g., a subject having metabolic syndrome) causes a reduction in the waistline of the subject by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject (e.g., a subject having metabolic syndrome) causes a reduction in the blood and/or hepatic triglyceride level of the subject by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject (e.g., a subject having metabolic syndrome) causes a reduction in the blood and/or hepatic triglyceride level of the subject by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, administration of an oligosaccharide composition to a subject (e.g., a subject having metabolic syndrome) causes an increase in the blood and/or hepatic high-density lipoprotein (HDL) level of the subject by at least 5%, 10%, 20%, 30%, 40%, 50%, 60%, 70%, 80%, 90%, 100%, 125%, 150%, or 200%, relative to a reference measurement (e.g., a measurement obtained prior to administration of the composition). In some embodiments, administration of an oligosaccharide composition to a subject (e.g., a subject having metabolic syndrome) causes an increase in the blood and/or hepatic HDL level of the subject by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference measurement.

In some embodiments, the compositions and methods described herein can be used to treat a symptom of metabolic syndrome in a subject. In some embodiments, the compositions and methods described herein can treat a symptom of at least one characteristic (e.g., one, two, three, four, or five or more characteristics) associated with metabolic syndrome (e.g., a large waist, a high triglyceride level, a reduced HDL cholesterol level, increased blood pressure, and/or an elevated fasting blood sugar level) in a subject with metabolic syndrome. In some embodiments, a symptom is treated or alleviated if said symptom is modulated such that it is more similar to the measurement or level of that symptom in a healthy subject without metabolic syndrome.

For example, in some embodiments, the compositions and methods described herein can be used to treat a symptom of at least one (e.g., one, two, three, or four or more) metabolic abnormality associated with metabolic syndrome, such as, for example, obesity, cardiovascular disease (CVD), diabetes (e.g., type 2 diabetes), hyperlipidemia and/or a fatty liver disease (e.g., nonalcoholic fatty liver disease (NAFLD), including nonalcoholic steatohepatitis (NASH)). In some embodiments, the compositions and methods can modulate (e.g., reduce) obesity or a symptom of obesity in a subject. In some embodiments, the compositions and methods can modulate (e.g., reduce) cardiovascular disease or a symptom of cardiovascular disease in a subject. In some embodiments, the compositions and methods can modulate (e.g., reduce) diabetes (e.g., type 2 diabetes) or a symptom of diabetes in a subject. In some embodiments, the compositions and methods can modulate (e.g., reduce) fatty liver disease (e.g., NAFLD or NASH) or a symptom of fatty liver disease in a subject.

In one aspect, methods of administering oligosaccharide compositions described herein are effective for treating cardiovascular disease. Cardiovascular disease (CVD) is a class of diseases that involve the heart or blood vessels and may include coronary artery diseases (CAD) such as angina and myocardial infarction (e.g., heart attack), stroke, heart failure, hypertensive heart disease, rheumatic heart disease, cardiomyopathy, heart arrhythmia, congenital heart disease, valvular heart disease, carditis, aortic aneurysms, peripheral artery disease, thromboembolic disease, and venous thrombosis.

In some embodiments, a subject suitable for treatment with the oligosaccharide compositions described herein has or suspected of having cardiovascular disease may present with elevated blood pressure, elevated lipid levels, elevated cholesterol, chest pains, cardiac arrhythmia, and heart failure. Conditions associated with cardiovascular disease include chronic kidney disease; hypercholesterolemia; hypertension (e.g., elevated blood pressure); diabetes (e.g., elevated blood sugar); hyperlipidemia (e.g., raised blood cholesterol); (undiagnosed) celiac disease; atherosclerosis; coronary heart disease; and obesity. Coronary artery disease, stroke, and peripheral artery disease involve atherosclerosis, which may be caused by high blood pressure, smoking, diabetes, lack of exercise, obesity, high blood cholesterol, poor diet, and excessive alcohol consumption. In some embodiments, administration of the oligosaccharide compositions described herein is effective in treating the risk of at least on condition associated with cardiovascular disease (e.g., hypercholesterolemia, atherosclerosis, familial hypercholesterolemia, and coronary heart disease).

In some embodiments, the oligosaccharide compositions may be administered to improve heart function. In one embodiment, provided is a method of treating cardiovascular disease in a subject in need thereof, comprising administering to the subject an oligosaccharide composition described herein in an amount effective to improve heart function. In one embodiment, provided is a method of treating cardiovascular disease in a subject in need thereof, comprising administering to the subject an oligosaccharide composition described herein in an amount effective to reduce or stabilize plaque formation. In some embodiments, treating includes combining administering the oligosaccharide composition and a standard-of-care treatment (e.g., delivery of a statin, lipid-lowering drug and/or lifestyle change). In some embodiments, the method comprises administration of the oligosaccharide composition concurrently with a standard-of-care treatment (e.g., delivery of statins, lipid-lowering drug and/or lifestyle change). In some embodiments, a statin for co-administration with the oligosaccharide compositions is Atorvastatin, Cerivastatin, Fluvastatin, Lovastatin, Mevastatin, Pitavastatin, Pravastatin, Rosuvastatin, or Simvastatin. In some embodiments, a lipid-lowering drug is a fibrate, PCSK9 inhibitor, or omega-3 fatty acid. In some embodiments, a lifestyle change is a change in overall fitness level, a nutritional diet, alcohol use or tobacco use.

In some embodiments, administration of the oligosaccharide composition leads to a reduction in the prevalence, risk, and/or occurrence of an abnormal heart issue (e.g., myocardial infarction, hypertensive heart disease, heart arrhythmia), e.g., by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference subject (e.g., a subject not receiving the oligosaccharide composition). For example, in some embodiments, a subject who has been administered the oligosaccharide composition is 1-10%, 5-20%, 10-25%, 20-40%, 30-50%, 40-60%, 50-70%, 60-80%, 70-90%, 80-100%, 90-110%, 100-125%, 110-150%, 125-175%, or 150-200% less likely to experience a myocardial infarction following administration of the composition, relative to a reference subject.

In one aspect, methods described herein are useful for treating obesity. Obesity is a medical condition in which excess body fat has accumulated to the extent that it may have a negative effect on health. In some embodiments, obesity may be caused or associated with a genetic disorder, endocrine disorders, medications, or mental disorder. On average, obesity reduces life expectancy by six to seven years: a body mass index (BMI) of 30-35 kg/m$^2$ may reduce life expectancy by two to four years, while severe obesity (BMI>40 kg/m$^2$) may reduce life expectancy by ten years. In some embodiments, a subject suitable for treatment with the oligosaccharide compositions described herein is obese and has a body mass index (BMI) that is over 30 kg/m$^2$.

In some embodiments, administration of the oligosaccharide composition treats obesity. In some embodiments, administration of the oligosaccharide composition leads to a reduction in the BMI of a subject by 1-10%, 5-20%, 10-25%, 20-40%, 30-50%, 40-60%, 50-70%, 60-80%, 70-90%, 80-100%, 90-110%, 100-125%, 110-150%, 125-175%, or 150-200%, relative to a reference subject (e.g., a subject not receiving the oligosaccharide composition).

In some embodiments, treating includes combining administering the oligosaccharide composition and a standard-of-care treatment (e.g., delivery of a statin and/or lifestyle change). In some embodiments, the method comprises administration of the oligosaccharide composition concurrently with a standard-of-care treatment (e.g., delivery of statins and/or lifestyle change).

In some embodiments, a subject suitable for treatment with the oligosaccharide compositions described herein has a fatty liver disease and a baseline level of serum alanine transaminase (AST) level that is greater than the aspartate transaminase (ALT).

In some embodiments, oligosaccharides of the present invention may be administered to improve liver function and/or reduce liver steatosis. In one embodiment, provided is a method of treating hepatic steatosis (e.g., fatty liver disease) in a subject in need thereof, comprising administering to the subject a composition in an amount effective to reverse the accumulation of triglyceride vacuoles in the liver. In some embodiments, treating a liver disease includes combining administering the oligosaccharide composition and a standard-of-care treatment.

In one aspect, the compositions and methods described herein are useful for treating insulin resistance and diabetes, e.g., type 2 diabetes. Diabetes is a metabolic disease associated with abnormally elevated blood glucose levels that result from a decrease or failure in insulin production and/or a decrease in insulin sensitivity and function. Pancreatic beta cells produce the insulin hormone which helps the absorption of glucose by cells to provide energy. Diabetes can occur when smaller amounts or no insulin is produced, or when cells develop a reduced sensitivity to insulin. Type 1 diabetes is associated with a failure of insulin production that results when T-cell autoimmunity results in the destruction of beta cells. Individuals with type 1 diabetes are often genetically predisposed to getting the disease, although dietary and lifestyle factors can also contribute to disease incidence and severity (e.g., a non-healthy diet rich in carbohydrates and sugar, lack of exercise, a sedentary lifestyle, etc.) Type 2 diabetes results from insulin resistance and a reduction of insulin production. Obesity caused by poor diet and a sedentary lifestyle significantly contributes to the chances of an individual developing type 2 diabetes. Inflammation leading to the destruction of beta cells is commonly associated with both type 1 and type 2 diabetes. Diabetes can result in diabetic nephropathy, retinopathy, neuropathy, cardiovascular diseases and ulcers, among other disorders, if left untreated.

In some embodiments, a subject suitable for treatment with the oligosaccharide compositions described herein has type 2 diabetes and a blood sugar level of 126 mg/dl (7 mmol/l) or greater. In some embodiments, a subject suitable for treatment with the oligosaccharide compositions described herein has type 2 diabetes, diabetic symptoms and two random blood sugar tests over 200 mg/dl (11.1 mmol/1); or an hemoglobin A1c test of greater than 6.5 percent on two separate days.

In some embodiments, oligosaccharides of the present invention may be administered to reduce or alleviate insulin resistance and/or treat or prevent diabetes (e.g., type 1 or type 2 diabetes). In one embodiment, provided is a method of treating diabetes (e.g., type 1 or type 2 diabetes) in a subject in need thereof, comprising administering to the subject a composition in an amount effective to decrease blood glucose levels, decrease glucose absorption, increase the amount of insulin (e.g., by increasing the production of insulin by the pancreas), increase sensitivity to insulin, and/or decrease resistance to insulin in the subject. In some embodiments, treating insulin resistance and/or diabetes includes combining administering the oligosaccharide composition and a standard-of-care treatment (e.g., delivery of insulin and/or lifestyle change).

In some embodiments, a subject in need of an oligosaccharide composition as described herein is a statin-refractory patient (also known as statin-resistant patient). In some embodiments, a statin-refractory patient is a patient taking statins who fails to reach LDL-C target levels. A statin-refractory patient may have increased risk of cardiovascular disease. In some embodiments, a statin-refractory patient is receiving, or has received higher dose of statins than a control patient, thereby increasing the risk of developing side effects.

In some embodiments, a subject in need of an oligosaccharide composition as described herein is a statin-intolerant patient. A statin-intolerant patient may be unable to tolerate sufficiently high concentrations of statins necessary to reach target LDL-C levels. In some embodiments, a statin-intolerant patient has one or more statin-associated muscle symptoms, including myopathy (myalgia, myositis, rhabdomyolysis), increased liver function enzymes, or new onset of diabetes. In some embodiments, a statin-intolerant patient has low body mass index, female sex, old age, Asian ethnicity, comorbidity (e.g., hypothyroidism, liver and kidney diseases, and rheumatic diseases), vitamin D deficiency, alcoholism, grapefruit juice consumption (1 qt/day or 0.95 L/day), major surgery or perioperative period, excessive physical activity, history of myopathy while receiving another lipid-lowering therapy, history of CK rise, family history of myopathy, and family history of myopathy while receiving another lipid lowering agent. In some embodiments, a statin-intolerant patient is taking concomitant medications such as fibrates, cyclosporine, antifungals, macrolide antibiotics, amiodarone, verapamil, and anti-HIV drug-protease inhibitors.

In one aspect, the compositions and methods described herein are useful for treating familial hypercholesteremia, hyperlipidemia, heterozygous familial hypercholesterolemia (HeFH) and homozygous familial hypercholesterolemia (HoFH). In some embodiments, oligosaccharides of the present invention may be administered to reduce or alleviate symptoms of familial hypercholesteremia, hyperlipidemia, heterozygous familial hypercholesterolemia (HeFH) and/or homozygous familial hypercholesterolemia (HoFH) in a subject.

Familial hypercholesterolemia is an inherited condition characterized by very high levels of cholesterol in the blood. Patients with familial hypercholesterolemia have a high risk of developing coronary artery disease at a young age. In some embodiments, familial hypercholesterolemia can also cause health and esthetic problems related to the buildup of excess cholesterol in tissues other than the heart and blood vessels such as tendon xanthomas, xanthelasmata and arcus cornealis. Familial hypercholesterolemia affects an estimated 1 in 200 to 1 in 250 people in most countries and is thought to be the most common inherited condition affecting the heart and blood vessels. Mutations in the APOB, LDLR, LDLRAP1, or PCSK9 gene cause familial hypercholesterolemia. Changes in the LDLR gene (encoding low-density lipoprotein receptor) are the most common cause of this condition. The low-density lipoprotein receptor binds to low-density lipoproteins (LDLs) and functions as the primary carriers of cholesterol in the blood. By removing LDLs from the bloodstream, these receptors play a critical role in regulating cholesterol levels. Some LDLR gene mutations reduce the number of low-density lipoprotein receptors produced within cells. Other mutations disrupt the receptors' ability to remove low-density lipoproteins from the bloodstream. As a result, people with mutations in the LDLR gene have very high levels of blood cholesterol. In some embodiments, familial hypercholesterolemia is caused by rmutatons in the APOB, LDLRAP1, or PCSK9 gene. Accordingly, in some embodiments, the oligosaccharide compositions described herein are useful for treating patients having mutations in the LDLR, APOB, LDLRAP1, and/or PCSK9 genes. In some embodiments, however, patients with familial hypercholesterolemia do not have a mutation in one of these genes.

In one aspect, the compositions and methods described herein are useful for preventing or treating hyperlipoproteinemia. In some embodiments, hyperlipoproteinemia is phenotypically classified according to the Fredrickson classification. In some embodiments, a hyperlipoproteinemia is a Type 1, Type 2, Type 3, Type 4 or Type 5 classified hyperlipoproteinemia. In some embodiments, a hyperlipoproteinemia is classified by basis of origin (e.g., primary/genetic basis; or secondary/acquired). In some embodiments, a Type I hyperlipoproteinemia is a lipoprotein lipase deficiency (Type Ia), due to a deficiency of lipoprotein lipase (LPL) or altered apolipoprotein C2. In some embodiments, a Type I hyperlipoproteinemia is a familial apoprotein CII deficiency (Type Ib), a condition caused by a lack of lipoprotein lipase activator. In some embodiments, a Type I hyperlipoproteinemia is a chylomicronemia due to circulating inhibitor of lipoprotein lipase (Type Ic). In some embodiments, a patient having Type I hyperlipoproteinemia has complications including retinal vein occlusion, acute pancreatitis, steatosis, and organomegaly, and lipemia retinalis. In some embodiments, a Type II hyperlipoproteinemia is Type IIa and may be sporadic (due to dietary factors), polygenic, or familial as a result of a mutation either in the LDL receptor gene on chromosome 19 (0.2% of the population) or the ApoB gene (0.2%). The familial form is characterized by tendon xanthoma, xanthelasma, and premature cardiovascular disease. A Type II hyperlipoproteinemia patient may have increased levels of LDL cholesterol in the blood (e.g., due to the lack of uptake of LDL particles). Individuals may present with a unique set of physical characteristics such as xanthelasmas (yellow deposits of fat underneath the skin often presenting in the nasal portion of the eye), tendon and tuberous xanthomas, arcus juvenilis (the graying of the eye often characterized in older individuals), arterial bruits, claudication, and atherosclerosis. In some embodiments, Type II hyperlipoproteinemia patients have total serum cholesterol levels two to three times greater than normal, as well as increased LDL cholesterol. Type IIb hyperlipoproteinemia (e.g., including familial combined hyperlipoproteinemia (FCH), lysosomal acid lipase deficiency (Cholesteryl ester storage disease), or secondary combined hyperlipoproteinemia) patients may have high VLDL levels, e.g., due to overproduction of substrates, including triglycerides, acetyl-CoA, and an increase in B-100 synthesis. Type III hyperlipoproteinemia is due to high chylomicrons and IDL (intermediate density lipoprotein) and patients having Type III may have elevated cholesterol-rich VLDL (O-VLDL), hypercholesterolemia (typically 8-12 mmol/L), and/or hypertriglyceridemia (typically 5-20 mmol/L). Type IV hyperlipoproteinemia (or familial hypertriglyceridemia) is an autosomal dominant condition. Type IV patients may have high triglyceride level. Type V hyperlipoproteinemia, also known as mixed hyperlipoproteinemia familial or mixed hyperlipidemia is similar to type I, but with high VLDL in addition to chylomicrons and may also be associated with glucose intolerance and hyperuricemia.

Some patients having hyperlipoproteinemia have combined hyperlipidemia, a commonly occurring form of hypercholesterolemia (elevated cholesterol levels) characterized by increased LDL and triglyceride concentrations, and often accompanied by decreased HDL. It is the most common inherited lipid disorder, occurring in about one in 200 persons. Almost one in five individuals who develop coronary heart disease before the age of 60 has this disorder. The elevated triglyceride levels (>5 mmol/1) are generally due to an increase in very low density lipoprotein (VLDL), a class of lipoprotein prone to cause atherosclerosis. Familial combined hyperlipidemia (FCH) is the familial occurrence of this disorder, probably caused by decreased LDL receptor and increased ApoB. FCH is extremely common in people who suffer from other diseases from the metabolic syndrome ("syndrome X", incorporating diabetes mellitus type II, hypertension, central obesity and CH). Excessive free fatty acid production by various tissues leads to increased VLDL synthesis by the liver. Initially, most VLDL is converted into LDL until this mechanism is saturated, after which VLDL levels elevate.

In one aspect, the compositions and methods described herein are useful for preventing or treating familial chylomicronemia syndrome, a disease that is characterized by elevated triglyceride levels. In some embodiments, oligosaccharides of the present invention may be administered to reduce triglyceride levels in a subject having familial chylomicronemia syndrome. Familial chylomicronemia syndrome, also known as familial lipoprotein lipase deficiency is an inherited condition that disrupts the normal breakdown of fats in the body. Subjects with familial lipoprotein lipase deficiency typically develop signs and symptoms before age 10, with 25% showing symptoms by age 1. The first symptom of this condition is usually abdominal pain, which can vary from mild to severe. The abdominal pain is often due to inflammation of the pancreas (pancreatitis), which can become chronic and even life-threatening. Patients may also have an enlarged liver and spleen. Approximately half of individuals with familial lipoprotein lipase deficiency develop small yellow deposits of fat under the skin called eruptive xanthomas. Mutations in the LPL gene (encoding lipoprotein lipase) cause familial lipoprotein lipase deficiency. Mutations that cause familial lipoprotein lipase deficiency lead to a reduction or elimination of lipoprotein lipase activity, which prevents the enzyme from effectively breaking down triglycerides. As a result, triglycerides attached to lipoproteins build up in the blood and tissues, leading to the signs and symptoms of familial lipoprotein lipase deficiency. Treatment is desired to maintain plasma triglyceride concentration below 1000 mg/dL. Maintenance of triglyceride levels below 2000 mg/dL prevents recurrent abdominal pain.

The compounds and compositions provided herein may be used in methods to modulate bacterial taxa (e.g. 1, 2, 3, 4, 5 or more taxa) present in the microbiota of a subject. In some embodiments, modulation comprises a change in the structure of the microbiota, such as a change in the relative composition of a taxa or a change in the relative abundance of a taxa, e.g., relative to another taxa or relative to what would be observed in the absence of the modulation. In other embodiments, modulation comprises a change in a function of the microbiota, such as a change in gene expression, a change in gene copy number, overall abundance of DNA, level of a gene product (e.g., RNA or protein), or metabolic output of the microbiota, or a change in a functional pathway of the host (e.g., a change in gene expression, level of a gene product, or metabolic output of a host cell or host process). Methods of modulating microbial taxa disclosed in WO 2016/122889 and WO 2016/172657 which are hereby incorporated by reference, are suitable for use in methods described herein.

The methods describe herein include administering to a subject a composition described herein, e.g., comprising an oligosaccharide composition described herein, in an amount effective to modulate taxa. In some embodiments, the abundance of a bacterial taxa may increase relative to other taxa (or relative from one point in time to another) when the composition is administered, and the increase can be at least a 5%, 10%, 25% 50%, 75%, 100%, 250%, 500%, 750% increase or at least a 1000% increase. The abundance of a bacterial taxa may also decrease relative to other taxa (or relative from one point in time to another) when the composition is administered, and the decrease can be at least a 5%, 10%, 25% 50%, 75%, 85%, 90%, 95%, 96%, 97%, 98%, 99% decrease, or at least a 99.9% decrease. Administration of the composition can modulate the abundance of the desired and/or non-desired bacterial taxa in the subject's gastrointestinal microbiota.

In some embodiments, a composition described herein, e.g., comprising an oligosaccharide composition described herein, modulates (e.g. substantially increase or substantially decrease) the growth (and the total number) of (or substantially increase or substantially decrease the relative representation/abundance in the total (gastrointestinal) community of one or more of (e.g. 1, 2, 3, 4, 5, 6, 7, 8, 9, 10, or more) bacterial taxa.

In some embodiments, a composition described herein, e.g., comprising an oligosaccharide composition described herein, substantially increases the growth, e.g., the total number or the relative representation/abundance in the total (gastrointestinal) community of one or more of (e.g. 1, 2, 3, 4, 5, 6, 7, 8, 9, 10, or more) commensal bacterial taxa.

In some embodiments, a composition described herein, e.g., comprising an oligosaccharide composition described herein, substantially decreases the growth, e.g., the total number or the relative representation/abundance in the total (gastrointestinal) community of one or more of (e.g. 1, 2, 3, 4, 5, 6, 7, 8, 9, 10, or more) bacterial taxa.

In some embodiments, an oligosaccharide composition described herein modulates the growth e.g. the total number or the relative representation/abundance in the total (gastrointestinal) community of bacterial taxa and species that consume cholesterol, e.g., at higher rates than a reference bacterial taxa or species.

In some embodiments, the oligosaccharide composition is formulated as powder, e.g., for reconstitution (e.g., in water) for oral administration. In some embodiments, the oligosaccharide composition is formulated in a solid form (e.g., chewable tablet or gummy) for oral administration. In some embodiments, the oligosaccharide composition is formulated as a pharmaceutical composition for delivery by a feeding tube. In some embodiments, the oligosaccharide composition is formulated as a pharmaceutical composition for delivery by total parenteral nutrition (TPN).

The oligosaccharide composition may be administered to the subject on a daily, weekly, biweekly, or monthly basis. In some embodiments, the composition is administered to the subject more than once per day (e.g., 2, 3, or 4 times per day). In some embodiments, the composition is administered to the subject more than once per week (e.g., 2, 3, or 4 times per week). In some embodiments, the composition is administered to the subject once or twice per day for one, two, three, or four weeks in a row. In some embodiments, the composition is administered to the subject chronically. In some embodiments, the composition is administered to the subject for 2, 3, 4, 5, 6, 7, 8, 9, 10, 11, 12, or more continuous months.

In some embodiments, the composition is administered to the subject according to the following schedule: 10-40 grams total on any or all of days 1-14 of a treatment protocol; and 20-100 grams total on any or all of days 15-30 of a treatment protocol.

In some embodiments, an effective amount of an oligosaccharide is a total of 5-200 grams, 5-150 grams, 5-100 grams, 5-75 grams, 5-50 grams, 5-25 grams, 10-50 grams, 25-50 grams, 30-60 grams, 50-75 grams, 50-100 grams, 18-72 grams, or 36-72 grams administered daily.

The oligosaccharide composition of the disclosure is well tolerated by a subject (e.g., oligosaccharide compositions do not cause or cause minimal discomfort, e.g., production of gas or gastrointestinal discomfort, in subjects). In some embodiments, 5-200 grams, 5-150 grams, 5-100 grams, 5-75 grams, 5-50 grams, 5-25 grams, 10-50 grams, 25-50 grams, 30-60 grams, 50-75 grams, 50-100 grams, 18-72 grams, or 36-72 grams of total daily dose are well tolerated by a subject. Any dosage amount of an oligosaccharide composition as described herein that is administered to the subject at a single time or in a single dose may be well tolerated by the subject.

In some embodiments, the amount of the oligosaccharide composition that is administered to the subject at a single time or in a single dose is more tolerated by the subject than a similar amount of commercial low-digestible sugars such as fructooligosaccharides (FOS). Commercial low-digestible sugars are known in the art to be poorly tolerated in subjects (See, e.g., Grabitske, H. A., Critical Reviews in Food Science and Nutrition, 49:327-360 (2009)), e.g., at high doses. For example, tolerability studies of FOS indicate that 20 grams FOS per day causes mild gastrointestinal symptoms and that 30 grams FOS per day causes major discomfort and gastrointestinal symptoms.

In some embodiments, an oligosaccharide composition described herein is co-administered with commensal or probiotic bacterial taxa and bacteria that are generally recognized as safe (GRAS) or known commensal or probiotic microbes. In some embodiments, probiotic or commensal bacterial taxa (or preparations thereof) may be administered to a subject before or after administration of an oligosaccharide composition to the subject. In some embodiments, probiotic or commensal bacterial taxa (or preparations thereof) may be administered to a subject simultaneously with administration of an oligosaccharide composition to the subject.

In some embodiments, an oligosaccharide composition described herein is administered with a fecal microbiota transplantation (FMT).

A commensal or probiotic bacteria is also referred to a probiotic. Probiotics can include the metabolites generated by the probiotic bacteria during fermentation. These metabolites may be released to the medium of fermentation, e.g., into a host organism (e.g., subject), or they may be stored within the bacteria. "Probiotic bacteria" includes bacteria, bacterial homogenates, bacterial proteins, bacterial extracts, bacterial ferment supernatants and combinations thereof, which perform beneficial functions to the host animal, e.g., when given at a therapeutic dose.

Useful probiotics include at least one lactic acid and/or acetic acid and/or propionic acid producing bacteria, e.g., microbes that produce lactic acid and/or acetic acid and/or propionic acid by decomposing carbohydrates such as glucose and lactose. Preferably, the probiotic bacteria is a lactic acid bacterium. In embodiments, lactic acid bacteria include *Lactobacillus, Leuconostoc, Pediococcus, Streptococcus*, and *Bifidobacterium*. Suitable probiotic bacteria can also include other bacterias which beneficially affect a host by improving the hosts intestinal microbial balance, such as, but not limited to yeasts such as *Saccharomyces, Debaromyces, Candida, Pichia* and *Torulopsis*, molds such as *Aspergillus, Rhizopus, Mucor*, and *Penicillium* and *Torulopsis*, and other bacteria such as but not limited to the genera *Bacteroides, Clostridium, Fusobacterium, Melissococcus, Propionibacterium, Enterococcus, Lactococcus, Staphylococcus, Peptostreptococcus, Bacillus, Pediococcus, Micrococcus, Leuconostoc, Weissella, Aerococcus*, and *Oenococcus*, and combinations thereof.

Non-limiting examples of lactic acid bacteria useful in the disclosure herein include strains of *Streptococcus lactis, Streptococcus cremoris, Streptococcus diacetylactis, Streptococcus thermophilus, Lactobacillus bulgaricus, Lactobacillus acidophilus, Lactobacillus helveticus, Lactobacillus bifidus, Lactobacillus casei, Lactobacillus lactis, Lactobacillus plantarum, Lactobacillus rhamnosus, Lactobacillus delbruekii, Lactobacillus thermophilus, Lactobacillus fermentii, Lactobacillus salivarius, Lactobacillus paracasei, Lactobacillus brevis, Bifidobacterium longum, Bifidobacterium infantis, Bifidobacterium bifidum, Bifidobacterium animalis, Bifidobacterium lactis, Bifidobaccterium breve, Bifidobacterium adolescentis*, and *Pediococcus cerevisiae* and combinations thereof, in particular *Lactobacillus, Bifidobacterium*, and combinations thereof.

Commensal or probiotic bacteria which are particularly useful in the present disclosure include those which (for human administration) are of human origin (or of the origin of the mammal to which the probiotic bacteria is being administered), are non-pathogenic to the host, resist technological processes (i.e. can remain viable and active during processing and in delivery vehicles), are resistant to gastric acidity and bile toxicity, adhere to gut epithelial tissue, have the ability to colonize the gastrointestinal tract, produce antimicrobial substances, modulate immune response in the host, and influence metabolic activity (e.g. cholesterol assimilation, lactase activity, vitamin production).

The commensal or probiotic bacteria can be used as a single strain or a combination of multiple strains, wherein the total number of bacteria in a dose of probiotic bacteria is from about $1\times10^3$ to about $1\times10^{14}$, or from about $1\times10$ to about $1\times10^{12}$, or from about $1\times10^7$ to about $1\times10^{11}$ CFU per dose.

The commensal or probiotic bacteria can be formulated with the oligosaccharide compositions while the probiotic bacteria are alive but in a state of "suspended animation" or somnolence. Once freeze-dried, the viable cultures(s) of probiotic bacteria are handled so as to minimize exposure to moisture that would reanimate the cultures because, once reanimated, the cultures can experience high rates of morbidity unless soon cultured in a high moisture environment or medium. Additionally, the cultures are handled to reduce possible exposure to high temperatures (particularly in the presence of moisture) to reduce morbidity.

The probiotic bacterias can be used in a powdered, dry form. The probiotic bacterias can also be administered in the oligosaccharide composition or in a separate oligosaccharide composition, administered at the same time or different time as the oligosaccharide compositions.

Other probiotic bacteria suitable include *Bifidobacterium lactis, B. animalis, B. bifidum, B. longum, B. adolescentis*, and *B. infantis*.

In embodiments, a commensal bacterial taxa that can be used in and/or in combination with an oligosaccharide composition described herein comprises *Akkermansia*, Anaerococcus, *Bacteroides, Bifidobacterium* (including *Bifidobacterium lactis, B. animalis, B. bifidum, B. longum, B. adolescentis, B. breve*, and *B. infantis*), *Blautia, Clostridium, Corynebacterium, Dialister, Eubacterium, Faecalibacterium, Finegoldia, Fusobacterium, Lactobacillus* (including, *L. acidophilus, L. helveticus, L. bifidus, L. lactis, L. fermentii, L. salivarius, L. paracasei, L. brevis, L. delbruekii, L. thermophiles, L. crispatus, L. casei, L. rhamnosus, L. reuteri, L. fermentum, L. plantarum, L. sporogenes*, and *L. bulgaricus*), Peptococcus, *Peptostreptococcus, Peptoniphilus, Prevotella, Roseburia, Ruminococcus, Staphylococcus*, and/or *Streptococcus* (including *S. lactis, S. cremoris, S. diacetylactis, S. thermophiles*).

In embodiments, a commensal bacterial taxa, e.g., GRAS strain, that can be used in and/or in combination with an oligosaccharide composition described herein comprises *Bacillus coagulans* GBI-30, 6086; *Bifidobacterium animalis* subsp. *Lactis* BB-12; *Bifidobacterium breve* Yakult; *Bifidobacterium infantis* 35624; *Bifidobacterium animalis* subsp. *Lactis* UNO 19 (DR10); *Bifidobacterium longum* BB536; *Escherichia coli* M-17; *Escherichia coli* Nissle 1917; *Lactobacillus acidophilus* DDS-1; *Lactobacillus acidophilus* LA-5; *Lactobacillus acidophilus* NCFM; *Lactobacillus casei* DN 114-001 (*Lactobacillus casei* Immunitas(s)/Defensis); *Lactobacillus casei* CRL431; *Lactobacillus casei* F19; *Lactobacillus paracasei* Stl 1 (or NCC2461); *Lactobacillus johnsonii* Lai (*Lactobacillus* LCI, *Lactobacillus johnsonii* NCC533); *Lactococcus lactis* L1A; *Lactobacillus plantarum* 299V; *Lactobacillus reuteri* ATTC 55730 (*Lactobacillus reuteri* SD2112); *Lactobacillus rhamnosus* ATCC 53013; *Lactobacillus rhamnosus* LB21; *Saccharomyces cerevisiae (boulardii)* lyo; mixture of *Lactobacillus rhamnosus* GR-1 and *Lactobacillus reuteri* RC-14; mixture of *Lactobacillus acidophilus* NCFM and *Bifidobacterium lactis* BB-12 or BL-04; mixture of *Lactobacillus acidophilus* CL1285 and *Lactobacillus casei*; and a mixture of *Lactobacillus helveticus* R0052, *Lactobacillus rhamnosus* R0011, and/or *Lactobacillus rhamnosus* GG (LGG).

IV. Kits

Kits also are contemplated. For example, a kit can comprise unit dosage forms of the oligosaccharide composition, and a package insert containing instructions for use of the composition in treatment. In some embodiments, the composition is provided in a dry powder format. In some embodiments, the composition is provided in solution, powder or tablet. The kits include an oligosaccharide composition in suitable packaging for use by a subject in need thereof. Any of the compositions described herein can be packaged in the form of a kit. A kit can contain an amount of an oligosaccharide composition sufficient for an entire course of treatment, or for a portion of a course of treatment. Doses of an oligosaccharide composition can be individually packaged, or the oligosaccharide composition can be provided in bulk, or combinations thereof. Thus, in one embodiment, a kit provides, in suitable packaging, individual doses of an oligosaccharide composition that correspond to dosing points in a treatment regimen, wherein the doses are packaged in one or more packets.

Kits can further include written materials, such as instructions, expected results, testimonials, explanations, warnings, clinical data, information for health professionals, and the like. In one embodiment, the kits contain a label or other information indicating that the kit is only for use under the direction of a health professional. The container can further include scoops, syringes, bottles, cups, applicators or other measuring or serving devices.

EXAMPLES

Example 1. Production of Short Chain Fatty Acids (SCFA) in Healthy and Patient Stool Samples in the Presence of Oligosaccharide Compositions Several hundred different oligosaccharide compositions were tested for their ability to modulate (e.g., reduce) the levels of metabolites in healthy and patient stool samples. A library of synthetic oligosaccharide compositions was screened in an ex vivo assay to test for their effect on metabolite production by gut microbial communities originating from (1) healthy subjects, (2) overweight subjects, (3) obese subjects and (4) subjects having type 2 diabetes. Fecal samples were collected from donors, frozen and stored at −80° C. until use. Frozen fecal samples were transferred to an anaerobic chamber, allowed to thaw and homogenized to a final concentration of 20% solids in phosphate buffer saline containing 15% glycerol. The 20% fecal slurries were then filtered to remove large debris, aliquoted, removed from the anaerobic chamber and immediately frozen on dry ice before storage at −80° C. On the day of the experiment, one aliquot of each 20% fecal slurry was thawed and diluted into bacterial growth media to a final 1% in an anaerobic chamber. The 1% slurry solutions were then dispensed into the wells of 96 deep well plates containing sterile water (negative control) or preparations of the oligosaccharide preparations (final concentration of 0.5%). Plates were incubated anaerobically at 37° C. for 45 hours. After the 45-hour incubation period, culture supernatants were collected and SCFA quantified by gas chromatography with a flame ionization detector (GC-FID).

One of the several hundred tested oligosaccharide compositions, the selected oligosaccharide composition as described throughout this document (i.e., as produced by the processes in Examples 2-4), was determined to significantly lower lipid levels in obese, overweight, and type 2 diabetic subjects.

Example 2. Production of a Selected Oligosaccharide Composition at 10 kg Scale from Galactose and Mannose Using a Soluble Acid Catalyst A procedure was developed for the synthesis of a selected oligosaccharide composition as described in Example 1 at a 10 kilogram scale. 5.46 kg of anhydrous galactose, 3.64 kg of anhydrous mannose, 0.50 kg citric acid monohydrate acid catalyst and 0.71 kg water were added to a reaction vessel (22L Littleford-Day horizontal plow mixer). A distillation condenser unit was attached to the reactor. The contents were agitated at approximately 30 RPM and the vessel temperature was gradually increased over a 2.5-3 hour period to about 135° C. at atmospheric pressure. The mixture was maintained at temperature for 80-90 minutes, after which the heating was stopped and pre-heated water was gradually added to the reaction mixture at a rate of 60 mL/min until the temperature of the reactor contents decreased to 120° C., then at 150 mL/min until the temperature of the reactor contents decreased to 110° C., then at 480 mL/min until a total of 7.8-8.0 kg of water was added, and the temperature of the reactor contents decreased below 100° C. An additional 0.4-0.58 kg water was added to the reactor for further dilution. The reaction mixture was drained from the vessel, resulting in 16 kg of crude oligosaccharide as an aqueous solution (approximately 52-53 wt %).

The oligosaccharide composition was purified by flowing through a cationic exchange resin (Dowex® Monosphere 88H) column, two columns of decolorizing polymer resin (Dowex® OptiPore SD-2), and an anionic exchange resin (Dowex® Monosphere 77WBA) column. The resulting purified material with concentration of about 40 wt % was then concentrated to a final concentration of about 75 wt % solids by vacuum rotary evaporation to yield the purified oligosaccharide composition.

Example 3. Production of Oligosaccharide Composition at 100 g Scale from Galactose and Mannose Using a Soluble Acid Catalyst A procedure was developed for the synthesis of a selected oligosaccharide composition as described in Example 1 at a 100 gram scale. 60 g of galactose, 40 g of mannose, and an amount of water sufficient to achieve a starting concentration of 91% dissolved solids were added to a reaction vessel (1 L three-neck round-bottom flask). The reaction vessel was equipped with a heating mantle configured with an overhead stirrer. A probe thermocouple was disposed in the vessel through a septum, such that the probe tip sat above the stir blade and not in contact with the walls of the reaction vessel. Prior to addition of catalyst, the reaction vessel was equipped with a condenser in a reflux position.

The procedure used citric acid (1.5-3% w/w) as a catalyst and de-ionized water for quenching. Following addition of catalyst, the reaction vessel was equipped in a distillation position to remove excess water throughout the course of the reaction.

The temperature controller was set to a target temperature (130 to 140° C.), and stirring of the contents of the vessel was initiated to promote uniform heat transfer and melting of the sugar solids, as the temperature of the syrup was brought to the target temperature, under ambient (atmospheric) pressure.

Upon addition of the catalyst, the reaction was maintained at the target temperature under continuous mixing for about 4 hours, determined by following the reaction by HPLC. Next, the heat was turned off while maintaining constant stirring.

The reaction was then quenched by slowly adding approximately 60 mL of deionized (DI) water (room temperature) to dilute and cool the product mixture, to target a final concentration of 60-70 wt % dissolved solids. Generally, the water addition rate was performed to control the mixture viscosity as the oligosaccharide composition was cooled and diluted.

Example 4. Production of Oligosaccharide Composition at 100 g Scale from Galactose and Mannose Using a Solid Polymeric Catalyst A procedure was developed for the synthesis of a selected oligosaccharide composition as described in Example 1 at a 100 gram scale. 60 g of galactose, 40 g of mannose, and an amount of water sufficient to achieve a starting concentration of 91% dissolved solids were added to a reaction vessel (1 L three-neck round-bottom flask). The reaction vessel was equipped with a heating mantle configured with an overhead stirrer. A probe thermocouple was disposed in the vessel through a septum, such that the probe tip sat above the stir blade and not in contact with the walls of the reaction vessel. Prior to addition of catalyst, the reaction vessel was equipped with a condenser in a reflux position.

The procedure also used an acidic oligomerization catalyst (Dowex Marathon C) (3-5% w/w) and de-ionized water for quenching. In some cases, the catalyst was handled in wet form, e.g., at a nominal moisture content of 45-50 wt % $H_2O$. The exact catalyst moisture content was generally determined on a per-experiment basis using, for example, using a moisture analyzing balance (e.g., Mettler-Toledo MJ-33). Following addition of catalyst, the reaction vessel was equipped in a distillation position to remove excess water throughout the course of the reaction.

The temperature controller was set to a target temperature (130 to 140° C.), and stirring of the contents of the vessel was initiated to promote uniform heat transfer and melting of the sugar solids, as the temperature of the syrup was brought to the target temperature, under ambient (atmospheric) pressure.

Upon addition of the catalyst, the reaction was maintained at the target temperature under continuous mixing for about 4 hours, determined by following the reaction by HPLC. Next, the heat was turned off while maintaining constant stirring.

The reaction was then quenched by slowly adding approximately 60 mL of deionized (DI) water (room temperature) to dilute and cool the product mixture, to target a final concentration of 60-70 wt % dissolved solids. Generally, the water addition rate was performed to control the mixture viscosity as the oligosaccharide composition was cooled and diluted.

Following dilution, the oligosaccharide composition was cooled to approximately 60° C. The catalyst was then removed by vacuum filtration through a 100 micron mesh screen or fritted-glass filter, to obtain the final oligosaccharide composition at around 40° Bx.

Example 5. De-Monomerization Procedure

Individual batches of oligosaccharide composition, as produced in Examples 2-4 were concentrated on a rotatory evaporator to approximately 50 Brix as measured by a Brix refractometer following treatment with ion-exchange resins (e.g., as described herein). The resulting syrup (200 mg) was loaded onto a Teledyne ISCO RediSep Rf Gold Amine column (11 grams stationary phase) using a luer-tip syringe. Other similar columns such as the Biotage SNAP KP-NH Cartridges may also be used. The sample was purified on a Biotage Isolera equipped with an ELSD detector using a 20/80 to 50/50 (v/v) deionized water/ACN mobile phase gradient over 55 column volumes. Other flash chromatography systems such as the Teledyne ISCO Rf may also be used. The flow rate was set in accordance with the manufacturer's specifications for the column and system. After the monomer fraction completely eluted at ~20 column volumes, the mobile phase was set to 100% water until the remainder of the oligosaccharide composition eluted and was collected. The monomer-free fractions were concentrated by rotary evaporation to afford the de-monomerized product.

Example 6. Size Exclusion Chromatography

The weight-average molecular weight (MWw), number-average molecular weight (MWn), and polydispersity index (PDI) of batches of the selected oligosaccharide compositions, as described in Example 1, and produced according to the methods described in Examples 2-4, were determined by SEC HPLC.

Method

These methods involved the use of an Agilent 1100 with refractive index (RI) detector equipped with the following two columns in series: a Shodex OHpak SB-802 HQ, 8.0×300 mm, 8 μm, P/N F6429100 and a Shodex OHpak SB-803 HQ, 8.0×300 mm, 6 μm, P/N F6429102. Equivalent columns known in the art can also be used.

The mobile phase (0.1 M $NaNO_3$) was prepared by weighing 34 g of $NaNO_3$ (ACS grade reagent) and dissolving in 2000 mL of deionized (DI) water (from MiliQ water filter). The solution was filtered through a 0.2 m filter.

Polymer standard solutions (10.0 mg/mL) were prepared by weighing 20 mg of a standard into a separate 20 mL scintillation vial and adding 2.0 mL of DI water to each vial.

Sample A was prepared in duplicate. Approximately 300 mg of oligosaccharide composition sample was weighed into a 20 mL scintillation vial and 10 mL of DI water was added. The solution was mixed and filtered through a Acrodisc 25 mm syringe filter with a 0.2 μm polyethersulfone membrane. Sample B was prepared in duplicate. Approximately 210 mg of oligosaccharide sample was weighed into a 20 mL scintillation vail and 10 mL of DI-water was added. The solution was mixed and filtered a Acrodisc 25 mm syringe filter with a 0.2 μm polyethersulfone membrane.

The flow rate was set to 0.9 mL/min at least 2 hours before running samples with the column temperature and RI detector each set to 40° C. with the RI detector purge turned on.

Before running samples wherein the injection volume for all samples was 10 μL and run time was 28 minutes, the detector purge was turned off and the pump was run at 0.9 mL/min until an acceptable baseline was obtained.

A blank sample consisting of DI water was run. Samples of each standard were run. Sample A was run. Sample B was run.

The peaks between 15 and 22 minutes were integrated. The monomer and the broad peak (the product) were integrated as shown in the sample chromatogram. The calibration curve fit type in Empower 3 software was set to $3^{rd}$ order. The molecular weight distributions and polydispersity were calculated using Empower 3 software for the broad peak. The Mw, Mn and polydispersity of the product peak (DP2+) were reported.

Results 35 batches of the selected oligosaccharide composition produced at the 10 kg scale using the process described in Example 2 were analyzed using the SEC methods described above. Small-scale batches of the selected oligosaccharide composition produced by the process described in Examples 3 and 4 were de-monomerized.

The assayed batches of oligosaccharide composition produced according to Example 2 comprised oligosaccharides with an average MWw of 2329 g/mol (ranging from 1807-2985 g/mol), an average MWn of 1767 g/mol (ranging from 1322-2073 g/mol), and an average PDI of 2.1 (ranging from 2.0-2.3). Assayed batches further comprised an average DP2+ of 90.1% (ranging from 89.2-92.7) and an average degree of polymerization (DP) of 14.3 (ranging from 11.1-18.4).

Example 7. SEC HPLC Methodology for Determination of Impurities

The presence of residual organic acid impurities and related substances of batches and samples of the selected oligosaccharide composition, as produced by the process in Example 2, were determined by SEC HPLC.

Methods

These methods involved the use of an Agilent 1100 with refractive index (RI) detector equipped with a guard column (Bio-Rad MicroGuard Cation H+Cartridge, PIN 125-0129, or equivalent) and a Bio-Rad Aminex HPX-87H, 300×7.8 mm, 9 m, PIN 125-0140 column, or equivalent.

The mobile phase (25 mM $H_2SO_4$ in water) was prepared by filling a bottle with 2000 mL DI-water and slowly adding 2.7 mL of $H_2SO_4$. The solution was filtered through a 0.2 m filter.

A standard solution was prepared by measuring 50±2 mg of reference standard into a 100-mL volumetric flask, adding mobile phase to 100-mL mark and mixing well.

A sample of a selected oligosaccharide composition (Sample A) was prepared in duplicate. Approximately 1000 mg of oligosaccharide sample was weighed into a 10 mL volumetric flask and mobile phase was added up to the mark. The solution was mixed and filtered through a PES syringe filter with a 0.2 m polyethersulfone membrane.

A sample of a selected oligosaccharide composition (Sample B) was prepared in duplicate. Approximately 700 mg of oligosaccharide sample was weighed into a 10 mL volumetric flask and mobile phase was added up to the mark. The solution was mixed and filtered through a PES syringe filter with a 0.2 μm polyethersulfone membrane.

The flow rate was set to 0.65 mL/min at least 2 hours before running samples with the column temperature set to 50° C. and the RI detector temperature set to 50° C. with the RI detector purge turned on.

Before running samples wherein the injection volume for all samples was 50 μL and run time was 40 minutes, the detector purge was turned off and the pump was run at 0.65 mL/min until an acceptable baseline was obtained.

A blank sample consisting of DI water was run. The standard, sample A, and sample B were each independently run.

The peaks at 7.5 min (Glucuronic acid), 9.4 min (Maleic Acid), 11.3 min (Levoglucosan), 11.9 min (Lactic Acid), 13.1 min (Formic Acid), 14.2 min (Acetic Acid), 15.5 min (Levulinic Acid), 31.8 min (hydroxymethylfurfural, HMF), and 8.3 min (Glucose) were integrated. The calibration curve fit type in Empower 3 software was set to $3^{rd}$ order.

Results

Eighteen batches of the selected oligosaccharide, as produced by the process in Example 2, were tested using the method above. Samples of the selected oligosaccharide composition comprised 2.52% w/w citric acid (ranging from 2.18-2.72% w/w) and undetectable levels of lactic acid, formic acid, levulinic acid and HMF.

Example 8. HSQC NMR Analysis Procedure Using a Bruker NMR Machine

A determination of HSQC NMR spectra of samples of the selected oligosaccharide compositions described in Example 1, and produced as described in Example 2, was performed using a Bruker NMR machine, according to the protocol described below.

Method

Sample Preparation:

25 mg of a previously lyophilized solid sample of the oligosaccharide composition was dissolved in 300 μL of D2O with 0.1% acetone as internal standard. The solution was then placed into a 3 mm NMR tube.

NMR experiment:

Each sample was analyzed in a Bruker NMR operating at 499.83 MHz (125.69 MHz 13C) equipped with a XDB broadband probe with Z-axis gradient, tuned to 13C, and operating at 25° C. Each sample was subjected to a multiplicity-edited gradient-enhanced 1H-13C heteronuclear single quantum coherence (HSQC) experiment using the echo-antiecho scheme for coherence selection. The following pulse sequence diagram and acquisition and processing parameters were used to obtain the NMR spectrum for each sample:

Pulse Sequence Diagram

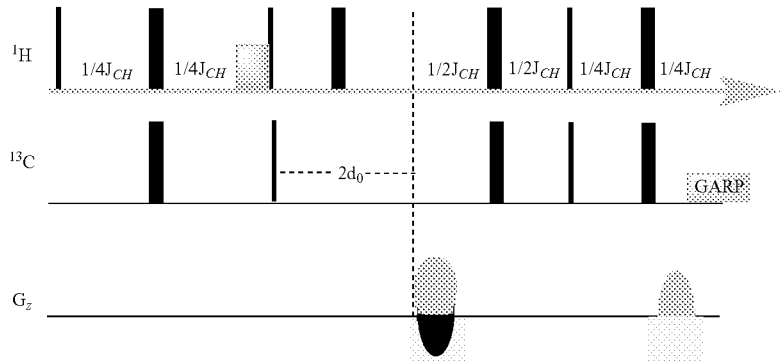

Acquisition Parameters
  1H Carrier Frequency=4 ppm
  13C Carrier Frequency=65 ppm
  Number of points in acquisition dimension=596
  Spectral range in acquisition dimension=6.23 ppm to 1.83 ppm
  Number of points in indirect dimension=300 complex points
  Spectral range in indirect dimension=120 ppm to 10 ppm
  Recycle delay=1 second
  One-bond 1H-13C coupling constant=JCH=146 Hz
  Number of scans=8
  Temperature=298-299 K
  Solvent=D2O
Processing Parameters
  Window function in direct dimension=Gaussian broadening, 7.66 Hz
  Window function in indirect dimension=Gaussian broadening 26.48 Hz
  Processing=512 complex points in direct dimension, 1024 complex points in indirect dimension
Spectral Analysis The resulting spectra were analyzed using the MNova software package from Mestrelab Research (Santiago de Compostela, Spain). The spectra were referenced to the internal acetone signal (1H—2.22 ppm; 13C—30.8 ppm) and phased using the Regions2D method in both the F2 and F1 dimension. Apodization using 90 degree shifted sine was applied in both the F2 and F1 dimension. For each spectrum, individual signals (C—H correlations) were quantified by integration of their respective peaks using "predefined integral regions" with elliptical integration shapes. The resulting table of integral regions and values from the spectra were normalized to a sum of 100 in order for the value to represent a percentage of the total. The peak integral regions were selected to avoid peaks associated with monomers.

Results

Six batches of the selected oligosaccharide composition produced according to the process described in Example 2 (having an average DP of 14.0 (±1.7)) were analyzed using the NMR methods described above. Collectively, these batches comprised the following NMR peak signals (Table 3).

TABLE 3

HSQC NMR peaks of the selected oligosaccharide composition

| Signal | 1H Position (ppm) Center Position | 1H Integral Region from | 1H Integral Region to | 13C Position (ppm) Center Position | 13C Integral Region from | 13C Integral Region to |
|---|---|---|---|---|---|---|
| 1 | 5.05 | 5.10 | 5.01 | 108.24 | 108.69 | 107.80 |
| 2 | 5.04 | 5.06 | 5.03 | 96.57 | 96.84 | 96.31 |
| 3 | 4.99 | 5.05 | 4.93 | 98.83 | 99.82 | 97.84 |
| 4 | 4.89 | 4.96 | 4.83 | 100.02 | 101.13 | 98.91 |
| 5 | 4.71 | 4.75 | 4.66 | 101.01 | 101.56 | 100.46 |
| 6 | 4.60 | 4.63 | 4.57 | 104.86 | 105.19 | 104.53 |
| 7 | 4.46 | 4.52 | 4.40 | 103.81 | 104.37 | 103.25 |
| 8 | 4.15 | 4.22 | 4.05 | 76.80 | 82.69 | 80.85 |
| 9 | 4.13 | 4.21 | 4.10 | 81.77 | 77.41 | 76.19 |
| 10 | 4.05 | 4.12 | 3.99 | 77.04 | 78.16 | 75.92 |
| 11 | 4.00 | 4.08 | 3.92 | 66.42 | 67.30 | 65.54 |
| 12 | 3.88 | 3.93 | 3.83 | 66.76 | 67.94 | 65.57 |

The relative size of each of the peaks (AUC) collected for the NMR spectra of the selected oligosaccharide composition produced according to the process as described in Example 2 was further determined, as shown below:

| Signal | Center Position (ppm) 1H | Center Position (ppm) 13C | Mean area under the curve (AUC) (% of total areas of all signals) | Area under the curve (AUC) (% of total areas of signals 1-12) |
|---|---|---|---|---|
| 1 | 5.05 | 108.24 | 3.06 | 2.91-3.23 |
| 2 | 5.04 | 96.57 | 0.35 | 0.26-0.52 |
| 3 | 4.99 | 98.83 | 14.17 | 13.45-14.78 |
| 4 | 4.89 | 100.02 | 17.61 | 17.37-17.83 |
| 5 | 4.71 | 101.01 | 3.78 | 3.56-3.95 |
| 6 | 4.60 | 104.86 | 1.11 | 0.91-1.28 |
| 7 | 4.46 | 103.81 | 7.29 | 6.85-7.83 |
| 8 | 4.15 | 76.80 | 6.56 | 6.13-7.21 |
| 9 | 4.13 | 81.77 | 11.43 | 11.09-11.81 |
| 10 | 4.05 | 77.04 | 13.58 | 13.07-14.07 |
| 11 | 4.00 | 66.42 | 9.71 | 9.03-10.17 |
| 12 | 3.88 | 66.76 | 11.26 | 10.70-12.13 |

A representative HSQC NMR spectra of the selected oligosaccharide composition is provided in FIG. 20A. The anomeric and non-anomeric regions are denoted.

Selected HSQC NMR peaks in the anomeric region belonging to the selected oligosaccharide composition were further characterized and assigned using commercially sourced dimers from Carbosynth Inc as reference materials. Assignments were based on strategies as described in "1H NMR structural-reporter-group concept" (Leeuwen et al. Carbohydrate Research 343 (2008), 1114-1119). Dimers used in the analysis included: Galp-b(1-6)-Galp, Galp-a(1-6)-Galp, Galp-b(1-4)-Galp, Galp-a(1-4)-Galp, Galp-b(1-3)-Galp, Galp-a(1-3)-Galp, Galp-b(1-2)-Galp, and Galp-a(1-2)-Galp. Linkage abundances were compared with permethylation data and cross-referenced with literature values and internal control oligosaccharide compositions. FIG. 20B provides a representative HSQC NMR spectra of the selected oligosaccharide composition (anomeric region only) with assigned bond linkages.

Example 9. Determination of Glycosidic Bond Distribution Using Permethylation Analysis A determination of glycosidic bond distribution of samples of the selected oligosaccharide composition, as produced by the process in Example 2, was performed using permethylation analysis, according to the protocol described below. Samples were demonomerized prior to permethylation analysis.

Reagents used were methanol, acetic acid, sodium borodeuteride, sodium carbonate, dichioromethane, isopropanol, trifluoroacetic acid (TFA), and acetic anhydride. Equipment included a heating block, drying apparatus, gas chromatograph equipped for capillary columns and with a RID/MSD detector, and a 30 meter RTX®-2330 (RESTEK). All derivation procedures were done in a hood.

Preparation of alditol acetates

A. Standard Preparation 1 mg/mL solutions of the following standard analytes were prepared: arabinose, rhamnose, fucose, xylose, mannose, galactose, glucose, and inositol. The standard was prepared by mixing 50 µL of each of arabinose, xylose, fucose, glucose, mannose, and galactose with 20 µL of inositol in a vial. The standard was subsequently lyophilized.

B. Sample Preparation

Each sample was prepared by mixing 100-500 μg of the selected oligosaccharide composition (as weighed on an analytical balance) with 20 μg (20 μL) of inositol in a vial.

C. Hydrolysis

200 μL of 2 M tifluoroacetic acid (TFA) was added to the sample(s). The vial containing the sample was capped tightly and incubated on a heating block for 2 hours at 121° C. After 2 hours, the sample was removed from the heating block and allowed to cool to room temperature. The sample was then dried down with $N_2$/air. 200 μL of IPA (isopropanol) was added and dried down again with $N_2$/air. This hydrolysis step (addition of TFA for two hours at 121° C.; washing with isopropanol) was repeated twice.

The standard was similarly subjected to hydrolysis using TFA, as described for the sample.

D. Reduction and Acetylation 10 mg/mL solution of sodium borodeuteride was prepared in 1 M ammonium hydroxide. 200 μL of this solution was added to the sample. The sample was then incubated at room temperature for at least one hour or overnight. After incubation with sodium borodeuteride solution, 5 drops of glacial acetic acid were added to the sample, followed by 5 drops of methanol. The sample was then dried down. 500 μL of 9:1 MeOH:HOAc was added to the sample and subsequently dried down (twice repeated). 500 μL MeOH was then added to the sample and subsequently dried down (once repeated). This produced a crusty white residue on the side of the sample vial.

250 μL acetic anhydride was then added to the sample vial and the sample was vortexed to dissolve. 230 μL concentrated TFA was added to the sample and the sample was incubated at 50° C. for 20 minutes. The sample was removed from the heat and allowed to cool to room temperature. Approximately 1 mL isopropanol was added and the sample was dried down. Then, approximately 200 μL isopropanol was added and the sample was dried down again. Approximately 1 mL of 0.2M sodium carbonate was then added to the sample and it was mixed gently. Approximately 2 mL dichloromethane was finally added to the sample, after which it was vortexed and centrifuged briefly. The aqueous top layer was discarded. 1 mL water was added and the sample was vortexed and centrifuged briefly. This step was repeated before the organic layer (bottom) was removed and transferred to another vial. The sample was concentrated using $N_2$/air to a final volume of about 100 μL. 1 μL of final sample was then injected on GC-MS.

The GC temperature program SP2330 was utilized for GC-MS analysis. The initial temperature was 80° C. and the initial time was 2.0 minutes. The first ramp was at a rate of 30° C./min with a final temperature of 170° C. and a final time of 0.0 minutes. The second ramp was at a rate of 4° C./min with a final temperature of 240° C. and a final time of 20.0 minutes.

Glycosyl-Linkage Analysis of Poly- and Oligosaccharides by Hakomori Methylation

A. Preparation of NaOH Base

In a glass screw top tube, 100 μL of a 50/50 NaOH solution and 200 μL of dry MeOH were combined. Plastic pipets were used for the NaOH and glass pipets were used for the MeOH. The solution was vortexed briefly, approximately 4 mL dry DMSO was added, and the solution was vortexed again. The tube was centrifuged to concentrate the solution and the DMSO and salts were pipetted off from the pellet. The previous two steps were repeated about four times in order to remove all the water from the pellet. All white reside was removed from the sides of the tube. Once all the residue was removed and the pellet was clear, about 1 mL dry DMSO was added and the solution was vortexed. The base was then ready to use. The base was prepared fresh each time it was needed.

B. Permethylation

Each sample was prepared by mixing 600-1000 μg of the selected oligosaccharide composition (as weighed on an analytical balance) with 200 μL DMSO. The sample was stirred overnight until the oligosaccharide composition dissolved.

An equal amount of NaOH base (400 μL) was added to the sample, after which the sample was placed back on the stirrer and mixed well for 10 minutes. 100 μL of iodomethane ($CH_3I$) was added to the sample. The sample was mixed on the stirrer for 20 minutes, and then the previous steps (addition of NaOH base and iodomethane) were repeated.

Approximately 2 mL ultrapure water was added to the sample and the sample was mixed well, such that it turned cloudy. The tip of a pipette was placed into the sample solution at the bottom of the tube and $CH_3I$ was bubbled off with a very low flow of air. The sample became clear as the $CH_3I$ was bubbled off. The pipette was moved around the solution to make certain that all the $CH_3I$ was gone. Approximately 2 mL methylene chloride was then added and the solution was mixed well by vortex for 30 seconds. The sample was then centrifuged and the top aqueous layer was removed. Approximately 2 mL of water were added and the sample was mixed, then briefly centrifuged, then the top aqueous layer was removed. The additions of methylene chloride and water were repeated. The organic bottom layer was removed and transferred into another tube and dried down using $N_2$. The analysis was continued with Alditol Acetates.

C. Hydrolysis

200 μL of 2 M tifluoroacetic acid (TFA) was added to the sample(s). The vial containing the sample was capped tightly and incubated on a heating block for 2 hours at 121° C. After 2 hours, the sample was removed from the heating block and allowed to cool to room temperature. The sample was then dried down with $N_2$/air. 200 μL of IPA (isopropanol) was added and dried down again with $N_2$/air. This hydrolysis step (addition of TFA for two hours at 121° C.; washing with isopropanol) was repeated twice.

D. Reduction and Acetylation 10 mg/mL solution of sodium borodeuteride was prepared in 1 M ammonium hydroxide. 200 μL of this solution was added to the sample. The sample was then incubated at room temperature for at least one hour or overnight. After incubation with sodium borodeuteride solution, 5 drops of glacial acetic acid were added to the sample, followed by 5 drops of methanol. The sample was then dried down. 500 μL of 9:1 MeOH:HOAc was added to the sample and subsequently dried down (twice repeated). 500 μL MeOH was then added to the sample and subsequently dried down (once repeated). This produced a crusty white residue on the side of the sample vial.

250 μL acetic anhydride was then added to the sample vial and the sample was vortexed to dissolve. 230 μL concentrated TFA was added to the sample and the sample was incubated at 50° C. for 20 minutes. The sample was removed from the heat and allowed to cool to room temperature. Approximately 1 mL isopropanol was added and the sample was dried down. Then, approximately 200 μL isopropanol was added and the sample was dried down again. Approximately 1 mL of 0.2M sodium carbonate was then added to the sample and it was mixed gently. Approximately 2 mL dichloromethane was finally added to the sample, after which it was vortexed and centrifuged briefly. The aqueous top layer was discarded. 1 mL water was added and the sample was vortexed and centrifuged briefly. This step was repeated before the organic layer (bottom) was removed and transferred to another vial. The sample was concentrated using $N_2$/air to a final volume of about 100 µL. 1 µL of final sample was then injected on GC-MS.

The GC temperature program SP2330 was utilized for GC-MS analysis. The initial temperature was 80° C. and the initial time was 2.0 minutes. The first ramp was at a rate of 30° C./min with a final temperature of 170° C. and a final time of 0.0 minutes. The second ramp was at a rate of 4° C./min with a final temperature of 240° C. and a final time of 20.0 minutes.

Results

Permethylation data was collected using the methods described above for six batches of de-monomerized oligosaccharide composition produced by the process described in Example 2. Each batch was analyzed in duplicate. Data relating to the radicals present in these six batches of de-monomerized oligosaccharide composition are provided below:

| Radicals | Mean mol % +3 standard dev. | Mean mol % | Mean mol % −3 standard dev. |
|---|---|---|---|
| t-arapyranose monoradicals | 0.08% | 0.01% | 0.00% |
| t-manopyranose monoradicals | 16.84% | 14.82% | 12.81% |
| t-glucopyranose monoradicals | 0.15% | 0.12% | 0.08% |
| t-manofuranose monoradicals | 0.40% | 0.31% | 0.23% |
| t-galactofuranose monoradicals | 5.59% | 4.60% | 3.62% |
| t-galactopyranose monoradicals | 16.69% | 15.27% | 13.85% |
| 2-arapyranose monoradicals | 0.12% | 0.01% | 0.00% |
| 3-manofuranose monoradicals | 0.20% | 0.15% | 0.10% |
| 2-manofuranose monoradicals | 0.69% | 0.11% | 0.00% |
| 2-manopyranose and/or 3-manopyranose monoradicals | 5.53% | 4.92% | 4.31% |
| 2-galactofuranose and/or 2-glucofuranose monoradicals | 2.78% | 0.43% | 0.00% |
| 3-galactopyranose monoradicals | 4.60% | 4.19% | 3.79% |
| 4-manopyranose and/or 5-manopyranose monoradicals | 5.18% | 1.10% | 0.00% |
| 3-galactofuranose monoradicals | 2.81% | 0.35% | 0.00% |
| 6-manopyranose monoradicals | 10.33% | 9.57% | 8.81% |
| 2-galactopyranose monoradicals | 6.54% | 3.30% | 0.06% |
| 6-glucopyranose monoradicals | 0.23% | 0.10% | 0.00% |
| 4-galactopyranose and/or 5-galactofuranose monoradicals | 3.43% | 3.21% | 3.00% |
| 2,3-manofuranose diradicals | 0.21% | 0.13% | 0.06% |
| 4-glucopyranose and/or 5-glucofuranose monoradicals | 0.24% | 0.06% | 0.00% |
| 6-manofuranose monoradicals | 1.17% | 0.36% | 0.00% |
| 2,3-galactofuranose diradicals | 0.49% | 0.34% | 0.20% |
| 2,3-manopyranose diradicals | 0.45% | 0.38% | 0.30% |
| 6-galactopyranose monoradicals | 12.42% | 11.43% | 10.44% |
| 3,4-galactopyranose and/or 3,5-galactofuranose and/or 2,3-galactopyranose diradicals | 1.23% | 1.08% | 0.93% |
| 2,4-manopyranose and/or 2,5-manofuranose diradicals | 0.94% | 0.62% | 0.31% |
| 4,6-manopyranose and/or 5,6-manofuranose diradicals | 1.69% | 1.50% | 1.31% |
| 3,6-manofuranose diradicals | 0.16% | 0.12% | 0.09% |
| 2,3,4-glucopyranose and/or 2,3,5-glucofuranose triradicals | 0.13% | 0.11% | 0.08% |
| 3,6-manopyranose diradicals | 2.27% | 2.08% | 1.89% |
| 2,6-manopyranose diradicals | 1.76% | 1.63% | 1.50% |
| 3,6-galactofuranose diradicals | 1.32% | 1.18% | 1.05% |
| 4,6-galactopyranose and/or 5,6-galactofuranose diradicals | 0.01% | 0.00% | 0.00% |
| 2,6-galactopyranose diradicals | 4.77% | 0.74% | 0.00% |
| 3,4,6-manopyranose and/or 3,5,6-manofuranose and/or 2,3,6-manofuranose triradicals | 0.42% | 0.34% | 0.25% |
| 3,4,6-galactopyranose and/or 3,5,6-galactofuranose and/or 2,3,6-galactofuranose triradicals | 0.93% | 0.78% | 0.63% |
| 2,3,6-manopyranose and/or 2,4,6-manopyranose and/or 2,5,6-manofuranose triradicals | 0.63% | 0.55% | 0.48% |
| 2,3,6-galactopyranose and/or 2,4,6-galactopyranose and/or 2,5,6-galactofuranose triradicals | 0.86% | 0.76% | 0.66% |
| 2,3,4,6-manopyranose and/or 2,3,5,6-manofuranose tetraradicals | 0.46% | 0.12% | 0.00% |
| 2,3,4,6-galactopyranose and/or 2,3,5,6-galactofuranose tetraradicals | 0.20% | 0.04% | 0.00% |

Example 10. Therapeutic and Microbiome Effects of the Selected Oligosaccharide Composition in a High Fat Diet (HFD)-Induced Obese Mouse Model The therapeutic and microbiome effects of the selected oligosaccharide composition were tested in a validated high fat diet (HFD)-induced obese mouse model (Winzell M S and Ahren B, Diabetes, 2004), thought to recapitulate a number of metabolic pathologies found in humans, including obesity, hyperglycemia, glucose intolerance, hyperinsulinemia, insulin resistance, hypercholesterolemia, hepatic steatosis and mild hepatic inflammation. Liraglutide, a GLP1 analog prescribed to type-2 diabetic patients to improve glycemic control and reduce the risk of major adverse cardiovascular events, was used as a positive control.

6-week old male C57Bl/6N mice were fed a high fat diet (HFD) (60 kcal % fat, Research Diets D12492) for 8 weeks. After 8 weeks, the mice were split into one of four treatment groups (12 animals per group, 4 animals per cage)—(1) no treatment (NT), (2) the selected oligosaccharide (as produced by the process described in Example 2), (3) a glucose/galactose-based oligosaccharide composition and (4) liraglutide—for the following 5 weeks. Mice in the NT group were fed the same HFD for the entire 5 weeks. Mice in the oligosaccharide groups (#2 and #3) were fed the HFD supplemented with 7.5% w/w of the oligosaccharide composition for 5 weeks. The oligosaccharide composition treatment diets were modified to provide the same calorific value to the mice as those mice on the HFD. Mice in the liraglutide group were fed the HFD and dosed with liraglutide (0.2 mg/kg SC, QD) for the entire 5 weeks. The body weight for each animal was measured prior to the treatment period and weekly over the treatment period. 4-day food intake for each cage was measured weekly over the treatment period and averaged as food intake per mouse per day. Fresh fecal samples were collected within a week prior to treatment initiation and during week 5 post treatment initiation. For each fecal collection period, one fresh fecal pellet was collected on three separate days for each animal. Fecal samples were sent for shallow shotgun sequencing to characterize the changes in the gut microbiome caused by the selected oligosaccharide, the glucose/galactose-based oligosaccharide or liraglutide. On the day of termination, after 5 weeks of treatment and an overnight fast, retroorbital blood was collected under anesthesia for the quantification of serum total cholesterol (TC), serum non-esterified fatty acids (NEFA), serum insulin and whole blood triglycerides (TG) to characterize the effects of the treatment groups on hyperlipidemia and hyperinsulinemia. The animals were then euthanized and their whole liver dissected and weighted. For each animal, separate liver sections (~100 mg each) were collected and frozen for the quantification of hepatic TG, hepatic TC and RNAseq transcriptomic analysis. One liver lobe was also preserved in 10% neutral buffered formalin (NBF) for embedding, sectioning and staining with H&E before being scored for severity of steatosis (0 to 3), lobular inflammation (0 to 3) and hepatocellular ballooning (0 to 2), using a validated histological scoring system for non-alcoholic fatty liver disease (Kleiner et al., Hepatology, 2005).

Figure 1:
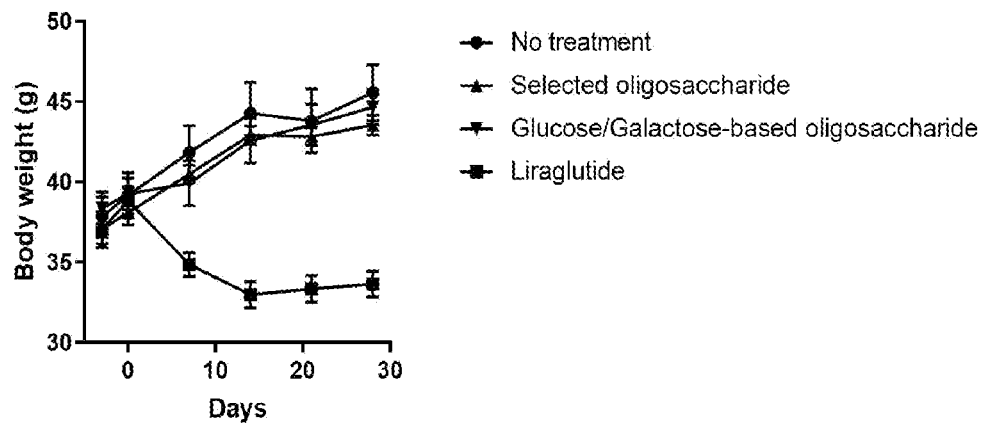
FIGS. 1A-1C provide graphs showing that the selected oligosaccharide composition has minimal impact on body weight (FIG. 1A), relative body weight (FIG. 1B) and food intake (FIG. 1C) in a high fat diet (HFD)-induced obese mouse model.
Figure 1:
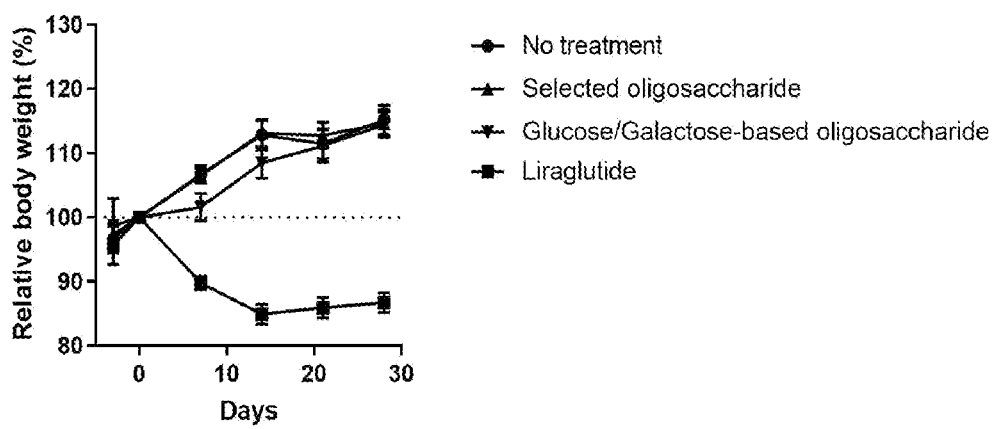
Figure 1:
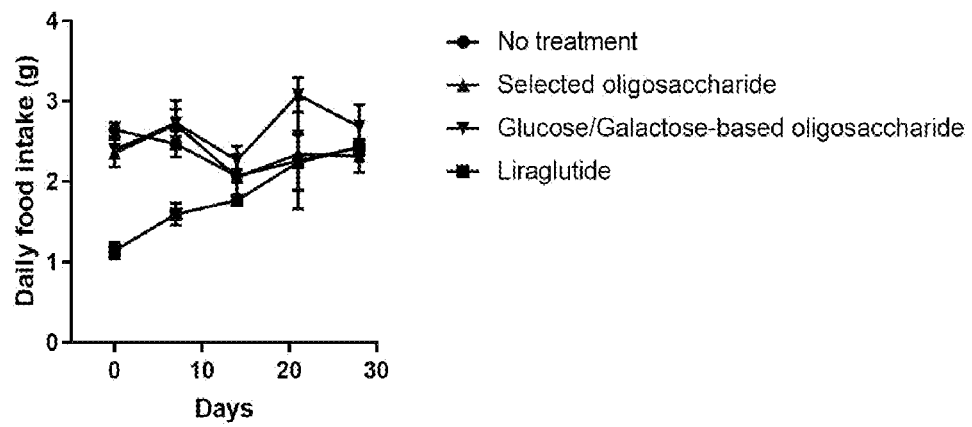
Figure 2:
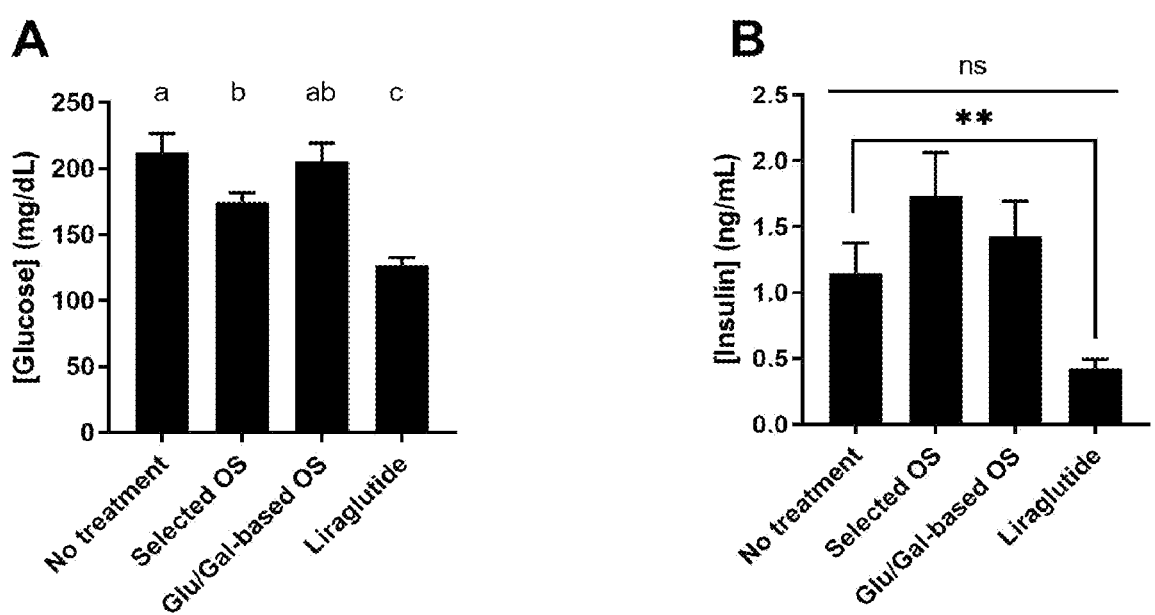
FIGS. 2A-2B provide graphs showing the effect of the selected oligosaccharide composition ("selected OS") on fasting blood glucose levels (FIG. 2A) and insulin (FIG. 2B) in a high fat diet (HFD)-induced obese mouse model.
Figure 3:
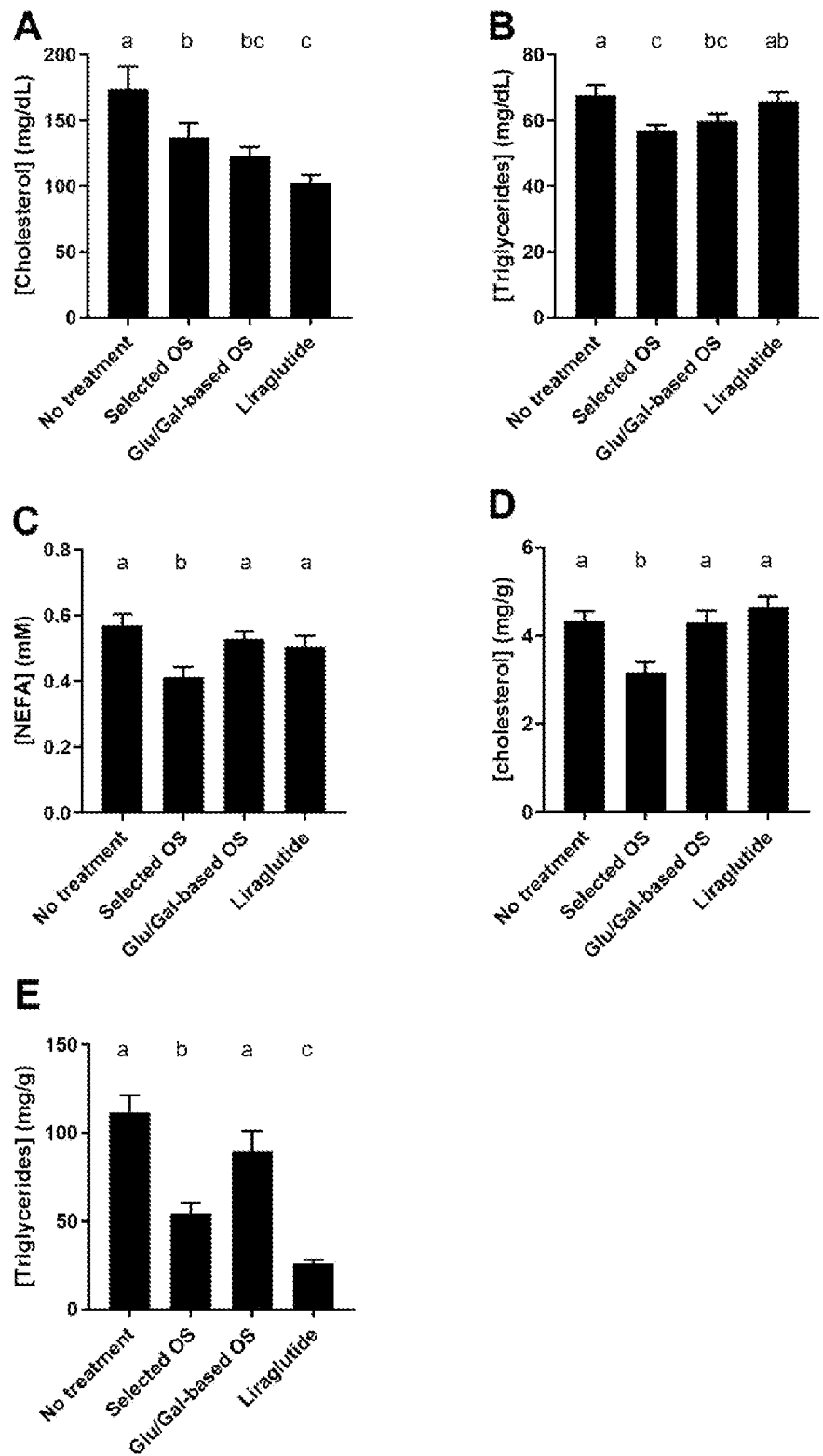
FIGS. 3A-3E provide graphs showing the effect of the selected oligosaccharide composition on fasting serum total cholesterol (FIG. 3A), blood triglycerides (FIG. 3B), serum non-esterified fatty acids (NEFA) (FIG. 3C), liver total cholesterol (FIG. 3D) and liver triglycerides (FIG. 3E) in a high fat diet (HFD)-induced obese mouse model. Data sets that do not share the same letter designation (a, b or c) are statistically different from one another.

As shown in FIGS. 1A, 1B and 1C, the two oligosaccharide compositions in this experiment do not appear to have a significant effect on body weight and food intake. Liraglutide lowered body weight by 15%. These data demonstrate that the two oligosaccharide compositions are well tolerated by HFD-induced obese mice. The selected oligosacchride composition and liraglutide lowered fasting blood glucose (FIG. 2A) compared to no treatment (NT). The selected oligosaccharide and the glucose/galactose-based oligosaccharide composition lowered serum total cholesterol (TC) by 21% and 29% and reduced blood triglycerides (TG) by 16% and 12% compared to NT, respectively (FIGS. 3A, 3B). Liraglutide also lowered serum total cholesterol (TC) (−41%) (FIG. 3A) but did not impact blood triglycerides (TG) (FIG. 3B). The selected oligosaccharide composition was the only treatment showing a reduction (−28%) in serum non-esterified fatty acids (NEFA) compared to NT (FIG. 3C). Altogether, the data on blood lipids demonstrate that the selected oligosaccharide composition reduced all three major blood lipids (TC, TG and NEFA) compared to NT in HFD-induced obese mice.

Figure 4:
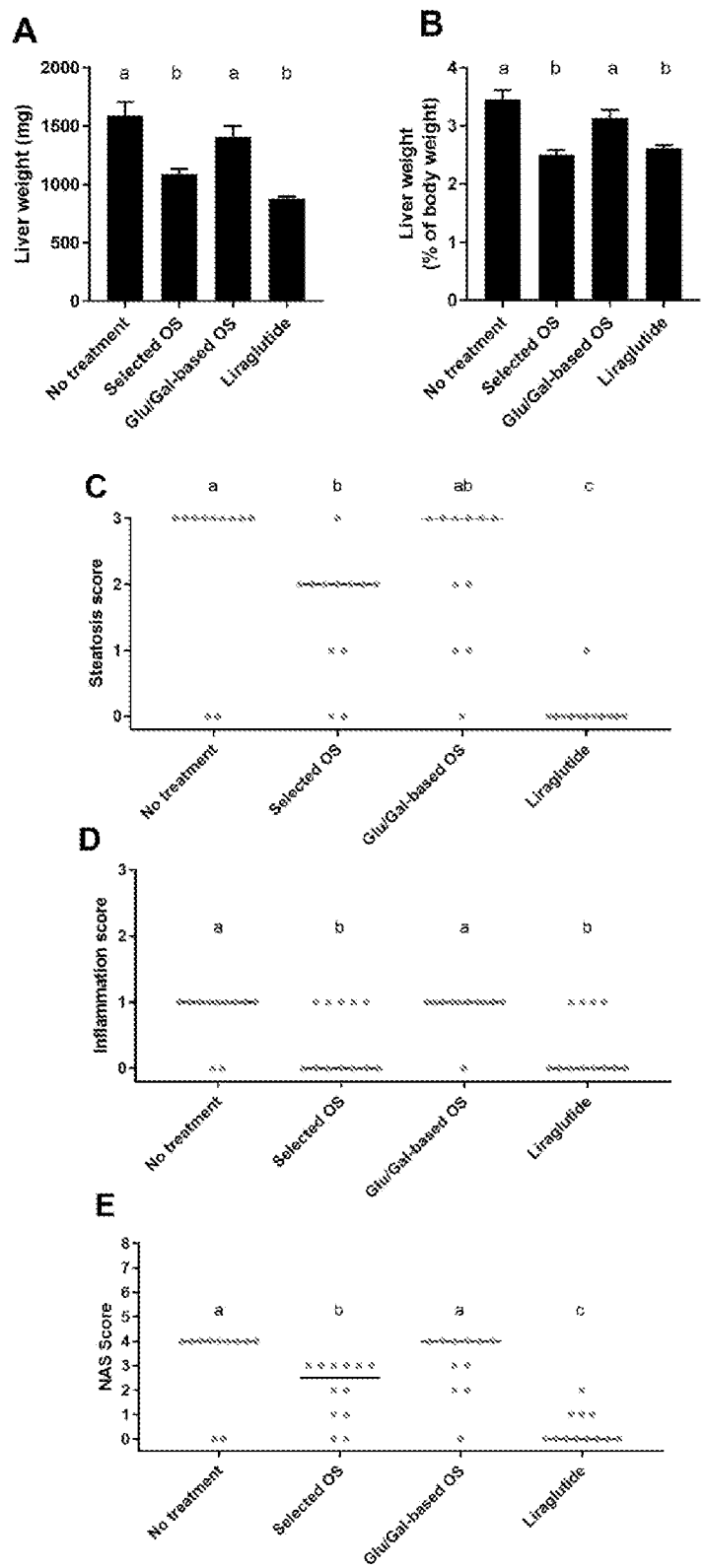
FIGS. 4A-4E provides graphs showing the effect of the selected oligosaccharide composition on liver weight (FIG. 4A), liver weight relative to body weight (FIG. 4B), liver steatosis (FIG. 4C), inflammation (FIG. 4D) and NAS (FIG. 4E) histological scores in a high fat diet (HFD)-induced obese mouse model. Data sets that do not share the same letter designation (a, b or c) are statistically different from one another.
Figure 7:
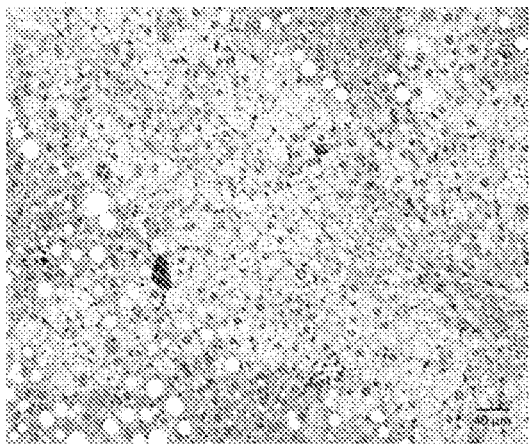
FIG. 7 provides representative images of liver histology for high-fat diet (HDF)-induced obese mice treated with the selected oligosaccharide, the glucose/galactose-based oligosaccharide or liraglutide after 5 weeks of treatment.
Figure 7:
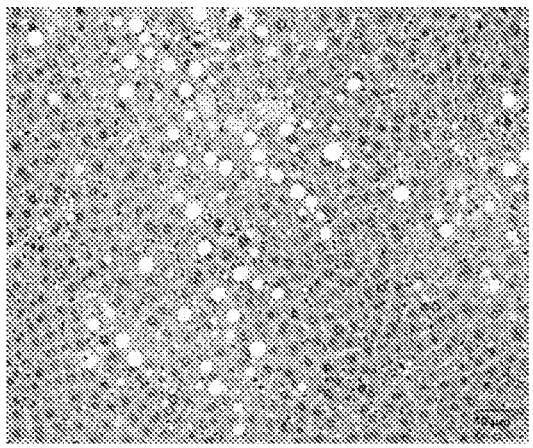
Figure 7:
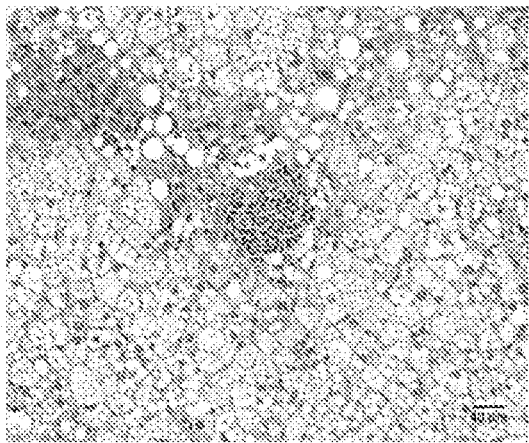
Figure 7:
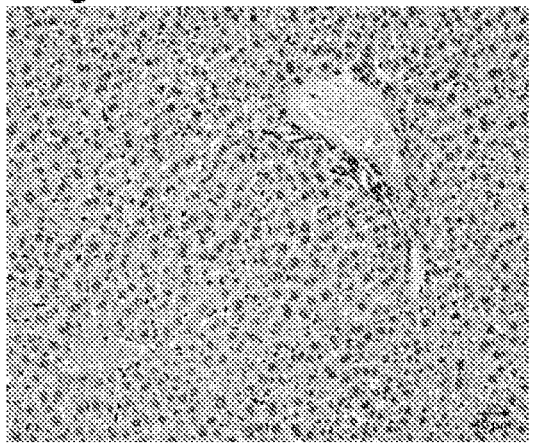

In addition to blood lipids, the selected oligosaccharide also lowered hepatic total cholesterol (−27%) (FIG. 3D) and hepatic triglycerides (−51%) (FIG. 3E). Those effects were not observed for the glucose/galactose-based oligosaccharide. Liraglutide lowered hepatic triglycerides but not hepatic total cholesterol (FIGS. 3D, 3E). The effects of the selected oligosaccharide composition and liraglutide on liver fat were corroborated by their lowering effect on liver weight (−31% and −55% for the absolute liver weight and −27% and −24% for the relative liver weight compared to NT, respectively) (FIGS. 4A, 4B) and a reduction in the liver steatosis pathology score compared to NT (−1 point and −3 points, respectively) (FIG. 4C). In addition, the selected oligosaccharide composition and liraglutide significantly lowered the liver inflammation pathology score (−1 point for both) compared to NT. No hepatocellular ballooning was observed in this model and was scored at zero for all treatments. Finally, the selected oligosaccharide composition significantly lowered the overall non-alcoholic fatty liver activity score (NAS), calculated as the sum of the liver steatosis, lobular inflammation and hepatocellular ballooning (−1.5 points) (FIG. 4E). Representative images of the liver histology for the different treatment groups are shown in FIG. 7 and illustrate the reduction in NAFLD pathology in animals treated with the selected oligosaccharide composition.

Consistent with its effects against liver fat accumulation, the selected oligosaccharide downregulated the hepatic expression of genes involved in lipogenesis and lipid storage compared to NT (Table 4). For example, the selected oligosaccharide reduced the expression of Scd1, the gene encoding for the stearoyl-CoA desaturase-1 protein, a key enzyme in fatty acid metabolism and the limiting step in the formation of monounsaturated fatty acids. The selected oligosaccharide also lowered the hepatic expression of marker genes of inflammation, liver damage and fibrosis (Table 4) such as the genes encoding serum amyloid A 1 and 2 (SAA1, SAA2), two liver-derived proteins elevated in chronic inflammatory or liver injury conditions. The expression of Cxcl10, a pro-inflammatory cytokine associated with the severity of lobular inflammation, which is an independent risk factor for NASH patients and a valid biomarker for the development of heart failure and left ventricular dysfunction, was also reduced by the selected oligosaccharide. Furthermore, Col1a1, a pro-fibrotic marker encoding the major component of type I collagen, was also downregulated by the selected oligosaccharide.

Consistent with its effect on lowering hepatic cholesterol, the selected oligosaccharide upregulated the genes controlled by sterol regulatory element-binding protein 2 (SREBP-2), a transcription factor activated by low levels of cholesterol in the liver, such as cholesterol biosynthetic genes controlled by SREBP-2 (Table 4). A lack of upregulation of genes associated with bile acid synthesis, liver cholesterol efflux or bile acid efflux genes combined with the concomitant reduction of both hepatic and serum cholesterol suggest that the selected oligosaccharide may act by limiting the absorption of cholesterol by the intestinal epithelium. This reduction in cholesterol absorption by the selected oligosaccharide could be mediated by a microbiome factor downregulating the expression, stability or activity of the cholesterol transporter Npc1l1 in the intestinal epithelium. A reduction in cholesterol intestinal absorption by the selected oligosaccharide may lead to the observed lowering in hepatic cholesterol, and would deplete hepatic oxysterols, the endogenous agonists of liver X receptor (LXR). LXR is a transcription factor controlling the expression of lipogenic genes, including genes downregulated by the selected oligosaccharide and involved in fatty acid synthesis (e.g., Scd1and Elovl6). A lowering in fatty acid synthesis mediated by a reduction in LXR activity could explain the observed reduction in hepatic triglycerides by the selected oligosaccharide. In addition, a reduction in hepatic fatty acids would decrease the amount of reactive oxygen species (ROS) produced by the β-oxidation of fatty acids and the associated oxidative stress, a well-known pro-inflammatory factor and inducer of pro-inflammatory cytokines (e.g., TNFα). This reduction in fatty acid β-oxidation is corroborated by a downregulation of Cpt1a, Acox1 and Acox3 (Table 4) by the selected oligosaccharide, which are three genes encoding enzymes involved in fatty acid β-oxidation. The reduction of ROS generated by fatty acid β-oxidation could be the mechanism by which the selected oligosaccharide dampens inflammation and reduces markers of inflammation and fibrosis in the liver.

Table 4. Effect of the Selected Oligosaccharide Composition on Gene Expression

| Gene Name | Description | log2 fold-change for the selected oligosaccharide composition compared to No Treatment | Adjusted p-value |
|---|---|---|---|
| Lipogenesis | | | |
| Elovl6 | ELOVL family member 6, elongation of long chain fatty acids | −0.62 | 2.14E−04 |
| Gpd1 | glycerol-3-phosphate dehydrogenase 1 | −0.64 | 5.73E−03 |
| Gpam | glycerol-3-phosphate acyltransferase, mitochondrial | −0.52 | 5.97E−02 |
| Mogat1 | monoacylglycerol O-acyltransferase 1 | −0.79 | 4.46E−02 |
| Scd1 | stearoyl-Coenzyme A desaturase 1 | −2.12 | 1.27E−04 |
| Lipid storage | | | |
| Cidec | cell death-inducing DFFA-like effector c | −1.01 | 4.36E−03 |
| Plin2 | perilipin 2 | −0.55 | 3.08E−04 |
| Markers of inflammation | | | |
| Cxcl10 | chemokine (C-X-C motif) ligand 10 | −0.565 | 4.49E−02 |
| Fos | FBJ osteosarcoma oncogene | −1.177 | 4.93E−02 |
| Lcn2 | lipocalin 2 | −2.591 | 9.95E−07 |
| Orm2 | orosomucoid 2 | −1.499 | 4.16E−05 |
| Orm3 | orosomucoid 3 | −1.384 | 4.71E−04 |
| Saa1 | serum amyloid A 1 | −2.39 | 2.36E−04 |
| Saa2 | serum amyloid A 2 | −3.064 | 4.06E−06 |
| Tnfaip3 | tumor necrosis factor, alpha-induced protein 3 | −0.646 | 2.22E−02 |
| Markers of fibrosis | | | |
| Col1a1 | collagen, type I, alpha 1 | −1.811 | 1.37E−03 |
| Col15a1 | collagen, type XV, alpha 1 | −1.389 | 1.88E−03 |
| Lamb3 | laminin, beta 3 | −1.178 | 1.66E−11 |
| Mmp12 | matrix metallopeptidase 13 | −1.195 | 3.31E−02 |
| Cholesterol biosynthesis | | | |
| Fdps | farnesyl diphosphate synthetase | 1.848 | 6.26E−14 |
| Idi1 | isopentenyl-diphosphate delta isomerase | 2.558 | 1.26E−13 |
| Insig1 | insulin induced gene 1 | 1.404 | 3.34E−14 |
| Hmgcr | 3-hydroxy-3-methylglutaryl-Coenzyme A reductase | 1.13 | 1.20E−05 |
| Hmgcs1 | 3-hydroxy-3-methylglutaryl-Coenzyme A synthase 1 | 1.066 | 7.34E−06 |
| Lss | lanosterol synthase | 1.065 | 2.41E−07 |
| Msmo1 | methylsterol monoxygenase 1 | 2.102 | 1.25E−12 |
| Mvd | mevalonate (diphospho) decarboxylase | 1.795 | 3.13E−07 |
| Sqle | squalene epoxidase | 2.113 | 1.54E−07 |
| Fatty acid beta-oxidation | | | |
| Acox1 | acyl-Coenzyme A oxidase 1, palmitoyl | −0.447 | 1.37E−02 |
| Acox3 | acyl-Coenzyme A oxidase 3, pristanoyl | −0.561 | 6.84E−03 |
| Cpt1a | carnitine palmitoyltransferase 1a, liver | −0.329 | 1.51E−01 |

Figure 5:
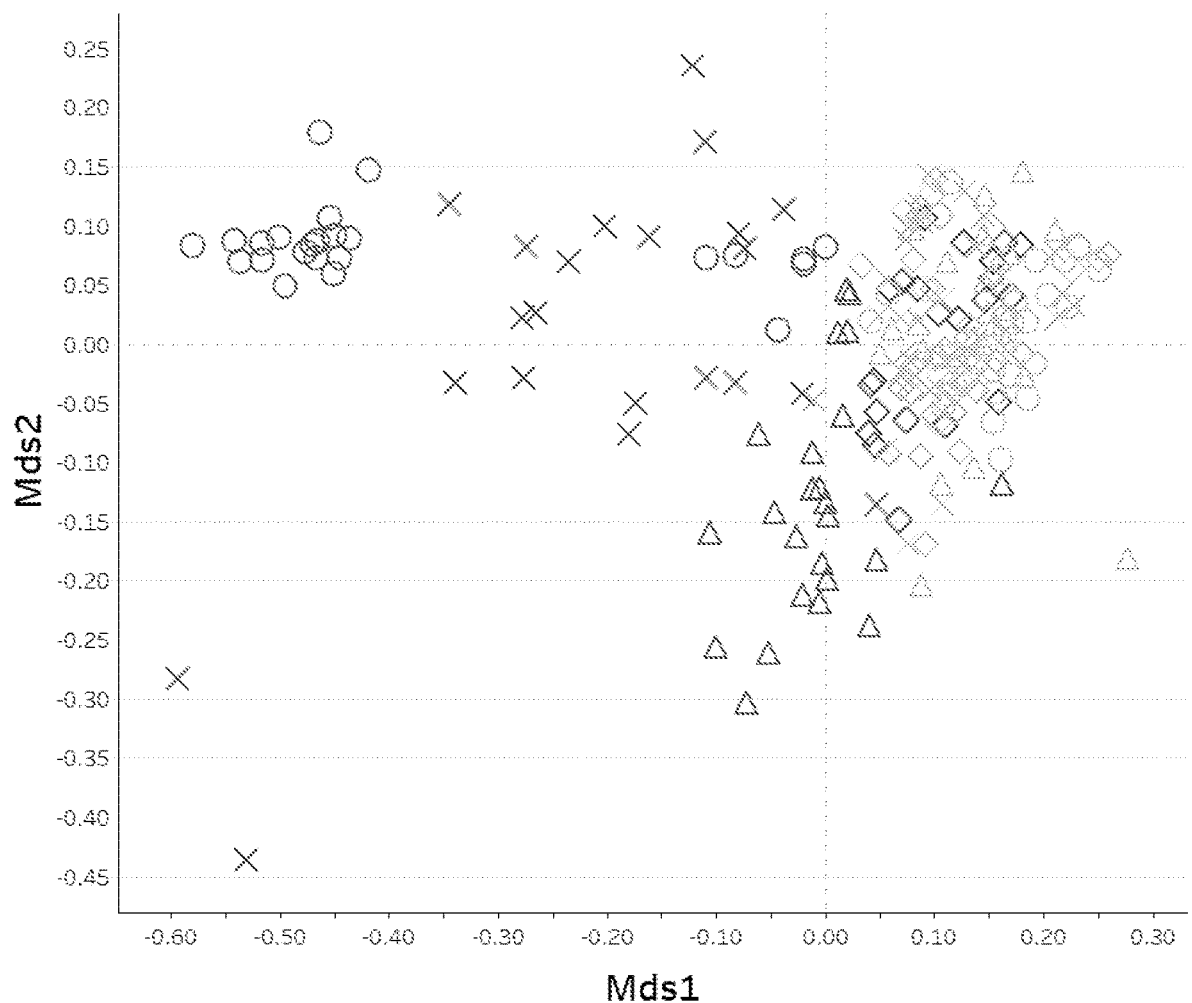
FIG. 5 provides a multidimensional scaling (MDS) ordination plot of fecal microbiomes from high-fat diet (HFD)-induced obese mice treated with the selected oligosaccharide (circle), the glucose/galactose-based oligosaccharide (cross) or liraglutide (triangle) at one week before treatment initiation (light shading) or after 4 weeks of treatment (black shading).

Shallow shotgun sequencing of fecal samples collected before and at the end of the treatment period showed that the selected oligosaccharide had a measurable impact on the gut microbial community. The multidimensional scaling (MDS) ordination plot of the microbiome sequencing data shown in FIG. 5 demonstrates that the gut microbiome composition of animals treated with the selected oligosaccharide (circles in FIG. 5) is distinct from their baseline state, and from the gut microbiome of animals from the NT and the the glucose/galactose-based oligosaccharide (crosses in FIG. 5) or liraglutide (triangles in FIG. 5).

Figure 6:
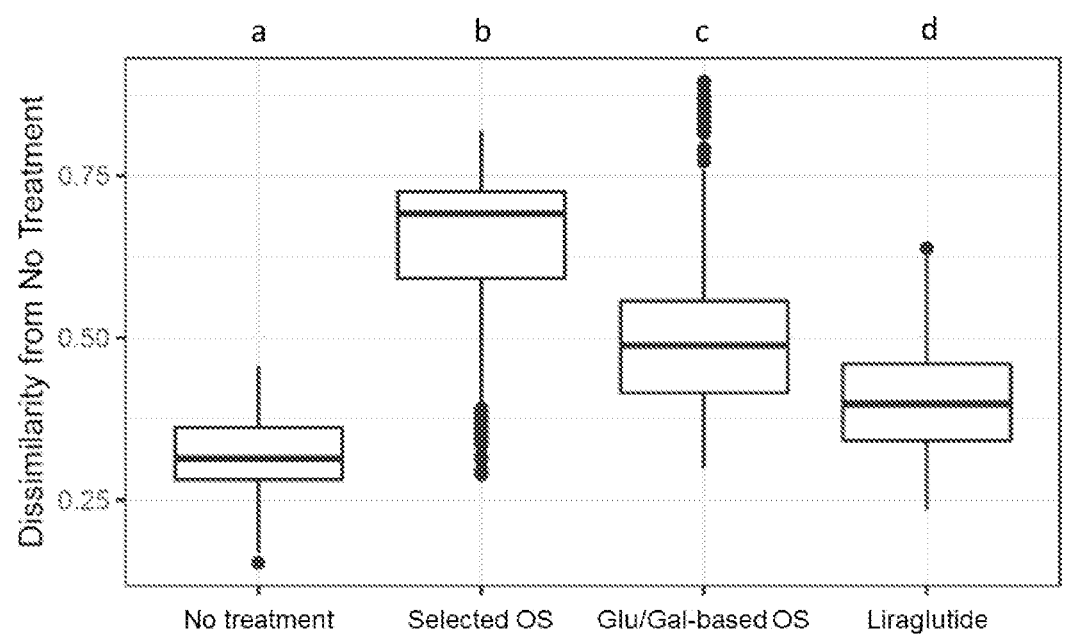
FIG. 6 provides a graph showing microbiome dissimilarity of high-fat diet (HFD)-induced obese mice treated with the selected oligosaccharide, the glucose/galactose-based oligosaccharide or liraglutide relative to control HFD-induced mice (no treatment).

In addition, it also shows that the effect of the selected oligosaccharide on the gut microbial composition was larger compared to the glucose/galactose-based oligosaccharide and liraglutide. This was further verified by the Bray-Curtis dissimilarity analyses presented in FIG. 6 which showed that the animals treated with the selected oligosaccharide had a more dissimilar gut microbial community at the end of the treatment period compared to the other treatment groups. Animals treated with the selected oligosaccharide also had a more dissimilar gut microbial community from their original state (before treatment) compared to the other treatment groups. The changes in the mouse gut microbiome composition triggered by the selected oligosaccharide include the enrichment of *Bacteroides, Blautia, Parabacteroides, Akkermansia, Butyricimonas*, Ruthenibacterium, *Subdoligranulum* and the depletion of *Anaerotruncus, Enterococcus*, Dorea and *Streptococcus* genera (Table 5). Importantly, *Bacteroides* and *Parabacteroides* are depleted in atherosclerotic patients, while Dorea, *Streptococcus* and *Enterococcus* are enriched in those patients. Therefore, the selected oligosaccharide has the potential to shift the gut microbiota away from dysbiosis and restore the gut microbiome in cardiovascular disease patients. In addition, *Akkermansia* is a genus associated with reduced obesity, diabetes and inflammation, supporting the potential use of the selected oligosaccharide to treat those conditions.

TABLE 5

Change in amount of bacterial genera in the fecal microbiome of HFD-induced obese mice treated with the selected oligosaccharide after 4 weeks of treatment

| Genus | log2 fold-change for the selected oligosaccharide composition compared to No Treatment | Adjusted p-value |
| --- | --- | --- |
| Enriched genera | | |
| *Akkermansia* | 4.92 | 1.85E−06 |
| *Alistipes* | 1.06 | 1.19E−03 |
| *Anaerofustis* | 1.87 | 3.84E−03 |
| *Anaerosporobacter* | 1.46 | 1.18E−02 |
| *Anaerostipes* | 6.14 | 5.46E−05 |
| *Bacteroides* | 4.14 | 1.24E−10 |
| *Bariatricus* | 2.89 | 8.42E−05 |
| *Blautia* | 7.08 | 1.93E−07 |
| *Butyricimonas* | 3.04 | 2.28E−06 |
| *Coprobacillus* | 2.77 | 4.86E−04 |
| *Eisenbergiella* | 1.29 | 1.07E−04 |
| *Erysipelatoclostridium* | 2.37 | 1.39E−04 |
| *Lachnoclostridium* | 2.74 | 3.94E−07 |
| *Parabacteroides* | 3.47 | 2.37E−07 |
| *Ruthenibacterium* | 7.35 | 7.38E−04 |
| *Subdoligranulum* | 5.90 | 1.73E−03 |
| Depleted genera | | |
| *Adlercreutzia* | −1.16 | 1.01E−02 |
| *Agathobaculum* | −1.38 | 7.47E−03 |
| *Anaerotignum* | −1.07 | 3.68E−03 |
| *Anaerotruncus* | −3.45 | 1.46E−07 |
| *Angelakisella* | −2.32 | 1.96E−05 |
| *Bacillus* | −2.50 | 3.73E−04 |
| *Coprococcus* | −1.32 | 2.94E−04 |
| *Dorea* | −1.37 | 3.72E−04 |
| *Enterococcus* | −1.11 | 3.73E−03 |
| *Enterorhabdus* | −1.67 | 1.29E−05 |
| *Fournierella* | −2.21 | 1.38E−03 |
| *Intestinimonas* | −1.98 | 3.30E−05 |
| *Lactobacillus* | −2.34 | 5.83E−06 |
| *Lactococcus* | −2.19 | 1.25E−05 |
| *Merdimonas* | −3.03 | 3.19E−04 |
| *Mucispirillum* | −1.59 | 3.71E−02 |
| *Negativibacillus* | −2.53 | 1.36E−04 |
| *Odoribacter* | −1.07 | 3.96E−02 |
| *Oscillibacter* | −2.23 | 1.33E−05 |
| *Pediococcus* | −3.79 | 2.27E−05 |
| *Pseudoflavonifractor* | −2.45 | 1.41E−05 |
| *Staphylococcus* | −2.57 | 2.24E−03 |
| *Streptococcus* | −1.91 | 1.08E−04 |

The selected oligosaccharide composition demonstrated significant lowering effects of all major blood lipids in the HFD-induced obese mouse model (TC, TG, NEFA), associated with an improvement of liver pathologies related to non-alcoholic fatty liver disease (hepatic steatosis and inflammation). This is corroborated by a reduction in the hepatic expression of lipogenic genes, markers of inflammation and fibrogenic genes caused by the selected oligosaccharide composition. These data suggest that the selected oligosaccharide composition might be useful as a treatment for acquired or genetic hyperlipidemic conditions and may aide the prevention of associated diseases, such as, e.g., NAFLD, NASH and cardiovascular disease.

Example 11. Therapeutic and Microbiome Effects of the Selected Oligosaccharide Composition in a Western Diet (WD)-Induced Obese Mouse Genetic Model The therapeutic and microbiome effects of the selected oligosaccharide composition were tested in a validated western diet (WD)-induced obese low density lipoprotein receptor knock-out ($ldlr^{-/-}$) mouse model, thought to recapitulate a number of metabolic pathologies found in humans, including obesity, hyperglycemia, glucose intolerance, hyperinsulinemia, insulin resistance, severe hypercholesterolemia, hypertriglyceridemia, atherosclerosis, hepatic steatosis and hepatic inflammation. Fenofibrate, a peroxisome proliferator receptor alpha (PPAR) activator prescribed to hypercholesterolemic, hypertriglyceridemic or mixed dyslipidemic patients to reduce elevated low-density lipoprotein (LDL), total cholesterol (TC) or triglycerides (TG), was used as a positive control.

9-11 weeks old male C57BL/6J $ldlr^{-/-}$ mice were split into one of four treatment groups (12 animals per group, 4 animals per cage)—(1) no treatment (NT), (2) the selected oligosaccharide (as produced by the process described in Example 2), (3) a glucose/galactose-based oligosaccharide composition and (4) fenofibrate—for 16 weeks. Mice in the NT group were fed a Western diet (WD) (40 kcal % fat, 1.5% cholesterol, Research Diets D12079B). Mice in the oligosaccharide composition groups (#2 and #3) were fed the WD supplemented with 7.5% w/w of their respective composition. The oligosaccharide composition treatment diets were modified to provide the same caloric value to the mice as those mice on the WD (without oligosaccharide composition). Mice in the fenofibrate group were fed the WD supplemented with fenofibrate (100 mg/kg/day). The body weight for each animal was measured prior to the treatment period and weekly over the treatment period. 4-day food intake for each cage was measured weekly over the treatment period and averaged as food intake per mouse per day. Fresh fecal samples were collected within a week prior to treatment initiation and during week 15 post treatment initiation. For each fecal collection period, one fresh fecal pellet was collected on three separate days for each animal. Fecal samples were sent for shallow shotgun sequencing to characterize the changes in the gut microbiome caused by the two oligosaccharide compositions or fenofibrate. On the day of termination, after 16 weeks of treatment and an overnight fast, retroorbital blood was collected under anesthesia for the quantification of serum very low density lipoprotein (VLDL), serum low density lipoprotein (LDL), serum high density lipoprotein (HDL), serum total cholesterol (TC), serum non-esterified fatty acids (NEFA), serum insulin and whole blood triglycerides (TG) to characterize the effects of the selected oligosaccharide composition, the glucose/galactose-based oligosaccharide composition and fenofibrate on hyperlipidemia and hyperinsulinemia. The animals were then euthanized and their whole liver dissected and weighed. For each animal, separate liver sections (~100 mg each) were collected and frozen for the quantification of hepatic TG and hepatic TC. One liver lobe was also preserved in 10% neutral buffered formalin (NBF) for embedding, sectioning and staining with H&E before being scored for severity of steatosis, lobular inflammation and hepatocellular ballooning, using a validated histological scoring system for non-alcoholic fatty liver disease (Kleiner et al., Hepatology, 2005). The aortic arch was also dissected and preserved in 10% NBF after perfusion with phosphate buffer saline (PBS). The aortic arch was surface stained with oil red O for the quantification of atherosclerotic plaque surface area.

Figure 8:
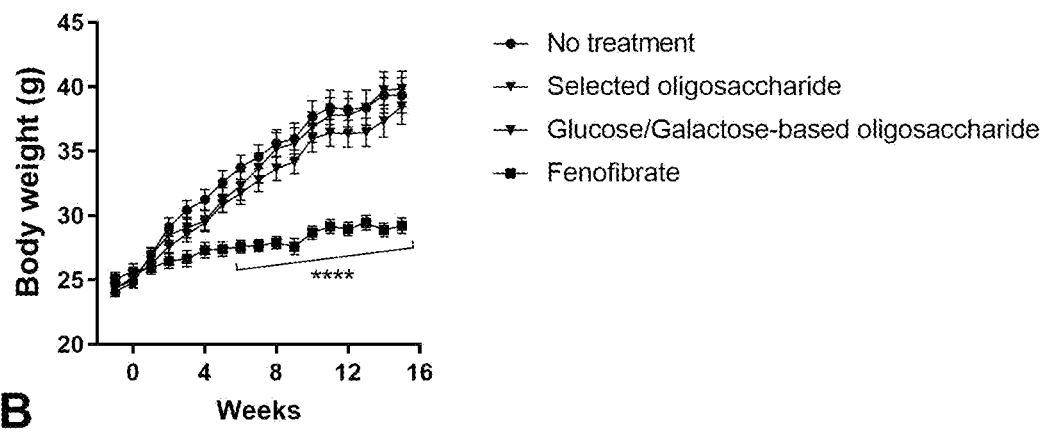
FIGS. 8A-8C provide graphs showing the effect of the selected oligosaccharide composition on body weight (FIG. 8A), relative body weight (FIG. 8B) and food intake (FIG. 8C) in a western diet (WD)-induced obese low density lipoprotein receptor knock-out (ldlr$^{-/-}$) mouse model.
Figure 8:
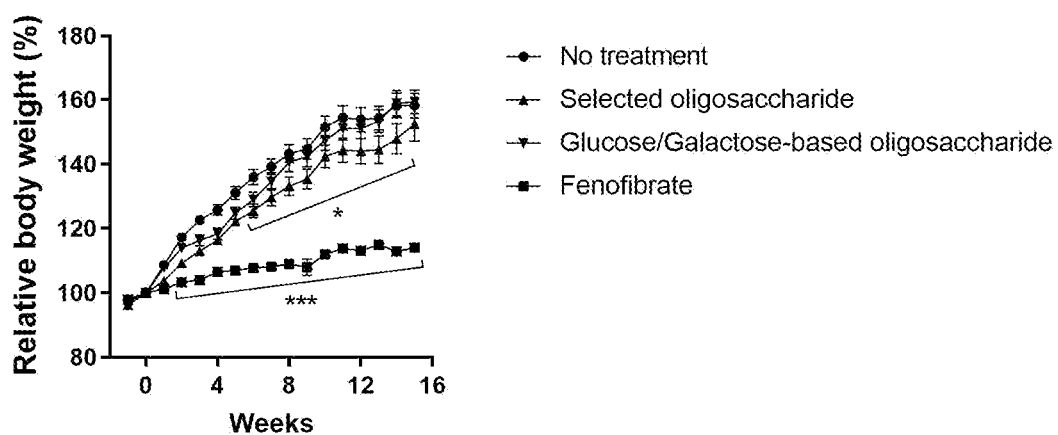
Figure 8:
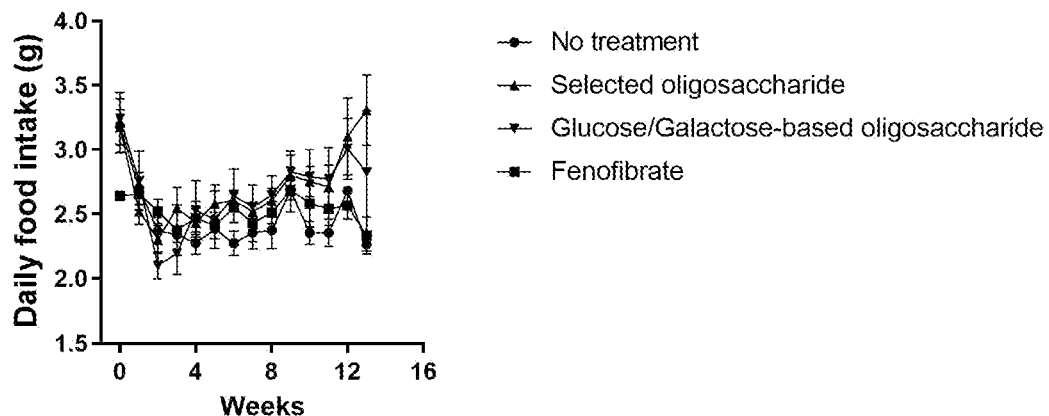
Figure 9:
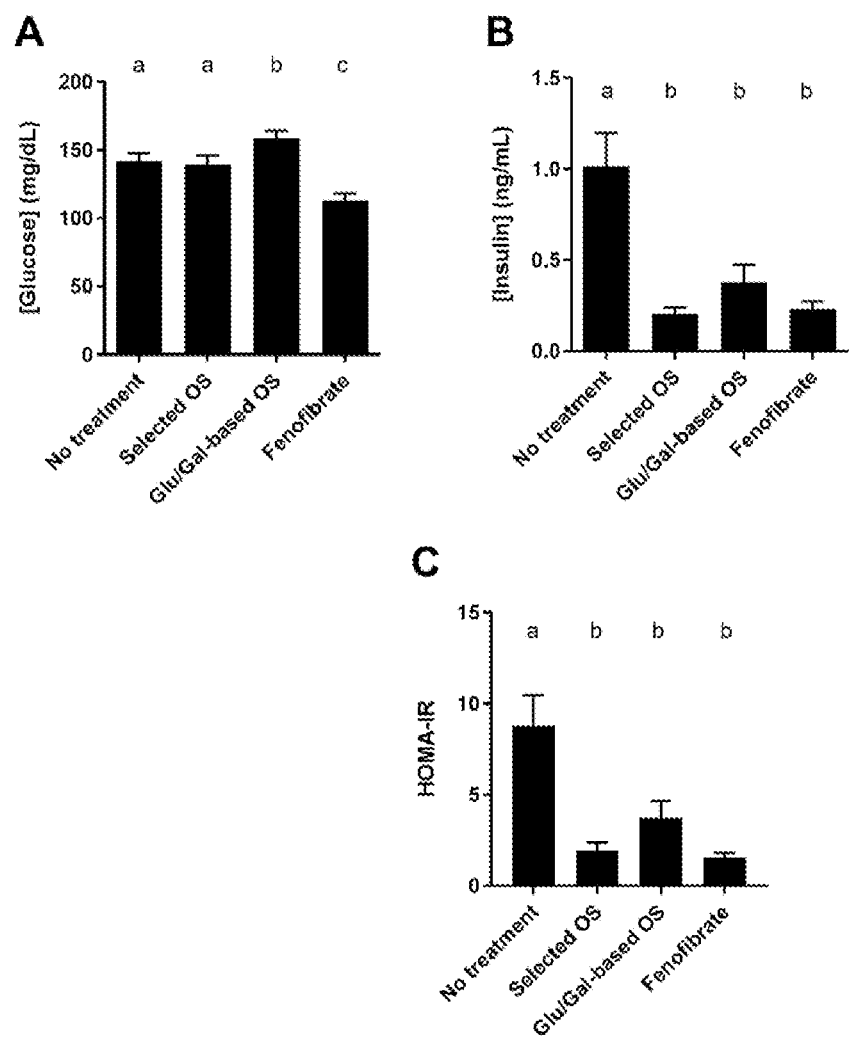
FIGS. 9A-9C provide graphs showing the effect of the selected oligosaccharide composition on fasting blood glucose concentration (FIG. 9A), fasting serum insulin concentration (FIG. 9B) and HOMA-IR score (FIG. 9C) after 15-16 weeks of treatment in a western diet (WD)-induced obese low density lipoprotein receptor knock-out (ldlr$^{-/-}$) mouse model. Data sets that do not share the same letter designation (a, b or c) are statistically different from one another.
Figure 10:
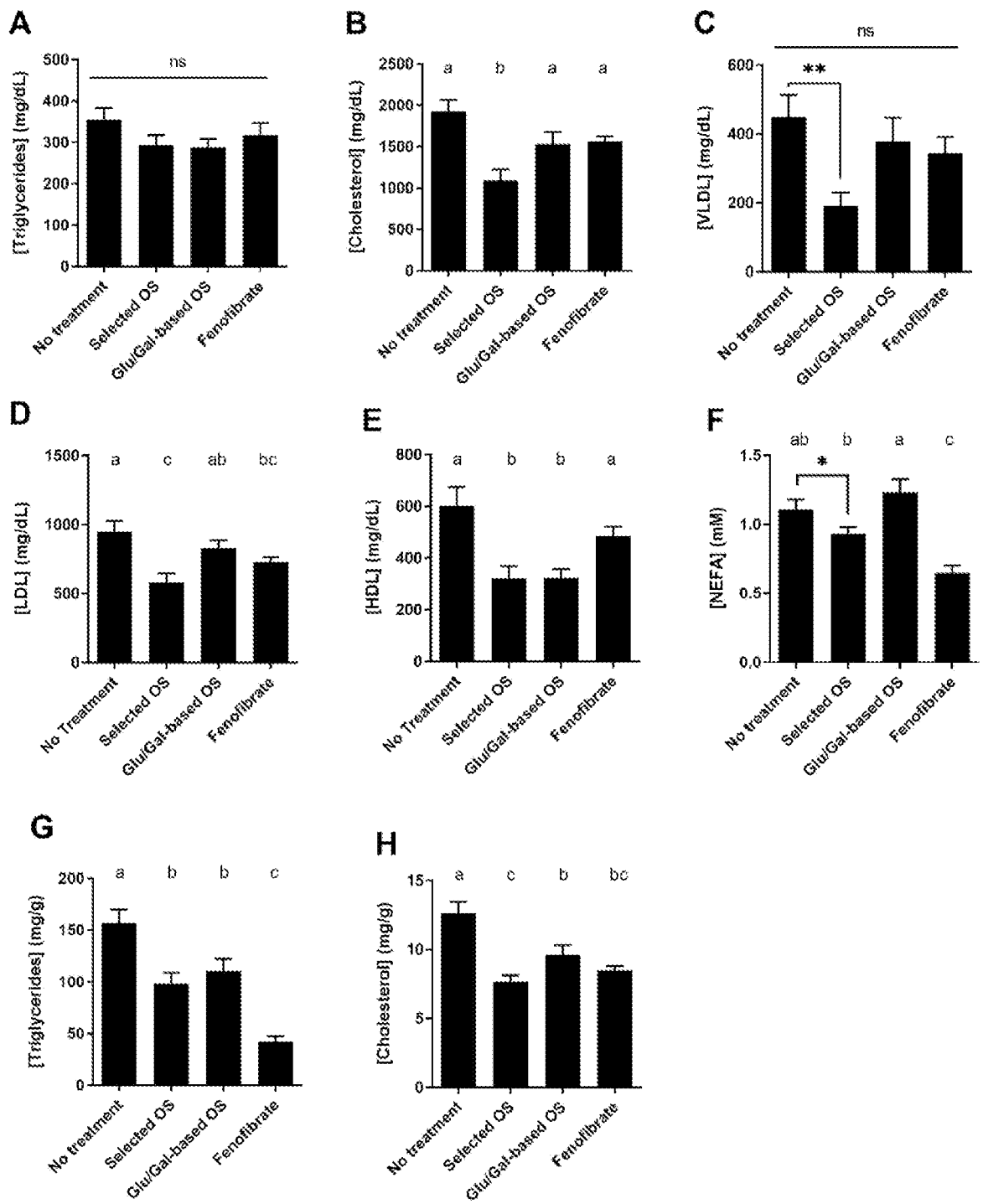
Figure 11:
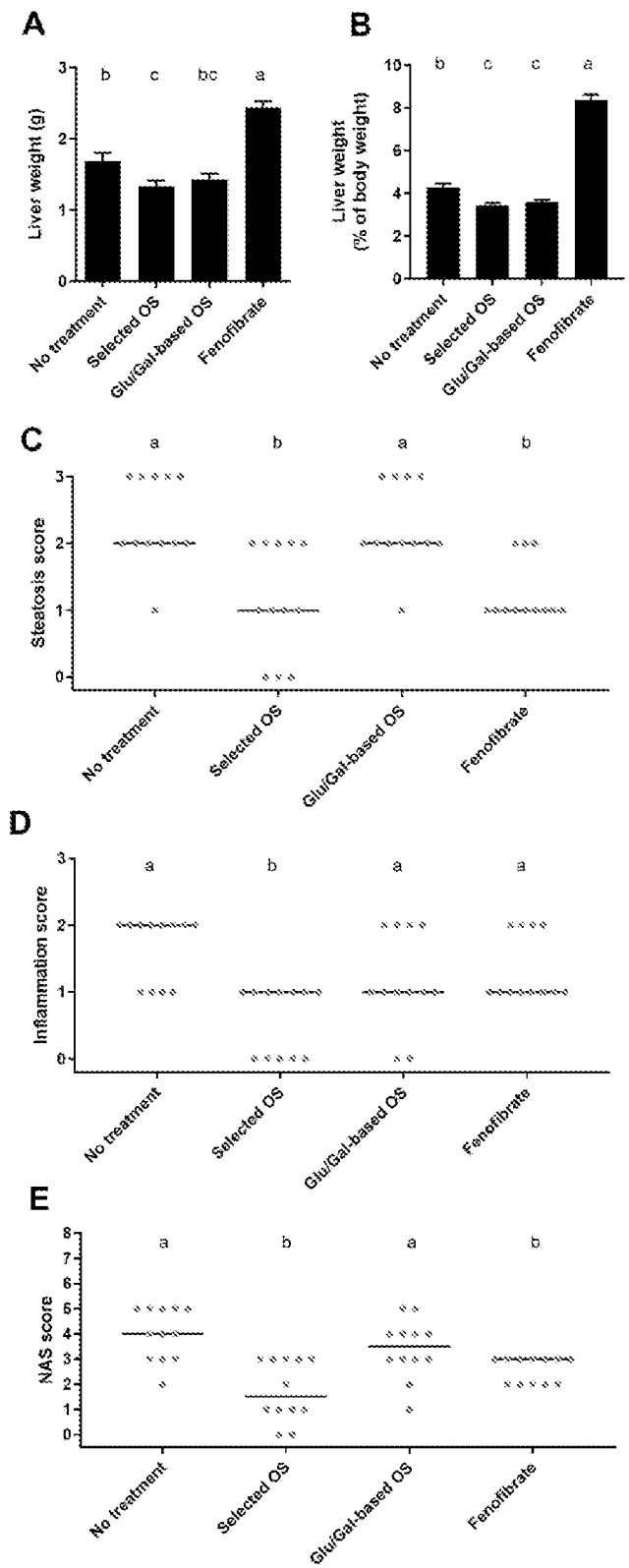
Figure 11F:
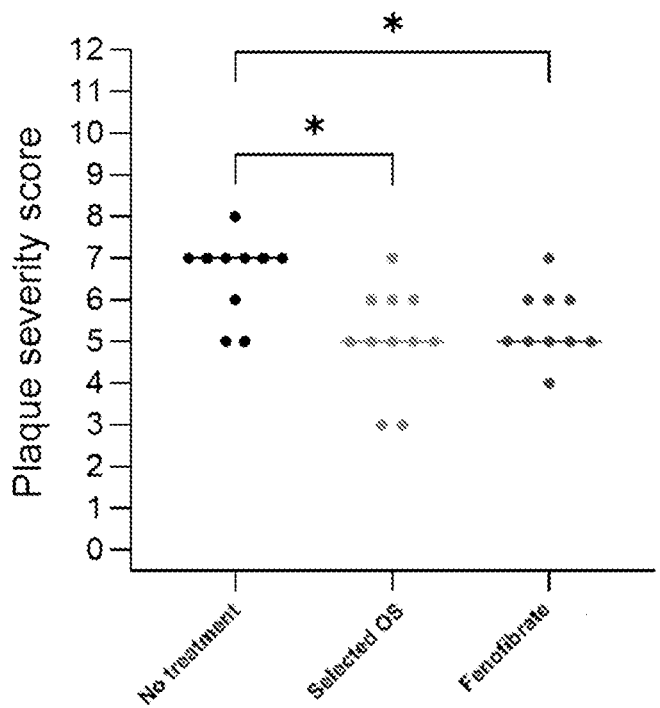
Figure 11G:
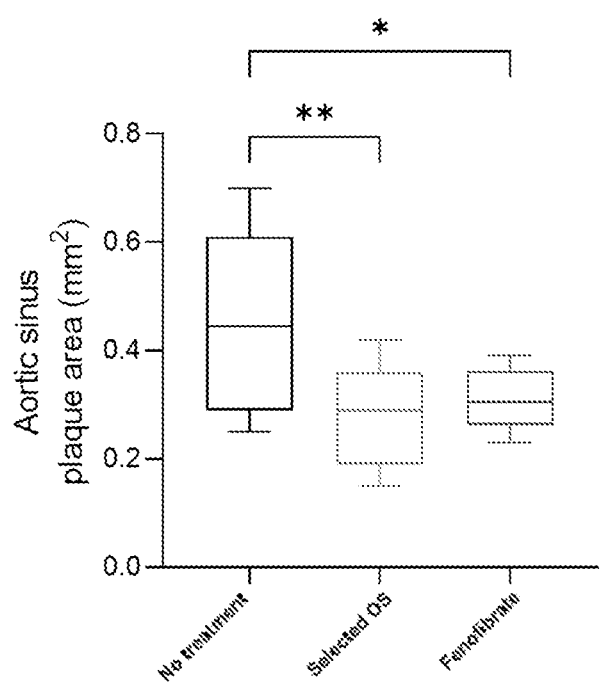
Figure 11H:
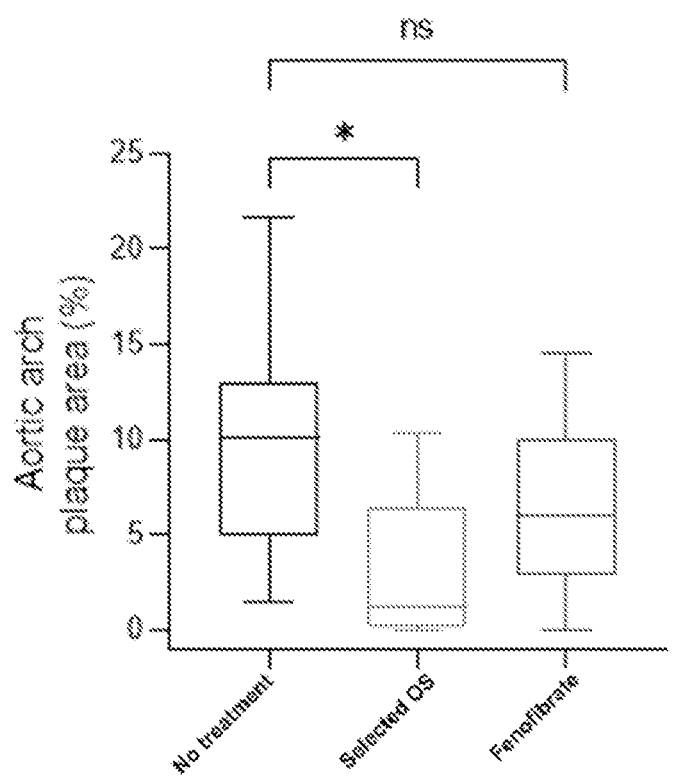

As shown in FIGS. 8A and 8B, the selected oligosaccharide compositions had a minor effect on body weight gain. Meanwhile, fenofibrate lowered body weight gain by 44% compared to NT. The oligosaccharide compositions and fenofibrate had no effect on food intake (FIG. 8C). Those data demonstrate that the two oligosaccharide compositions were well tolerated by WD-induced obese ldlr$^{-/-}$ mice. The selected oligosaccharide composition did not lower fasting glucose compared to NT (FIG. 9A). Similar to fenofibrate, the selected oligosaccharide composition reduced fasting insulin (−80%) and the homeostatic model assessment of insulin resistance (HOMA-IR) (−78%) (FIGS. 9B-9C) compared to NT, indicating that the selected oligosaccharide composition reduces insulin resistance in WD-induced obese ldlr$^{-/-}$ mice. The selected oligosaccharide composition was the only treatment group that significantly lowered serum TC (−43%) compared to NT (FIG. 10B). The selected oligosaccharide composition also provided the largest effect on lowering serum VLDL (−58%; significant by t-test) and LDL (−39%) compared to NT (FIGS. 10C-10D); and significantly lowered serum HDL compared to NT (−47%) (FIG. 10E). In addition, the selected oligosaccharide lowered serum NEFA (−16%; significant by t-test) (FIG. 10F). In addition to its large effect on serum TC and LDL, the selected oligosaccharide composition lowered hepatic TC (−39%, compared to NT) (FIG. 10H) and significantly reduced hepatic TG compared to NT (−37%) (FIG. 10G). The effect of the selected oligosaccharide composition on liver fat was corroborated by its lowering effect on liver weight (FIGS. 11A, 11B) and a reduction in the liver steatosis pathology score compared to NT (−1 point) (FIG. 11C). Furthermore, the selected oligosaccharide composition significantly lowered the liver inflammation pathology score (−1 point) compared to NT (FIG. 11D). No hepatocellular ballooning was observed in this model and was scored at zero for all treatments. The selected oligosaccharide composition also significantly lowered the overall non-alcoholic fatty liver activity score (NAS), calculated as the sum of the liver steatosis, lobular inflammation and hepatocellular ballooning (−2.5 points) (FIG. 11E). Finally, the selected oligosaccharide composition also led to a significant reduction in the overall plaque severity score in the aortic sinus (−2 points) (FIG. 11F), along with significant reductions in atherosclerotic plaque formation in the aortic sinus (38% reduction relative to no treatment) (FIG. 11G) and in the aortic arch (38% reduction relative to no treatment) (FIG. 11H). Representative pictures of the liver histology for the different groups are shown in FIG. 13 and illustrate the reduction in NAFLD pathology in animals treated with the selected oligosaccharide. In addition to its beneficial effects in the liver, the selected oligosaccharide reduced atherosclerosis plaque formation in the aortic arch (−64%) (FIGS. 14A-14B), in accordance with its effect on lowering serum total cholesterol and LDL.

Shallow shotgun sequencing of fecal samples collected before, in the middle and at the end of the treatment period showed that the selected oligosaccharide has a large and impact on the gut microbial community. The multidimensional scaling (MDS) ordination plot of the microbiome sequencing data shown in FIG. 12 demonstrates that the gut microbiome composition of animals treated with the selected oligosaccharide (circles in FIG. 12) was distinct from the gut microbiome of animals from the NT (diamonds in FIG. 12), the glucose/galactose-based oligosaccharide (crosses in FIG. 12) or fenofibrate (triangles in FIG. 12). This was confirmed by the Bray-Curtis dissimilarity analyses presented in FIG. 15 and showing that the animals treated with the selected oligosaccharide had a more dissimilar gut microbial community than the other treatment groups at the end of the treatment period compared to the NT group. The changes in the gut microbiome composition triggered by the selected oligosaccharide include the enrichment of Allistipes, *Blautia, Parabacteroides, Akkermansia*, Ruthenibacterium, *Subdoligranulum* and the depletion of *Anaerotruncus*, Dorea, *Staphylococcus, Streptococcus* and *Enterococcus* genera (Table 6). Importantly, *Parabacteroides* are depleted in atherosclerotic patients, while Dorea, *Streptococcus* and *Enterococcus* are enriched in those patients. Therefore, the selected oligosaccharide has the potential to shift the gut microbiota away from dysbiosis and restore the gut microbiome in cardiovascular disease patients. In addition, *Akkermansia* is a genus associated with reduced obesity, diabetes and inflammation, supporting the use of the selected oligosaccharide to treat those conditions.

FIG. 19 shows significantly enriched taxa (adjusted p-value <0.05, Mann-Whitney U test with FDR correction) at phylum, family, genus, and species levels in mice treated with the selected oligosaccharide composition in comparison to non-treated (NT) group at the end of the study. Many of these enriched bacterial taxa are recognized as propionate-producing bacterial taxa (e.g., Bacteroidetes, Rickenellaceae, Tannerellaceae, Alistipes, *Parabacteroides* and, to a lesser extent, the Ruminococcaceae family) or acetate-producing taxa (e.g., *Blautia producta*). The selected oligosaceharide composition also enriched *Akkermansia muciniphila* and *Parasutterella*, a genus belonging to the Proteobacteria phylum and recently shown to be associated with reduced LDL-C in humans.

TABLE 6

Change in amount of bacterial genera in the fecal microbiome of WD-induced obese ldlr$^{-/-}$ mice treated with the selected oligosaccharide after 15 weeks of treatment

| Genus | log2 fold-change for the selected oligosaccharide composition compared to No Treatment | Adjusted p-value |
| --- | --- | --- |
| Enriched genera | | |
| Akkermansia | 2.19 | 1.22E-08 |
| Alistipes | 4.57 | 2.48E-12 |
| Bariatricus | 1.75 | 0.003348 |
| Blautia | 6.72 | 1.35E-08 |
| Lachnoclostridium | 2.01 | 1.18E-08 |
| Parabacteroides | 3.15 | 1.21E-08 |
| Parasutterella | 2.18 | 1.33E-07 |
| Ruthenibacterium | 6.72 | 1.59E-08 |
| Sellimonas | 2.56 | 1.45E-07 |
| Subdoligranulum | 5.69 | 1.77E-08 |
| Depleted genera | | |
| Adlercreutzia | −3.06 | 4.73E-08 |
| Anaerotruncus | −4.51 | 1.08E-08 |
| Clostridium | −2.53 | 1.12E-08 |
| Dorea | −5.05 | 1.67E-08 |
| Enterococcus | −2.92 | 1.58E-03 |
| Faecalibaculum | −1.04 | 5.24E-05 |
| Intestinimonas | −4.25 | 2.99E-05 |
| Lactococcus | −2.64 | 1.10E-07 |
| Lactonifactor | −2.44 | 4.03E-05 |
| Oscillibacter | −4.73 | 1.22E-08 |
| Pseudoflavonifractor | −5.04 | 4.80E-06 |
| Staphylococcus | −4.36 | 2.26E-07 |
| Streptococcus | −3.75 | 1.40E-05 |

Short-chain fatty acids (SCFAs) were quantified in the cecum content of the WD-fed ldlr$^{-/-}$ mice. Treatment with the selected oligosaccharide composition in the ldlr$^{-/-}$ mice increased the levels of total acetate and propionate by 126% and 342% compared to NT (FIG. 18A). A small increase in butyrate was also observed, although non-significant. In addition, the selected oligosaccharide composition decreased the fractional proportion of acetate and butyrate by 42% and 12%, respectively, and increased the fractional proportion of propionate by 84% compared to NT (FIG. 181B). This suggests that the selected oligosaccharide composition induces an enrichment in propionate-producing bacteria in vivo. The selected oligosaccharide composition also significantly increased the total amount and proportion of succinate by 547% and 169%, respectively. Succinate is a key intermediate in the "succinate pathway" of propionate formation, the major propionate biosynthetic pathway in the large intestine, e.g., for taxa belonging to the Bacteroidetes phylum. As expected, fenofibrate did not modify the total amount or proportion of SCFAs or succinate.

The selected oligosaccharide composition demonstrated lowering effects of blood TC, VLDL and LDL in the WD-induced obese ldlr$^{-/-}$ mouse model, associated with an improvement of liver pathologies related to non-alcoholic fatty liver disease (hepatic steatosis and inflammation) and a reduction in atherosclerosis plaque formation. In addition, the selected oligosaccharide composition also reduced insulin and the HOMA-IR in this animal model. Furthermore, these data demonstrate that the selected oligosaccharide composition increased the amount of propionic acid (and/or propionate-producing bacteria) in vivo. These data suggest that the selected oligosaccharide composition may be useful as a treatment for acquired or genetic hyperlipidemic conditions and the prevention of related diseases, such as atherosclerosis, coronary heart disease, stable and unstable angina, hypertension, as well as associated co-morbidities such as metabolic syndrome, hyperinsulinemia, insulin resistance and type-2 diabetes. These data further suggest that the selected oligosaccharide composition is useful in treating non-alcoholic fatty liver disease (NAFLD) and non-alcoholic steatohepatitis (NASH). The decreases in hepatic steatosis, inflammation, concentrations of liver triglycerides, liver weight and hepatic expression of marker genes of inflammation, fibrosis, oxidative stress, and apoptosis are all indicators that the selected oligosaccharide composition can be useful in treating NAFLD or NASH.

Example 12: Assessment of Selected Oligosaccharide Compositions in Fecal Slurries The ability of a selected oligosaccharide composition produced by a process as described in Examples 2-4 to increase the production of SCFAs (propionate/propionic acid, acetate/acetic acid, and butyrate/butyric acid) by the gut microbiota from fecal slurries of ten healthy patients and thirty-four overweight patients who have been diagnosed with type 2 diabetes (T2D) was assessed.

Fecal samples from healthy patients and overweight, T2D patients were collected and stored at −80° C. To prepare the fecal material for use in the ex vivo assay, aliquots of a 20% w/v slurry in phosphate buffered saline (PBS) and glycerol were thawed in a COY anaerobic chamber. This slurry was then further diluted into a 1% solution of Mega Media (MM). This media was filter sterilized using a 0.2 µm filter and stored in an anaerobic chamber prior to use to allow any dissolved oxygen to dissipate.

In healthy patients, the median propionate concentration across fecal samples was 13.1 mM higher in samples incubated with the selected oligosaccharide composition compared to the negative controls (FIG. 16A). The fermentation of the selected oligosaccharide composition with these fecal samples also resulted in a median increase of 12.0 mM acetate, but it did not increase butyrate concentrations in a statistically significant manner. The selected oligosaccharide composition selectively increased propionate production as a fraction of total SCFAs. Propionate represented 22.8% of the total SCFAs produced in the negative control samples, while it increased to 40.4% of SCFAs in the samples incubated with the selected oligosaccharide (FIG. 16B). Additionally, while the selected oligosaccharide composition also increased total acetate production, it did not increase proportional acetate concentrations. This fermentation product selectivity suggests that the selected oligosaccharide composition might be primarily metabolized by propionate-producing bacteria in healthy patients.

The thirty-four overweight subjects diagnosed with T2D were males and females between 18 and 70 years old with a BMI between 25 and 45 kg/m$^2$ and currently under treatment by a physician for type 2 diabetes. Similar to what was observed with samples from healthy subjects, the selected oligosaccharide composition caused an increase in propionate concentrations in fecal samples from these patients by a median value of 11.6 mM compared to the negative controls (FIG. 17A). It also increased acetate concentrations by 12.5 mM and slightly increased butyrate. Further, the selected oligosaccharide composition increased fractional propionate concentrations to 30.0% of the total SCFAs compared to 16.3% with the negative controls (FIG. 17B). There was not an increased fractional concentration of acetate or butyrate. These results suggest that the selected oligosaccharide composition might be primarily metabolized by propionate-producing bacteria in overweight subjects with T2D, a population reported to have disrupted gut microbiomes.

EQUIVALENTS AND TERMINOLOGY

The disclosure illustratively described herein suitably can be practiced in the absence of any element or elements, limitation or limitations that are not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure. Thus, it should be understood that although the present disclosure has been specifically disclosed by preferred embodiments, optional features, modification and variation of the concepts herein disclosed may be resorted to by those skilled in the art, and that such modifications and variations are considered to be within the scope of this disclosure.

In addition, where features or aspects of the disclosure are described in terms of Markush groups or other grouping of alternatives, those skilled in the art will recognize that the disclosure is also thereby described in terms of any individual member or subgroup of members of the Markush group or other group.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein. Variations of those embodiments may become apparent to those of ordinary skill in the art upon reading the foregoing description.

The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Those skilled in the art will recognize, or be able to ascertain using no more than routine experimentation, many equivalents to the specific embodiments of the invention described herein. Such equivalents are intended to be encompassed by the following claims.

What is claimed is:

1. An oligosaccharide composition comprising a plurality of oligosaccharides, the composition being characterized by a multiplicity-edited gradient-enhanced 1H-13C heteronuclear single quantum correlation (HSQC) NMR spectrum comprising one or more of signals 1, 2, 5, or 6 of the following table, wherein the spectrum is generated using a sample of the oligosaccharide composition having less than 2% monomer:

| Signal | Center Position (ppm) $^1$H | Center Position (ppm) $^{13}$C | Area under the curve (AUC) (% of total areas of signals 1-12) |
|---|---|---|---|
| 1 | 5.05 | 108.24 | 2.35-3.77 |
| 2 | 5.04 | 96.57 | 0.01-0.86 |
| 3 | 4.99 | 98.83 | 11.33-17.01 |
| 4 | 4.89 | 100.02 | 16.75-18.46 |
| 5 | 4.71 | 101.01 | 3.05-4.50 |
| 6 | 4.60 | 104.86 | 0.27-1.94 |
| 7 | 4.46 | 103.81 | 5.29-9.30 |
| 8 | 4.15 | 76.80 | 4.57-8.55 |
| 9 | 4.13 | 81.77 | 9.72-13.13 |
| 10 | 4.05 | 77.04 | 11.64-15.51 |
| 11 | 4.00 | 66.42 | 7.34-12.09 |
| 12 | 3.88 | 66.76 | 8.45-14.07, | wherein the oligosaccharide composition is produced by a process comprising:
(a) forming a reaction mixture comprising galactose monomer and mannose monomer, wherein the molar ratio of galactose to mannose is about 3:2 with an acid catalyst comprising positively charged hydrogen ions; and
(b) promoting acid catalyzed oligosaccharide formation in the reaction mixture by transferring sufficient heat to the reaction mixture to maintain the reaction mixture at its boiling point.

2. The oligosaccharide composition of claim 1, comprising wherein the HSQC-NMR spectrum comprises each of signals 1, 2, 5, and 6.

3. The oligosaccharide composition of claim 1, wherein the oligosaccharide composition comprises a plurality of oligosaccharides that consist essentially of Formula (I) and Formula (II):

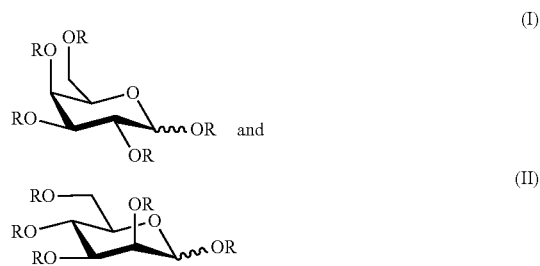

wherein R in Formula (I) and Formula (II) is independently selected from hydrogen, and Formulae (Ia), (Ib), (Ic), (Id), (IIa), (IIb), (IIc), (Id):

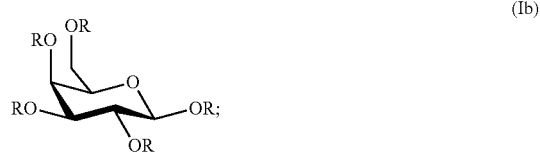

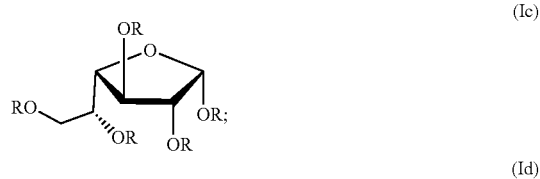

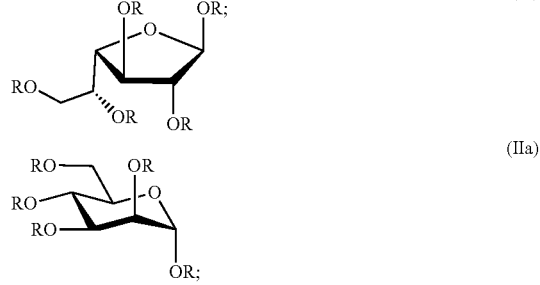

-continued

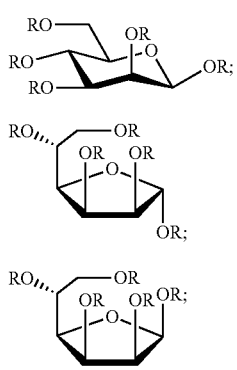

(IIb)

(IIc)

(IId)

wherein R in Formulae (Ia), (Ib), (Ic), (Id), (IIa), (IIb), (IIc), and (Id) is independently defined as above in Formula (I) and Formula (II).

4. An oligosaccharide composition comprising a plurality of oligosaccharides, each oligosaccharide comprising a plurality of monomer radicals; the plurality of oligosaccharides comprising one or more of the following monomer radicals:
 (2) t-manopyranose monoradicals, representing 11.47-18.18 mol % of monomer radicals in the plurality of oligosaccharides;
 (4) t-manofuranose monoradicals, representing 0.17-0.46 mol % of monomer radicals in the plurality of oligosaccharides;
 (8) 3-manofuranose monoradicals, representing 0.07-0.24 mol % of monomer radicals in the plurality of oligosaccharides;
 (10) 2-manopyranose and/or 3-manopyranose monoradicals, representing 3.91-5.93 mol % of monomer radicals in the plurality of oligosaccharides;
 (15) 6-manopyranose monoradicals, representing 8.30-10.84 mol % of monomer radicals in the plurality of oligosaccharides;
 (27) 4,6-manopyranose and/or 5,6-manofuranose diradicals, representing 1.18-1.82 mol % of monomer radicals in the plurality of oligosaccharides;
 (30) 3,6-manopyranose diradicals, representing 1.76-2.40 mol % of monomer radicals in the plurality of oligosaccharides;
 (31) 2,6-manopyranose diradicals, representing 1.42-1.84 mol % of monomer radicals in the plurality of oligosaccharides; and
 (32) 3,6-galactofuranose diradicals, representing 0.95-1.41 mol % of monomer radicals in the plurality of oligosaccharides.

5. An oligosaccharide composition comprising a plurality of oligosaccharides that comprise Formula (I) and Formula (II):

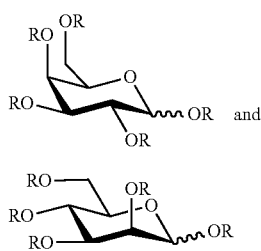

(I)

and (II)

wherein R in Formula (I) and Formula (II) is independently selected from hydrogen, and Formulae (Ia), (Ib), (Ic), (Id), (IIa), (IIb), (IIc), (Id):

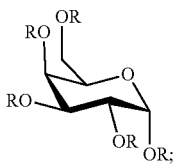

(Ia)

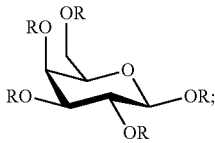

(Ib)

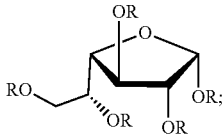

(Ic)

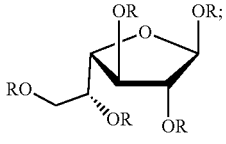

(Id)

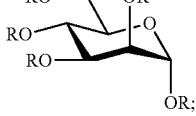

(IIa)

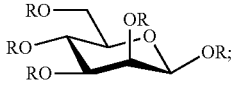

(IIb)

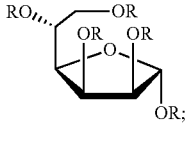

(IIc)

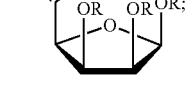

(IId)

wherein R in Formulae (Ia), (Ib), (Ic), (Id), (IIa), (IIb), (IIc), and (IId) is independently defined as above in Formula (I) and Formula (II); wherein the oligosaccharide composition is produced by a process comprising:
 (a) forming a reaction mixture comprising galactose monomer and mannose monomer, wherein the molar ratio of galactose to mannose is about 3:2 with an acid catalyst comprising positively charged hydrogen ions; and
 (b) promoting acid catalyzed oligosaccharide formation in the reaction mixture by transferring sufficient heat to the reaction mixture to maintain the reaction mixture at its boiling point.

6. The composition of claim 5, wherein step (b) comprises loading the reaction mixture with an acid catalyst comprising positively charged hydrogen ions, in an amount such that the molar ratio of positively charged hydrogen ions to total galactose monomer and mannose monomer content is in an appropriate range.

7. A method of treating a subject having or suspected of having non-alcoholic fatty liver disease (NAFLD) or non-alcoholic steatohepatitis (NASH), wherein treating is facilitating improvement or remediation of damage caused by NAFLD or NASH or reduction in severity and/or frequency of NAFLD or NASH, or a symptom thereof, the method comprising administering to the gastrointestinal tract of the subject an effective amount of an oligosaccharide composition, wherein the oligosaccharide composition has an average degree of polymerization of 5-20 and comprises a plurality of oligosaccharides selected from Formula (II) and Formula (II):

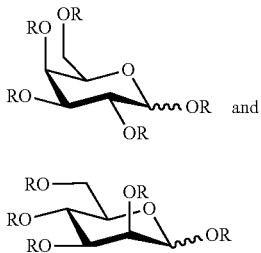

(I)

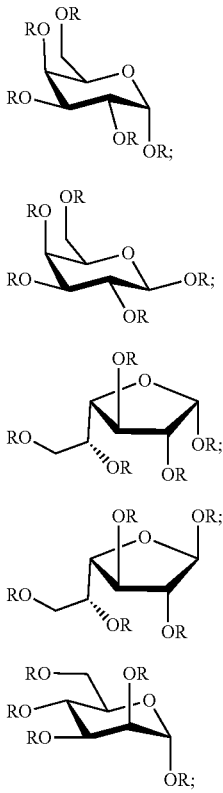

(II)

(Ia)

(Ib)

(Ic)

(Id)

(IIa)

(IIb)

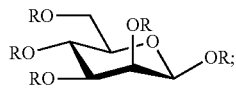

(IIc)

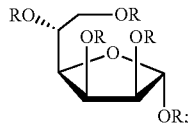

(IId)

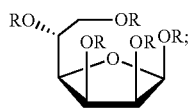

wherein R in Formulae (Ia), (Ib), (Ic), (Id), (IIa), (IIb), (IIc), and (IId) is independently defined as above in Formula (I) and Formula (II), wherein the oligosaccharide composition is produced by a process comprising:

(a) forming a reaction mixture comprising galactose monomer and mannose monomer, wherein the molar ratio of galactose to mannose is about 3:2 with an acid catalyst comprising positively charged hydrogen ions; and (b) promoting acid catalyzed oligosaccharide formation in the reaction mixture by transferring sufficient heat to the reaction mixture to maintain the reaction mixture at its boiling point; thereby treating the subject.

8. A method of treating a subject having or suspected of having non-alcoholic fatty liver disease (NAFLD) or non-alcoholic steatohepatitis (NASH), wherein treating is facilitating improvement or remediation of damage caused by NAFLD or NASH or reduction in severity and/or frequency of NAFLD or NASH, or a symptom thereof, the method comprising administering to the gastrointestinal tract of the subject an effective amount of an oligosaccharide composition according to claim 1.

9. A method of increasing the relative or absolute concentration of propionate in a human subject, the method comprising administering to the gastrointestinal tract of the subject the oligosaccharide composition according to claim 1.

10. The method of claim 9, wherein the method increases the relative or absolute concentration of propionate in the gastrointestinal tract of the subject.

11. A method of reducing the relative or absolute concentration of lipids in a human subject, the method comprising administering to the gastrointestinal tract of the subject an effective amount of an oligosaccharide composition according to claim 1.

12. A method of treating a subject having or suspected of having a disease, disorder or condition associated with elevated lipid and/or glucose levels, wherein treating is facilitating improvement or remediation of damage caused by the disease, disorder or condition associated with elevated lipid and/or glucose levels or reduction in severity and/or frequency of the disease, disorder or condition associated with elevated lipid and/or glucose levels, or a symptom thereof, the method comprising administering to the gastrointestinal tract of the subject an effective amount of an oligosaccharide composition according to claim 1, thereby treating the subject.

13. A method of treating a subject having or suspected of having a disease or disorder associated with elevated lipid and/or glucose levels, wherein treating is facilitating improvement or remediation of damage caused by the disease, disorder or condition associated with elevated lipid and/or glucose levels or reduction in severity and/or frequency of the disease, disorder or condition associated with elevated lipid and/or glucose levels, or a symptom thereof, the method comprising administering to the gastrointestinal tract of the subject an effective amount of an oligosaccharide composition, wherein the oligosaccharide composition has an average degree of polymerization of 5-20 and comprises a plurality of oligosaccharides selected from Formula (II) and Formula (II):

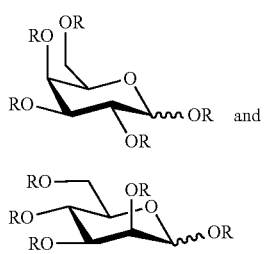
(I)

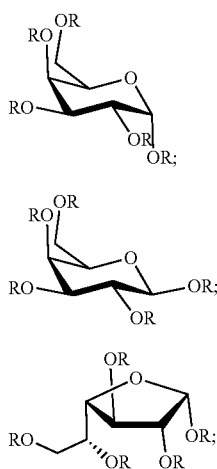
(II)

wherein R in Formula (I) and Formula (II) is independently selected from hydrogen, and Formulae (Ia), (Ib), (Ic), (Id), (IIa), (IIb), (IIc), (Id):

(Ia)

(Ib)

(Ic)

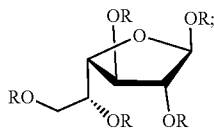
(Id)

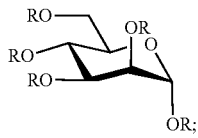
(IIa)

(IIb)

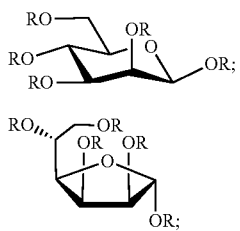
(IIc)

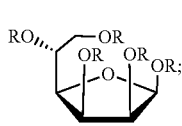
(IId)

wherein R in Formulae (Ia), (Ib), (Ic), (Id), (IIa), (IIb), (IIc), and (IId) is independently defined as above in Formula (I) and Formula (II), wherein the oligosaccharide composition is produced by a process comprising:

(a) forming a reaction mixture comprising galactose monomer and mannose monomer, wherein the molar ratio of galactose to mannose is about 3:2 with an acid catalyst comprising positively charged hydrogen ions; and (b) promoting acid catalyzed oligosaccharide formation in the reaction mixture by transferring sufficient heat to the reaction mixture to maintain the reaction mixture at its boiling point; thereby treating the subject.

14. The method of claim 13, wherein the disease, disorder or condition is dyslipidemia.

15. The method of claim 13, wherein the disease, disorder or condition is hyperlipidemia.

\* \* \* \* \*